United States Patent
Guan

(10) Patent No.: US 10,951,367 B2
(45) Date of Patent: *Mar. 16, 2021

(54) USER EQUIPMENT, ACCESS NETWORK DEVICE, AND FEEDBACK INFORMATION SENDING AND RECEIVING METHODS

(71) Applicant: Huawei Technologies Co., Ltd., Shenzhen (CN)

(72) Inventor: Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,614

(22) Filed: Nov. 27, 2019

(65) Prior Publication Data

US 2020/0099483 A1    Mar. 26, 2020

Related U.S. Application Data

(63) Continuation of application No. 15/637,663, filed on Jun. 29, 2017, now Pat. No. 10,523,380, which is a (Continued)

(30) Foreign Application Priority Data

Dec. 31, 2014    (WO) ................. PCT/CN2014/095978

(51) Int. Cl.
*H04L 5/00*    (2006.01)
*H04W 72/12*    (2009.01)
(Continued)

(52) U.S. Cl.
CPC ............. *H04L 5/001* (2013.01); *H04L 1/1607* (2013.01); *H04L 1/18* (2013.01); *H04L 1/1854* (2013.01);
(Continued)

(58) Field of Classification Search
CPC ....... H04L 1/1607; H04L 1/18; H04L 1/1854; H04L 1/1861; H04L 1/1867; H04L 5/001;
(Continued)

(56) References Cited

U.S. PATENT DOCUMENTS

2011/0312332 A1    12/2011    Choudhury et al.
2013/0077541 A1    3/2013    Lin et al.
(Continued)

FOREIGN PATENT DOCUMENTS

CN    102082647 A    6/2011
CN    102083211 A    6/2011
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211, V12.3.0, pp. 1-124, 3rd Generation Partnership Project, Valbonne, France (Sep. 2014).

(Continued)

*Primary Examiner* — Paul H Masur
(74) *Attorney, Agent, or Firm* — Leydig, Voit & Mayer, Ltd.

(57)    ABSTRACT

Disclosed are a feedback information sending method and apparatus thereof. The method comprises: receiving downlink control information from an access network device; receiving a data channel scheduled by the downlink control information; determining an uplink time unit to send feedback information corresponding to the data channel; determining a first physical uplink control channel (PUCCH) resource for the feedback information according to resource indication information, wherein the first PUCCH resource is a part of a second PUCCH resource that is included in a second PUCCH resource set, and wherein the second (Continued)

Indication information    00    01    10    11

Single-RB PUCCH

Dual-RB PUCCH

PUCCH resource is indicated by the resource indication information, which raises resource utilization.

20 Claims, 11 Drawing Sheets

Related U.S. Application Data continuation of application No. PCT/CN2015/071342, filed on Jan. 22, 2015.

(51) Int. Cl.
  *H04L 1/18* (2006.01)
  *H04L 1/16* (2006.01)

(52) U.S. Cl.
  CPC .......... *H04L 1/1861* (2013.01); *H04L 1/1867* (2013.01); *H04L 5/0053* (2013.01); *H04L 5/0055* (2013.01); *H04L 5/0091* (2013.01); *H04W 72/1231* (2013.01)

(58) Field of Classification Search
  CPC ... H04L 5/0053; H04L 5/0055; H04L 5/0091; H04W 72/1231
  See application file for complete search history.

(56) References Cited

U.S. PATENT DOCUMENTS

| | | |
|---|---|---|
| 2013/0301571 A1 | 11/2013 | Sorrentino et al. |
| 2014/0036810 A1 | 2/2014 | Harrison et al. |
| 2014/0044092 A1 | 2/2014 | Guan et al. |
| 2014/0334429 A1 | 11/2014 | Damnjanovic et al. |
| 2014/0369290 A1 | 12/2014 | Yang et al. |
| 2015/0236834 A1 | 8/2015 | Seo et al. |
| 2015/0326373 A1 | 11/2015 | Ryu et al. |
| 2016/0128089 A1 | 5/2016 | Seo et al. |
| 2017/0111156 A1 | 4/2017 | Guan et al. |
| 2017/0366380 A1 | 12/2017 | Hwang et al. |
| 2017/0374658 A1 | 12/2017 | Kim et al. |

FOREIGN PATENT DOCUMENTS

| | | |
|---|---|---|
| CN | 102415039 A | 4/2012 |
| CN | 102447541 A | 5/2012 |
| CN | 102752085 A | 10/2012 |
| CN | 103188061 A | 7/2013 |
| CN | 103427940 A | 12/2013 |
| CN | 103580827 A | 2/2014 |
| CN | 104144042 A | 11/2014 |
| EP | 2693675 A1 | 2/2014 |
| EP | 3209082 A1 | 8/2017 |
| WO | 2013071199 A1 | 5/2013 |
| WO | 2014018984 A1 | 1/2014 |
| WO | 2014038821 A2 | 3/2014 |
| WO | 2014189304 A1 | 11/2014 |
| WO | 2016060242 A1 | 4/2016 |

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213, V12.3.0, pp. 1-212, 3rd Generation Partnership Project, Valbonne, France (Sep. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.3.0, pp. 1-378, 3rd Generation Partnership Project, Valbonne, France (Sep. 2014).

"New SI proposal: LTE Carrier Aggregation Enhancement Beyond 5 Carriers," 3GPP TSG RAN Meeting #65, Edinburgh, UK, RP-141418, 3rd Generation Partnership Project, Valbonne, France (Sep. 9-12, 2014).

"Remaining details of TDD-FDD CA," 3GPP TSG RAN WG1 Meeting #76, Prague, Czech Republic, R1-140554, 3rd Generation Partnership Project, Valbonne, France (Feb. 10-14, 2014).

U.S. Appl. No. 15/637,663, filed Jun. 29, 2017.

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, total 124 pages, 3rd Generation Partnership Project, Valbonne, France (Sep. 2014).

"3rd Generation Partnership Project; Technical Specification Group Radio Access Network; Evolved Universal Terrestrial Radio Access (E-UTRA); Physical layer procedures (Release 12)," 3GPP TS 36.213 V12.3.0, total 212 pages, 3rd Generation Partnership Project, Valbonne, France (Sep. 2014).

USER EQUIPMENT, ACCESS NETWORK DEVICE, AND FEEDBACK INFORMATION SENDING AND RECEIVING METHODS

CROSS-REFERENCE TO RELATED APPLICATIONS

This application is a continuation of U.S. patent application Ser. No. 15/637,663, filed on Jun. 29, 2017, which is a continuation of International Application No. PCT/CN2015/071342, filed on Jan. 22, 2015, which claims priority to International Application No. PCT/CN2014/095978, filed on Dec. 31, 2014. All of the afore-mentioned patent applications are hereby incorporated by reference in their entireties.

TECHNICAL FIELD

The present disclosure relates to the communications system field, and in particular, to user equipment, an access network device, and feedback information sending and receiving methods.

BACKGROUND

In a Long Term Evolution (LTE) system, a time-frequency resource is divided into an orthogonal frequency division multiplexing (OFDM) symbol or a single carrier frequency division multiple access (SC-FDMA) symbol (hereinafter referred to as a time-domain symbol) in a time-domain dimension and a subcarrier in a frequency-domain dimension. A minimum resource granularity is referred to as a resource element (RE), that is, a time-frequency grid including one time-domain symbol in a time domain and one subcarrier in a frequency domain. In the LTE system, service transmission is performed based on scheduling by a base station. A basic time unit of scheduling by the base station is a subframe. One subframe includes multiple time-domain symbols. A specific scheduling procedure is as follows: The base station sends a control channel, such as a physical downlink control channel (PDCCH) or an enhanced PDCCH (EPDCCH). The control channel may carry scheduling information of a data channel, such as a physical downlink shared channel (PDSCH) or a physical uplink shared channel (PUSCH), and the scheduling information includes control information, such as resource allocation information and a modulation and coding scheme. A user equipment (UE) detects the control channel in a subframe, and receives a downlink data channel or sends an uplink data channel according to the scheduling information carried on the detected control channel.

LTE supports frequency division duplex (FDD) and time division duplex (TDD). In an FDD system, uplink transmission and downlink transmission are performed on different carriers. In a TDD system, uplink transmission and downlink transmission are performed on a same carrier at different time.

LTE currently supports seven different TDD uplink-downlink subframe configurations. As shown in Table 1, D represents a downlink subframe, S represents a special subframe, and U represents an uplink subframe.

TABLE 1

TDD uplink-downlink subframe configuration in an LTE system

| Uplink-downlink subframe config-uration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A hybrid automatic repeat request (HARQ) mechanism is used in LTE. For example, in a downlink, after UE receives a PDSCH, if the PDSCH is correctly received, the UE feeds back an acknowledgment (ACK) on a PUCCH. If the PDSCH is not correctly received, the UE feeds back a negative acknowledgment (NACK) on a PUCCH. For FDD, after receiving a PDSCH in a subframe n−4, the UE feeds back an ACK/NACK in a subframe n. For TDD, a time sequence relationship between receiving of a PDSCH and feedback of an ACK/NACK corresponding to the PDSCH is shown in Table 2. In Table 2, numbers 0 to 9 in the first row each represent an uplink subframe n, numbers in the first column represent uplink-downlink subframe configurations, a number k in a column corresponding to a number in the first row constitutes a set K, and the number k indicates that an ACK/NACK corresponding to a PDSCH in a downlink subframe n−k needs to be fed back in the uplink subframe n. For example, in an uplink-downlink configuration 1, when n is 2, K={7, 6}, and it indicates that an uplink subframe 2 is used to feed back an ACK/NACK corresponding to a PDSCH in a downlink subframe n−7 and an ACK/NACK corresponding to a PDSCH in a downlink subframe n−6. The downlink subframe n−7 is a downlink subframe 5, and the downlink subframe n−6 is a downlink subframe 6.

TABLE 2

Time sequence relationship between a PDSCH and an ACK/NACK corresponding to the PDSCH in a TDD system

| Uplink-downlink subframe config-uration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

LTE further supports a carrier aggregation (CA) technology, that is, a base station configures multiple carriers for UE to increase a data rate of the UE. The multiple carriers are synchronously sent in the time domain, and the UE may separately detect a PDCCH for scheduling each carrier and a PDSCH corresponding to the PDCCH. A specific process of detecting each carrier is similar to that in the foregoing single-carrier case.

The LTE system supports FDD CA, TDD CA, and FDD+TDD CA. TDD CA includes TDD CA with a same uplink-downlink subframe configuration and TDD CA with different uplink-downlink subframe configurations. In a CA mode, one primary component carrier and at least one secondary component carrier are configured for UE, and a PUCCH carrying an ACK/NACK is sent only on the primary component carrier of the UE. A PUCCH sending mode in the CA mode includes a channel selection mode and a PUCCH format 3 mode. In the PUCCH format 3 mode, a discrete Fourier transform-spread-orthogonal frequency division multiplexing (DFT-S-OFDM) transmission scheme is used, a maximum of 20 ACK/NACK bits can be transmitted, and TDD CA of a maximum of five carriers can be supported. For example, in a mainstream TDD uplink-downlink configuration 2 deployed in a current network, an uplink subframe 2 on one carrier can support a feedback of ACK/NACK bits for four downlink subframes, and CA of five carriers with the TDD uplink-downlink configuration 2 supports a feedback of 20 ACK/NACK bits.

With further evolution of an LTE technology, a feedback of more ACK/NACK bits, such as more than 20 bits, may need to be supported in the future. The following describes how to feed back more bits.

For example, CA of more carriers such as CA of ten carriers is introduced. In this case, for example, CA is performed on ten carriers in the TDD uplink-downlink configuration 2, and 40 ACK/NACK bits need to be fed back. For another example, although CA of a maximum of five carriers is supported, a TDD uplink-downlink configuration 5 is configured for most of the carriers. For example, an uplink-downlink configuration 2 is configured for a primary component carrier, and the uplink-downlink configuration 5 is configured for four secondary component carriers. In this case, 4+9×4=40 ACK/NACK bits need to be fed back. However, when an ACK/NACK is fed back by using the current PUCCH format 3, how to reduce overheads when more ACK/NACK bits are fed back is a problem that needs an urgent solution.

SUMMARY

Embodiments of the present disclosure provide user equipment, an access network device, and feedback information sending and receiving methods, so as to resolve a problem of how to reduce overheads when more feedback information bits is fed back.

According to a first aspect, an embodiment of the present disclosure provides user equipment, including:

a receiving module, configured to: receive downlink control information sent by an access network device, and receive a data channel scheduled by using the downlink control information;

a processing module, configured to determine an uplink subframe used for sending feedback information corresponding to the data channel, where the data channel is a data channel received by the receiving module, a first downlink subframe set associated with the uplink subframe includes a first subset and a second subset, the first subset includes at least two downlink subframes, and the first subset is a proper subset of the second subset; where the processing module is further configured to determine a channel resource, where the channel resource is a first uplink channel resource or a second uplink channel resource, the first uplink channel resource corresponds to the first subset, and the second uplink channel resource corresponds to the second subset; and a sending module, configured to: under control of the processing module, send the feedback information on the channel resource in the uplink subframe by using a channel format, where the channel resource is a channel resource determined by the processing module, the channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

In this embodiment, the p-codebook-size channel format or the q-codebook-size channel format may mean that the channel format can support a feedback of feedback information (such as an ACK/NACK) of a maximum of p or q codebook sizes. A codebook size refers to a quantity of original unencoded ACK/NACK bits. Specifically, the p codebook sizes correspond to the first subset, and the q codebook sizes correspond to the second subset. That is, the p codebook sizes are determined according to a quantity of downlink subframes in the first subset, and the q codebook sizes are determined according to a quantity of downlink subframes in the second subset.

Optionally, a channel resource occupied by the p-codebook-size channel format includes n resource elements, a channel resource occupied by the q-codebook-size channel format includes m resource elements, m and n are natural numbers, and m is greater than or equal to n. In this way, the p-codebook-size channel format may also be considered as an n-resource-element channel format, and the q-codebook-size channel format may also be considered as an m-resource-element channel format. When m is greater than n, the following embodiment based on an m-resource-element channel format and an n-resource-element channel format is completely applicable to this solution of p codebook sizes and q codebook sizes, and details are not repeatedly described below. In the subsequent embodiment, the m-resource-element channel format merely needs to be replaced with the q-codebook-size channel format, and the n resource elements correspond to the p-codebook-size channel format, that is, the n-resource-element channel format is replaced with the p-codebook-size channel format.

It should be noted that the p-codebook-size channel format and the q-codebook-size channel format may occupy a same quantity of resource elements, that is, m may be equal to n. Specifically, time-frequency resources on which the same quantity of resource elements are located may overlap or not overlap. In a case of overlapping, the time-frequency resources may partly or completely overlap. Therefore, although all the subsequent embodiments are described by using an m-resource-element channel format and an n-resource-element channel format (where m is greater than n) as an example, the present disclosure is not limited thereto, and m may be equal to n.

Optionally, the p-codebook-size channel format and the q-codebook-size channel format occupy a same quantity of resource elements, and a length of an orthogonal code used by the p-codebook-size channel format is greater than a length of an orthogonal code used by the q-codebook-size channel format.

For the foregoing optional solution, the user equipment provided in the embodiment according to the first aspect includes:

a receiving module, configured to: receive downlink control information sent by an access network device, and receive a data channel scheduled by using the downlink control information;

a processing module, configured to: determine an uplink subframe used for sending feedback information corresponding to the data channel that is received by the receiving module, and determine a channel resource, where a first downlink subframe set associated with the uplink subframe includes a first subset and a second subset, the first subset includes at least two downlink subframes, the first subset is a proper subset of the second subset, the channel resource is a first uplink channel resource or a second uplink channel resource, the first uplink channel resource corresponds to the first subset, and the second uplink channel resource corresponds to the second subset; and a sending module, configured to: under control of the processing module, send the feedback information on the channel resource in the uplink subframe by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a first possible implementation manner of the first aspect, it is configured that the receiving module receives, in the following manner, the data channel scheduled by using the downlink control information: receiving, in a downlink subframe included in a second downlink subframe set, the data channel scheduled by using the downlink control information, where in case that the second downlink subframe set is a subset of the first subset, the channel resource determined by the processing module is the first uplink channel resource; or in case that the second downlink subframe set includes only a downlink subframe that is in the second subset but does not belong to the first subset, the channel resource determined by the processing module is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource.

In a second possible implementation manner of the first aspect, it is configured that the receiving module receives, in the following manner, the data channel scheduled by using the downlink control information: receiving, in a downlink subframe included in a second downlink subframe set, the data channel scheduled by using the downlink control information, where in case that the second downlink subframe set is a subset of the first subset, the channel resource determined by the processing module is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource.

The foregoing first possible implementation manner and the foregoing second possible implementation manner may be used as separate solutions, such as a second aspect and a third aspect, independently of the foregoing embodiment according to the first aspect.

According to a second aspect, an embodiment of the present disclosure provides user equipment, including:

a receiving module, configured to: receive downlink control information sent by an access network device, and receive, on a downlink subframe included in a second downlink subframe set, the data channel scheduled by using the downlink control information;

a processing module, configured to: determine an uplink subframe used for sending feedback information corresponding to the data channel that is received by the receiving module, and determine a channel resource, where a first downlink subframe set associated with the uplink subframe includes a first subset and a second subset, the first subset includes at least two downlink subframes, and the first subset is a proper subset of the second subset; and in case that the second downlink subframe set is a subset of the first subset, the channel resource determined by the processing module is the first uplink channel resource; or in case that the second downlink subframe set includes only a downlink subframe that is in the second subset but does not belong to the first subset, the channel resource determined by the processing module is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource; and a sending module, configured to: under control of the processing module, send the feedback information on the channel resource in the uplink subframe by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

According to a third aspect, an embodiment of the present disclosure provides user equipment, including:

a receiving module, configured to: receive downlink control information sent by an access network device, and receive, on a downlink subframe included in a second downlink subframe set, the data channel scheduled by using the downlink control information;

a processing module, configured to: determine an uplink subframe used for sending feedback information corresponding to the data channel that is received by the receiving module, and determine a channel resource, where a first downlink subframe set associated with the uplink subframe includes a first subset and a second subset, the first subset includes at least two downlink subframes, and the first subset is a proper subset of the second subset; and in case that the second downlink subframe set is a subset of the first subset, the channel resource determined by the processing module is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource; and a sending module, configured to: under control of the processing module, send the feedback information on the channel resource in the uplink subframe by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a possible implementation manner of the third aspect, in case that the second downlink subframe set includes only a downlink subframe that is in the second subset but does not belong to the first subset, the channel resource determined by the processing module is the third uplink channel resource; and the sending module is configured to: under control of the processing module, send feedback information of a k-resource-element channel format on the third uplink channel resource, where k is a natural number, and m>k.

The third uplink channel resource may be the same as the first uplink channel resource, and k=n in this case.

It should be noted that the possible implementation manners of the first aspect may be used as possible implementation manners of the second aspect and the third aspect. For brevity, details are not repeatedly described herein. The second aspect and the third aspect may be the same as the first aspect, that is, may be used as new embodiments by replacing the m-resource-element channel format with a q-codebook-size channel format, and the n-resource-element channel format with a p-codebook-size channel format.

With reference to the first possible implementation manner or the second possible implementation manner of the first aspect, or the second aspect, or the third aspect, in a third possible implementation manner, the downlink control information includes resource indication information; and it is configured that the processing module determines the channel resource in the following manner: determining, according to the resource indication information, the channel resource used for carrying the feedback information.

With reference to the third possible implementation manner, in a fourth possible implementation manner, the processing module is further configured to: before determining the channel resource, obtain a second uplink channel resource set that is configured by the access network device, where the second uplink channel resource is an uplink channel resource in the second uplink channel resource set, a part of each uplink channel resource in multiple uplink channel resources included in the second uplink channel resource set constitutes a first uplink channel resource set, and the first uplink channel resource is an uplink channel resource in the first uplink channel resource set.

With reference to the fourth possible implementation manner of the first aspect, in a fifth possible implementation manner, the channel resource determined by the processing module is the first uplink channel resource; and it is configured that the processing module determines the channel resource in the following manner:

determining, from the second uplink channel resource set according to the resource indication information, an uplink channel resource indicated by the resource indication information, and determining the first uplink channel resource from the uplink channel resource indicated by the resource indication information; or determining the first uplink channel resource from the first uplink channel resource set according to the resource indication information; or determining the first uplink channel resource according to the resource indication information, where the first uplink channel resource is a part of an uplink channel resource that is in the second uplink channel resource set and that is indicated by the resource indication information.

With reference to the fourth possible implementation manner or the fifth possible implementation manner of the first aspect, in a sixth possible implementation manner, it is configured that the processing module determines the channel resource in the following manner:

determining, according to identification information of the user equipment or preconfigured information, the first uplink channel resource in the uplink channel resource indicated by the resource indication information, where the uplink channel resource indicated by the resource indication information is an uplink channel resource in the second uplink channel resource set.

Optionally, the channel resource determined by the processing module is the second uplink channel resource; and it is configured that the processing module determines the channel resource in the following manner: determining the second uplink channel resource from the second uplink channel resource set according to the resource indication information.

With reference to the third possible implementation manner of the first aspect, in a seventh possible implementation manner, the processing module is further configured to: before determining the channel resource, obtain a first uplink channel resource set and a second uplink channel resource set that are preconfigured by the access network device, where the first uplink channel resource is an uplink channel resource in the first uplink channel resource set, and the second uplink channel resource is an uplink channel resource in the second uplink channel resource set.

With reference to the seventh possible implementation manner of the first aspect, in an eighth possible implementation manner, a first state set of the resource indication information indicates an uplink channel resource in the first uplink channel resource set, a second state set of the resource indication information indicates an uplink channel resource in the second uplink channel resource set, and the first state set does not intersect the second state set.

With reference to the eighth possible implementation manner of the first aspect, in a ninth possible implementation manner, the channel resource determined by the processing module is the first uplink channel resource, and it is configured that the processing module determines the channel resource in the following manner: determining the first uplink channel resource from the first uplink channel set according to a state in the first state set of the resource indication information; or the channel resource determined by the processing module is the second uplink channel resource, and it is configured that the processing module determines the channel resource in the following manner: determining the second uplink channel resource for the feedback information from the second uplink channel set according to a state in the second state set of the resource indication information.

With reference to the eighth possible implementation manner of the first aspect, in a tenth possible implementation manner, a state of the resource indication information indicates an uplink channel resource in the first uplink channel resource set and/or an uplink channel resource in the second uplink channel resource set.

With reference to the eighth possible implementation manner or the tenth possible implementation manner of the first aspect, in an eleventh possible implementation manner, the channel resource determined by the processing module is the first uplink channel resource, and it is configured that the processing module determines the channel resource in the following manner:

determining, from the first uplink channel resource set according to the resource indication information, a third uplink channel resource indicated by the resource indication information, and determining, from the second uplink channel resource set according to the resource indication information, a fourth uplink channel resource indicated by the resource indication information; determining that the second downlink subframe set is a subset of the first subset; and determining that the third uplink channel resource is the first uplink channel resource; or determining that the second downlink subframe set is a subset of the first subset; and determining, from the first uplink channel resource set according to the resource indication information, the first uplink channel resource indicated by the resource indication information; or the channel resource determined by the processing module is the second uplink channel resource, and it is configured that the processing module determines the channel resource in the following manner:

determining, from the first uplink channel resource set according to the resource indication information, a fifth uplink channel resource indicated by the resource indication information, and determining, from the second uplink channel resource set according to the resource indication information, a sixth uplink channel resource indicated by the resource indication information; determining that the second downlink subframe set includes only a downlink subframe that is in the second subset but does not belong to the first subset; and determining that the sixth uplink channel resource is the second uplink channel resource; or determining that the second downlink subframe set includes only a downlink subframe that is in the second subset but does not belong to the first subset; and determining, from the second uplink channel resource set according to the state of the resource indication information, the second uplink channel resource indicated by the resource indication information; or determining, from the first uplink channel resource set according to the resource indication information, a fifth uplink channel resource indicated by the resource indication information, and determining, from the second uplink channel resource set according to the resource indication information, a sixth uplink channel resource indicated by the resource indication information; determining that the second downlink subframe set includes a downlink subframe in the first subset and a downlink subframe that is in the second subset but does not belong to the first subset, but does not include a downlink subframe that is not included in the first subset or the second subset; and determining that the sixth uplink channel resource is the second uplink channel resource; or determining that the second downlink subframe set includes a downlink subframe in the first subset and a downlink subframe that is in the second subset but does not belong to the first subset, but does not include a downlink subframe that is not included in the first subset or the second subset; and determining, from the second uplink channel resource set according to the resource indication information, the second uplink channel resource indicated by the resource indication information.

It should be noted that for configuration of each parameter and execution of each step in this implementation manner, refer to descriptions of the implementation manner above.

In a twelfth possible implementation manner of the first aspect, the processing module is further configured to: before determining the channel resource, obtain a first uplink channel resource set and a second uplink channel set that are preconfigured by the access network device, where the first uplink channel resource is an uplink channel resource in the first uplink channel resource set, and the second uplink channel resource is an uplink channel resource in the second uplink channel resource set;

the downlink control information includes resource indication information, states of the resource indication information include a first state set and a second state set, the first state set indicates an uplink channel resource in the first uplink channel resource set, the second state set indicates an uplink channel resource in the second uplink channel resource set, and the first state set does not intersect the second state set; and it is configured that the processing module determines the channel resource in the following manner: in case that the second downlink subframe set is a subset of the first subset, determining, from the second uplink channel resource set according to the resource indication information, the second uplink channel resource indicated by the resource indication information.

With reference to any one of the first aspect, or the first to the twelfth possible implementation manners of the first aspect, in a thirteenth possible implementation manner, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format, where the n-resource-element channel format and the m-resource-element channel format whose time-frequency resources overlap use an orthogonal code.

With reference to any one of the first aspect, or the first to the thirteenth possible implementation manners of the first aspect, in a fourteenth possible implementation manner, the processing module is further configured to determine the first subset and the second subset according to a preconfiguration before determining the channel resource.

With reference to the fourteenth possible implementation manner of the first aspect, in a fifteenth possible implementation manner, the preconfiguration is independently performed for different uplink subframes.

According to a fourth aspect, an embodiment of the present disclosure provides an access network device, including:

a sending module, configured to: under control of a processing module, send downlink control information to user equipment UE, and send a data channel scheduled by using the downlink control information to the UE;

the processing module, configured to: control the sending module to send the downlink control information to the UE, control the sending module to send the data channel scheduled by using the downlink control information to the UE, determine an uplink subframe used for receiving feedback information corresponding to the data channel, and determine a channel resource, where a first downlink subframe set associated with the uplink subframe includes a first subset and a second subset, the first subset includes at least two downlink subframes, the first subset is a proper subset of the second subset, the channel resource is a first uplink channel resource or a second uplink channel resource, the first uplink channel resource corresponds to the first subset, and the second uplink channel resource corresponds to the second subset; and a receiving module, configured to receive, on the channel resource in the uplink subframe, the feedback information sent by using a channel format, where the channel resource is determined by the processing module, the channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

Same as the foregoing embodiment, for meanings of the p-codebook-size channel format, the q-codebook-size channel format, and a codebook size, refer to descriptions of the foregoing embodiment. The following embodiment based on an m-resource-element channel format and an n-resource-element channel format is completely applicable to this solution of p codebook sizes and q codebook sizes, and details are not repeatedly described below. In the subsequent embodiment, the m-resource-element channel format merely needs to be replaced with the q-codebook-size channel format, and the n-resource-element channel format is replaced with the p-codebook-size channel format.

It should be noted that the p-codebook-size channel format and the q-codebook-size channel format may occupy a same quantity of resource elements, that is, m may be equal to n. Specifically, time-frequency resources on which the same quantity of resource elements are located may overlap or not overlap. In a case of overlapping, the time-frequency resources may partly or completely overlap. Therefore, although all the subsequent embodiments are described by using an m-resource-element channel format and an n-resource-element channel format (where m is greater than n) as an example, the present disclosure is not limited thereto, and m may be equal to n.

Optionally, the p-codebook-size channel format and the q-codebook-size channel format occupy a same quantity of resource elements, and a length of an orthogonal code used by the p-codebook-size channel format is greater than a length of an orthogonal code used by the q-codebook-size channel format.

For the foregoing optional solution, the access network device provided in the embodiment according to the fourth aspect includes:

a sending module, configured to: under control of a processing module, send downlink control information to user equipment UE, and send a data channel scheduled by using the downlink control information to the UE;

the processing module, configured to: control the sending module to send the downlink control information to the UE, control the sending module to send the data channel scheduled by using the downlink control information to the UE, determine an uplink subframe used for receiving feedback information corresponding to the data channel, and determine a channel resource, where a first downlink subframe set associated with the uplink subframe includes a first subset and a second subset, the first subset includes at least two downlink subframes, the first subset is a proper subset of the second subset, the channel resource is a first uplink channel resource or a second uplink channel resource, the first uplink channel resource corresponds to the first subset, and the second uplink channel resource corresponds to the second subset; and a receiving module, configured to: receive, on the channel resource in the uplink subframe determined by the processing module, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a first possible implementation manner of the fourth aspect, it is configured that the sending module sends, in the following manner, the data channel scheduled by using the downlink control information to the UE: sending, in a downlink subframe included in a second downlink subframe set, the data channel scheduled by using the downlink control information, where in case that the second downlink subframe set is a subset of the first subset, the channel resource determined by the processing module is the first uplink channel resource; or in case that the second downlink subframe set includes only a downlink subframe that is in the second subset but does not belong to the first subset, the channel resource determined by the processing module is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource.

In a second possible implementation manner of the fourth aspect, it is configured that the sending module sends, in the following manner, the data channel scheduled by using the downlink control information to the UE: sending, in a downlink subframe included in a second downlink subframe set, the data channel scheduled by using the downlink control information, where in case that the second downlink subframe set is a subset of the first subset, the channel resource determined by the processing module is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource.

The foregoing first possible implementation manner and the foregoing second possible implementation manner may be used as separate solutions, such as a fifth aspect and a sixth aspect, independently of the foregoing embodiment according to the fourth aspect.

According to a fifth aspect, an embodiment of the present disclosure provides an access network device, including:

a sending module, configured to: under control of a processing module, send downlink control information to user equipment UE, and send, in a downlink subframe included in a second downlink subframe set, the data channel scheduled by using the downlink control information;

the processing module, configured to: control the sending module to send the downlink control information to the UE, control the sending module to send the data channel scheduled by using the downlink control information to the UE, determine an uplink subframe used for receiving feedback information corresponding to the data channel, and determine a channel resource, where a first downlink subframe set associated with the uplink subframe includes a first subset and a second subset, the first subset includes at least two downlink subframes, and the first subset is a proper subset of the second subset; the channel resource is a first uplink channel resource or a second uplink channel resource; and in case that the second downlink subframe set is a subset of the first subset, the channel resource determined by the processing module is the first uplink channel resource; or in case that the second downlink subframe set includes only a downlink subframe that is in the second subset but does not belong to the first subset, the channel resource determined by the processing module is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource; and a receiving module, configured to: receive, on the channel resource in the uplink subframe determined by the processing module, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

According to a sixth aspect, an embodiment of the present disclosure provides an access network device, including:

a sending module, configured to: under control of a processing module, send downlink control information to user equipment UE, and send, in a downlink subframe included in a second downlink subframe set, the data channel scheduled by using the downlink control information;

the processing module, configured to: control the sending module to send the downlink control information to the UE, control the sending module to send the data channel scheduled by using the downlink control information to the UE, determine an uplink subframe used for receiving feedback information corresponding to the data channel, and determine a channel resource, where a first downlink subframe set associated with the uplink subframe includes a first subset and a second subset, the first subset includes at least two downlink subframes, and the first subset is a proper subset of the second subset; the channel resource is a first uplink channel resource or a second uplink channel resource; and in case that the second downlink subframe set is a subset of the first subset, the channel resource determined by the processing module is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module is the second uplink channel resource; and a receiving module, configured to: receive, on the channel resource in the uplink subframe determined by the processing module, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a possible implementation manner of the sixth aspect, in case that the second downlink subframe set includes only a downlink subframe that is in the second subset but does not belong to the first subset, the channel resource determined by the processing module is the third uplink channel resource; and the sending module is configured to: under control of the processing module, send feedback information of a k-resource-element channel format on the third uplink channel resource, where k is a natural number, and m>k.

The third uplink channel resource may be the same as the first uplink channel resource, and k=n in this case.

It should be noted that the possible implementation manners of the fourth aspect may be used as possible implementation manners of the fifth aspect and the sixth aspect. For brevity, details are not repeatedly described herein. The fifth aspect and the sixth aspect may be the same as the fourth aspect, that is, may be used as new embodiments by replacing the m-resource-element channel format with a q-codebook-size channel format, and the n-resource-element channel format with a p-codebook-size channel format.

With reference to the first possible implementation manner or the second possible implementation manner of the fourth aspect, in a third possible implementation manner, the downlink control information includes resource indication information, and the resource indication information is used to indicate the first uplink channel resource or the second uplink channel resource used for carrying the feedback information.

With reference to the third possible implementation manner of the fourth aspect, in a fourth possible implementation manner, the processing module is further configured to: before determining the channel resource, send information about a second uplink channel resource set to the UE by using the sending module, where the second uplink channel resource is an uplink channel resource in the second uplink channel resource set, a part of each uplink channel resource in multiple uplink channel resources in the second uplink channel resource set constitutes a first uplink channel resource set, and the first uplink channel resource is an uplink channel resource in the first uplink channel resource set.

With reference to the fourth possible implementation manner of the fourth aspect, in a fifth possible implementation manner, the channel resource determined by the processing module is the first uplink channel resource, and the resource indication information indicates an uplink channel resource that is in the second uplink channel resource set and that includes the first uplink channel resource; or the resource indication information indicates the first uplink channel resource in the first uplink channel resource set; or the channel resource determined by the processing module is the second uplink channel resource, and the resource indication information indicates the second uplink channel resource in the second uplink channel resource set.

With reference to the fifth possible implementation manner of the fourth aspect, in a sixth possible implementation manner, the resource indication information indicates the uplink channel resource that is in the second uplink channel resource set and that includes the first uplink channel resource; and it is configured that the processing module determines the channel resource in the following manner:

determining, according to identification information of the UE or preconfigured information, the first uplink channel resource in the uplink channel resource indicated by the resource indication information.

With reference to the third possible implementation manner of the fourth aspect, in a seventh possible implementation manner, the processing module is further configured to: before determining the channel resource, control the sending module to send information about a first uplink channel resource set and information about a second uplink channel resource set to the UE, where the first uplink channel resource is an uplink channel resource in the first uplink channel resource set, and the second uplink channel resource is an uplink channel resource in the second uplink channel resource set.

With reference to the seventh possible implementation manner of the fourth aspect, in an eighth possible implementation manner, a first state set of the resource indication information indicates an uplink channel resource in the first uplink channel resource set, a second state set of the resource indication information indicates an uplink channel resource in the second uplink channel resource set, and the first state set does not intersect the second state set.

With reference to the seventh possible implementation manner of the fourth aspect, in a ninth possible implementation manner, a state of the resource indication information indicates an uplink channel resource in the first uplink channel resource set and/or an uplink channel resource in the second uplink channel resource set.

With reference to any one of the fourth to the seventh possible implementation manners, or the ninth possible implementation manner of the fourth aspect, in a tenth possible implementation manner, it is configured that the receiving module receives the feedback information in the following manner: receiving, on the second uplink channel resource indicated by the resource indication information in the uplink subframe, the feedback information sent by using the m-resource-element channel format.

With reference to the eleventh possible implementation manner of the fourth aspect, in an eleventh possible implementation manner, the processing module is further configured to: determine a first uplink channel resource in the second uplink channel resource according to the identification information of the UE or the preconfigured information, and control the receiving module to receive, on the first uplink channel resource, the feedback information sent by using the n-resource-element channel format; or the processing module is further configured to: determine a first uplink channel resource in the first uplink channel resource according to the resource indication information, and control the receiving module to receive, on the first uplink channel resource, the feedback information sent by using the n-resource-element channel format.

With reference to any one of the fourth aspect, or the first to the eleventh possible implementation manners of the fourth aspect, in a twelfth possible implementation manner, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format, where the n-resource-element channel format and the m-resource-element channel format whose time-frequency resources overlap use an orthogonal code.

With reference to any one of the first to the twelfth possible implementation manners of the fourth aspect, in a thirteenth possible implementation manner, the processing module determines the first subset and the second subset according to a preconfiguration before determining the channel resource.

With reference to the thirteenth possible implementation manner of the fourth aspect, in a fourteenth possible implementation manner, the preconfiguration is independently performed for different uplink subframes.

According to a seventh aspect, an embodiment of the present disclosure provides a feedback information sending method, including:

receiving, by user equipment UE, downlink control information sent by an access network device;

receiving, by the UE, a data channel scheduled by using the downlink control information;

determining, by the UE, an uplink subframe used for sending feedback information corresponding to the data channel, where a first downlink subframe set associated with the uplink subframe includes a first subset and a second subset, the first subset includes at least two downlink subframes, and the first subset is a proper subset of the second subset;

determining, by the UE, a channel resource, where the channel resource is a first uplink channel resource or a second uplink channel resource, the first uplink channel resource corresponds to the first subset, and the second uplink channel resource corresponds to the second subset; and sending, by the UE, the feedback information on the channel resource in the uplink subframe by using a channel format, where the channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

Same as the foregoing embodiment, for meanings of the p-codebook-size channel format, the q-codebook-size channel format, and a codebook size, refer to descriptions of the foregoing embodiment. The following embodiment based on an m-resource-element channel format and an n-resource-element channel format is completely applicable to this solution of p codebook sizes and q codebook sizes, and details are not repeatedly described below. In the subsequent embodiment, the m-resource-element channel format merely needs to be replaced with the q-codebook-size channel format, and the n-resource-element channel format is replaced with the p-codebook-size channel format.

It should be noted that the p-codebook-size channel format and the q-codebook-size channel format may occupy a same quantity of resource elements, that is, m may be equal to n. Specifically, time-frequency resources on which the same quantity of resource elements are located may overlap or not overlap. In a case of overlapping, the time-frequency resources may partly or completely overlap. Therefore, although all the subsequent embodiments are described by using an m-resource-element channel format and an n-resource-element channel format (where m is greater than n) as an example, the present disclosure is not limited thereto, and m may be equal to n.

Optionally, the p-codebook-size channel format and the q-codebook-size channel format occupy a same quantity of resource elements, and a length of an orthogonal code used by the p-codebook-size channel format is greater than a length of an orthogonal code used by the q-codebook-size channel format.

For the foregoing optional solution, the feedback information sending method provided in the embodiment according to the seventh aspect includes:

receiving, by user equipment UE, downlink control information sent by an access network device;

receiving, by the UE, a data channel scheduled by using the downlink control information;

determining, by the UE, an uplink subframe used for sending feedback information corresponding to the data channel, where a first downlink subframe set associated with the uplink subframe includes a first subset and a second subset, the first subset includes at least two downlink subframes, and the first subset is a proper subset of the second subset;

determining, by the UE, a channel resource, where the channel resource is a first uplink channel resource or a second uplink channel resource, the first uplink channel resource corresponds to the first subset, and the second uplink channel resource corresponds to the second subset; and sending, by the UE, the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

In a first possible implementation manner of the seventh aspect, the receiving, by the UE, a data channel scheduled by using the downlink control information includes: receiving, by the UE in a downlink subframe included in a second downlink subframe set, the data channel scheduled by using the downlink control information, where in case that the second downlink subframe set is a subset of the first subset, the channel resource determined by the UE is the first uplink channel resource; or in case that the second downlink subframe set includes only a downlink subframe that is in the second subset but does not belong to the first subset, the channel resource determined by the UE is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

In a second possible implementation manner of the seventh aspect, the receiving, by the UE, a data channel scheduled by using the downlink control information includes: receiving, by the UE in a downlink subframe included in a second downlink subframe set, the data channel scheduled by using the downlink control information, where in case that the second downlink subframe set is a subset of the first subset, the channel resource determined by the UE is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

The foregoing first possible implementation manner and the foregoing second possible implementation manner may be used as separate solutions, such as a fifth aspect and a sixth aspect, independently of the foregoing embodiment according to the fourth aspect.

According to an eighth aspect, an embodiment of the present disclosure provides a feedback information sending method, including:

receiving, by user equipment UE, downlink control information sent by an access network device;

receiving, by the UE in a downlink subframe included in a second downlink subframe set, the data channel scheduled by using the downlink control information;

determining, by the UE, an uplink subframe used for sending feedback information corresponding to the data channel, where a first downlink subframe set associated with the uplink subframe includes a first subset and a second subset, the first subset includes at least two downlink subframes, and the first subset is a proper subset of the second subset;

determining, by the UE, a channel resource, where in case that the second downlink subframe set is a subset of the first subset, the channel resource determined by the UE is the first uplink channel resource; or in case that the second downlink subframe set includes only a downlink subframe that is in the second subset but does not belong to the first subset, the channel resource determined by the UE is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource; and sending, by the UE, the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

According to a ninth aspect, an embodiment of the present disclosure provides a feedback information sending method, including:

receiving, by user equipment UE, downlink control information sent by an access network device;

receiving, by the UE in a downlink subframe included in a second downlink subframe set, the data channel scheduled by using the downlink control information;

determining, by the UE, an uplink subframe used for sending feedback information corresponding to the data channel, where a first downlink subframe set associated with the uplink subframe includes a first subset and a second subset, the first subset includes at least two downlink subframes, and the first subset is a proper subset of the second subset;

determining, by the UE, a channel resource, where in case that the second downlink subframe set is a subset of the first subset, the channel resource determined by the UE is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource; and sending, by the UE, the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

In a possible implementation manner of the seventh aspect, in case that the second downlink subframe set includes only a downlink subframe that is in the second subset but does not belong to the first subset, the channel resource determined by the processing module is the third uplink channel resource; and the sending module is configured to: under control of the processing module, send feedback information of a k-resource-element channel format on the third uplink channel resource, where k is a natural number, and m>k.

The third uplink channel resource may be the same as the first uplink channel resource, and k=n in this case.

It should be noted that the possible implementation manners of the seventh aspect may be used as possible implementation manners of the eighth aspect and the ninth aspect. For brevity, details are not repeatedly described herein. The eighth aspect and the ninth aspect may be the same as the seventh aspect, that is, may be used as new embodiments by replacing the m-resource-element channel format with a q-codebook-size channel format, and the n-resource-element channel format with a p-codebook-size channel format.

With reference to the first possible implementation manner or the second possible implementation manner of the seventh aspect, in a third possible implementation manner, the downlink control information includes resource indication information; and the determining, by the UE, a channel resource includes: determining, by the UE according to the resource indication information, the channel resource used for carrying the feedback information.

With reference to the third possible implementation manner of the seventh aspect, in a fourth possible implementation manner, before the determining, by the UE, a channel resource, the method further includes:

obtaining, by the UE, a second uplink channel resource set that is configured by the access network device, where the second uplink channel resource is an uplink channel resource in the second uplink channel resource set, a part of each uplink channel resource in multiple uplink channel resources included in the second uplink channel resource set constitutes a first uplink channel resource set, and the first uplink channel resource is an uplink channel resource in the first uplink channel resource set.

With reference to the fourth possible implementation manner of the seventh aspect, in a fifth possible implementation manner, the channel resource determined by the UE is the first uplink channel resource; and the determining, by the UE, a channel resource includes: determining, by the UE from the second uplink channel resource set according to the resource indication information, an uplink channel resource indicated by the resource indication information, and determining, by the UE, the first uplink channel resource from the uplink channel resource indicated by the resource indication information; or determining, by the UE, the first uplink channel resource from the first uplink channel resource set according to the resource indication information; or determining, by the UE, the first uplink channel resource according to the resource indication information, where the first uplink channel resource is a part of an uplink channel resource that is in the second uplink channel resource set and that is indicated by the resource indication information.

With reference to the fifth possible implementation manner of the seventh aspect, in a sixth possible implementation manner, the determining, by the UE, a channel resource includes:

determining, by the UE according to identification information of the UE or preconfigured information, the first uplink channel resource in the uplink channel resource indicated by the resource indication information, where the uplink channel resource indicated by the resource indication information is an uplink channel resource in the second uplink channel resource set.

Optionally, the channel resource determined by the UE is the second uplink channel resource; and the determining, by the UE, a channel resource includes: determining the second uplink channel resource from the second uplink channel resource set according to the resource indication information.

With reference to the third possible implementation manner of the seventh aspect, in a seventh possible implementation manner, before the determining, by the UE, a channel resource, the method further includes:

obtaining, by the UE, a first uplink channel resource set and a second uplink channel set that are preconfigured by the access network device, where the first uplink channel resource is an uplink channel resource in the first uplink channel resource set, and the second uplink channel resource is an uplink channel resource in the second uplink channel resource set.

With reference to the seventh possible implementation manner of the seventh aspect, in an eighth possible implementation manner, a first state set of the resource indication information indicates an uplink channel resource in the first uplink channel resource set, a second state set of the resource indication information indicates an uplink channel resource in the second uplink channel resource set, and the first state set does not intersect the second state set.

With reference to the eighth possible implementation manner of the seventh aspect, in a ninth possible implementation manner, the channel resource determined by the UE is the first uplink channel resource, and the determining, by the UE, a channel resource includes: determining, by the UE, the first uplink channel resource from the first uplink channel set according to a state in the first state set of the resource indication information; or the channel resource determined by the UE is the second uplink channel resource, and the determining, by the UE, a channel resource includes: determining, by the UE, the second uplink channel resource for the feedback information from the second uplink channel set according to a state in the second state set of the resource indication information.

With reference to the eighth possible implementation manner of the seventh aspect, in a tenth possible implementation manner, a state of the resource indication information indicates an uplink channel resource in the first uplink channel resource set and/or an uplink channel resource in the second uplink channel resource set.

With reference to the eighth possible implementation manner or the tenth possible implementation manner of the seventh aspect, in an eleventh possible implementation manner, the channel resource determined by the UE is the first uplink channel resource, and the determining, by the UE, a channel resource includes:

determining, by the UE from the first uplink channel resource set according to the resource indication information, a third uplink channel resource indicated by the resource indication information, and determining, from the second uplink channel resource set according to the resource indication information, a fourth uplink channel resource indicated by the resource indication information; determining, by the UE, that the second downlink subframe set is a subset of the first subset; and determining, by the UE, that the third uplink channel resource is the first uplink channel resource; or determining, by the UE, that the second downlink subframe set is a subset of the first subset; and determining, by the UE from the first uplink channel resource set according to the resource indication information, the first uplink channel resource indicated by the resource indication information; or the channel resource determined by the UE is the second uplink channel resource, and the determining, by the UE, a channel resource includes:

determining, by the UE from the first uplink channel resource set according to the resource indication information, a fifth uplink channel resource indicated by the resource indication information, and determining, from the second uplink channel resource set according to the resource indication information, a sixth uplink channel resource indicated by the resource indication information; determining, by the UE, that the second downlink subframe set includes only a downlink subframe that is in the second subset but does not belong to the first subset; and determining, by the UE, that the sixth uplink channel resource is the second uplink channel resource; or determining, by the UE, that the second downlink subframe set includes only a downlink subframe that is in the second subset but does not belong to the first subset; and determining, by the UE from the second uplink channel resource set according to the state of the resource indication information, the second uplink channel resource indicated by the resource indication information; or determining, by the UE from the first uplink channel resource set according to the resource indication information, a fifth uplink channel resource indicated by the resource indication information, and determining, from the second uplink channel resource set according to the resource indication information, a sixth uplink channel resource indicated by the resource indication information; determining, by the UE, that the second downlink subframe set includes a downlink subframe in the first subset and a downlink subframe that is in the second subset but does not belong to the first subset, but does not include a downlink subframe that is not included in the first subset or the second subset; and determining, by the UE, that the sixth uplink channel resource is the second uplink channel resource; or determining, by the UE, that the second downlink subframe set includes a downlink subframe in the first subset and a downlink subframe that is in the second subset but does not belong to the first subset, but does not include a downlink subframe that is not included in the first subset or the second subset; and determining, by the UE from the second uplink channel resource set according to the resource indication information, the second uplink channel resource indicated by the resource indication information.

It should be noted that for configuration of each parameter and execution of each step in this implementation manner, refer to descriptions of the implementation manner above.

In a twelfth possible implementation manner of the seventh aspect, before the determining, by the UE, a channel resource, the method further includes:

obtaining, by the UE, a first uplink channel resource set and a second uplink channel set that are preconfigured by the access network device, where the first uplink channel resource is an uplink channel resource in the first uplink channel resource set, and the second uplink channel resource is an uplink channel resource in the second uplink channel resource set; and the downlink control information includes resource indication information, states of the resource indication information include a first state set and a second state set, the first state set indicates an uplink channel resource in the first uplink channel resource set, the second state set indicates an uplink channel resource in the second uplink channel resource set, and the first state set does not intersect the second state set; and the determining, by the UE, a channel resource includes:

in case that the second downlink subframe set is a subset of the first subset, determining, by the UE from the second uplink channel resource set according to the resource indication information, the second uplink channel resource indicated by the resource indication information.

With reference to any one of the seventh aspect, or the first to the twelfth possible implementation manners of the seventh aspect, in a thirteenth possible implementation manner, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format, where the n-resource-element channel format and the m-resource-element channel format whose time-frequency resources overlap use an orthogonal code.

With reference to any one of the seventh aspect, or the first to the thirteenth possible implementation manners of the seventh aspect, in a fourteenth possible implementation manner, before the determining, by the UE, a channel resource, the method further includes: determining, by the UE, the first subset and the second subset according to a preconfiguration.

With reference to the fourteenth possible implementation manner of the seventh aspect, in a fifteenth possible implementation manner, the preconfiguration is independently performed for different uplink subframes.

According to a tenth aspect, an embodiment of the present disclosure provides a feedback information receiving method, including:

sending, by an access network device, downlink control information to user equipment UE;

sending, by the access network device, a data channel scheduled by using the downlink control information to the UE;

determining, by the access network device, an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset;

determining, by the access network device, a channel resource, where the channel resource is a first uplink channel resource or a second uplink channel resource, the first uplink channel resource corresponds to the first subset, and the second uplink channel resource corresponds to the second subset; and receiving, by the access network device on the channel resource in the uplink subframe, the feedback information sent by using a channel format, where the channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

Same as the foregoing embodiment, for meanings of the p-codebook-size channel format, the q-codebook-size channel format, and a codebook size, refer to descriptions of the foregoing embodiment. The following embodiment based on an m-resource-element channel format and an n-resource-element channel format is completely applicable to this solution of p codebook sizes and q codebook sizes, and details are not repeatedly described below. In the subsequent embodiment, the m-resource-element channel format merely needs to be replaced with the q-codebook-size channel format, and the n-resource-element channel format is replaced with the p-codebook-size channel format.

It should be noted that the p-codebook-size channel format and the q-codebook-size channel format may occupy a same quantity of resource elements, that is, m may be equal to n. Specifically, time-frequency resources on which the same quantity of resource elements are located may overlap or not overlap. In a case of overlapping, the time-frequency resources may partly or completely overlap. Therefore, although all the subsequent embodiments are described by using an m-resource-element channel format and an n-resource-element channel format (where m is greater than n) as an example, the present disclosure is not limited thereto, and m may be equal to n.

Optionally, the p-codebook-size channel format and the q-codebook-size channel format occupy a same quantity of resource elements, and a length of an orthogonal code used by the p-codebook-size channel format is greater than a length of an orthogonal code used by the q-codebook-size channel format.

For the foregoing optional solution, the feedback information receiving method provided in the embodiment according to the tenth aspect includes:

sending, by an access network device, downlink control information to user equipment UE;

sending, by the access network device, a data channel scheduled by using the downlink control information to the UE;

determining, by the access network device, an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset;

determining, by the access network device, a channel resource, where the channel resource is a first uplink channel resource or a second uplink channel resource, the first uplink channel resource corresponds to the first subset, and the second uplink channel resource corresponds to the second subset; and receiving, by the access network device on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a first possible implementation manner of the tenth aspect, the sending, by the access network device, a data channel scheduled by using the downlink control information to the UE includes: sending, by the access network device in a downlink subframe included in a second downlink subframe set, the data channel scheduled by using the downlink control information, where in case that the second downlink subframe set is a subset of the first subset, the channel resource determined by the access network device is the first uplink channel resource; or in case that the second downlink subframe set includes only a downlink subframe that is in the second subset but does not belong to the first subset, the channel resource determined by the access network device is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

In a second possible implementation manner of the tenth aspect, the sending, by the access network device, a data channel scheduled by using the downlink control information to the UE includes: sending, by the access network device in a downlink subframe included in a second downlink subframe set, the data channel scheduled by using the downlink control information, where in case that the second downlink subframe set is a subset of the first subset, the channel resource determined by the access network device is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

The foregoing first possible implementation manner and the foregoing second possible implementation manner may be used as separate solutions, such as an eleventh aspect and a twelfth aspect, independently of the foregoing embodiment according to the tenth aspect.

According to an eleventh aspect, an embodiment of the present disclosure provides an access network device, including:

sending, by an access network device, downlink control information to user equipment UE;

sending, by the access network device in a downlink subframe included in a second downlink subframe set, a data channel scheduled by using the downlink control information to the UE;

determining, by the access network device, an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset;

determining, by the access network device, a channel resource, where in case that the second downlink subframe set is a subset of the first subset, the channel resource determined by the access network device is the first uplink channel resource; or in case that the second downlink subframe set includes only a downlink subframe that is in the second subset but does not belong to the first subset, the channel resource determined by the access network device is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource; and receiving, by the access network device on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

According to a twelfth aspect, an embodiment of the present disclosure provides an access network device, including:

sending, by an access network device, downlink control information to user equipment UE;

sending, by the access network device in a downlink subframe included in a second downlink subframe set, a data channel scheduled by using the downlink control information to the UE;

determining, by the access network device, an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset;

determining, by the access network device, a channel resource, where in case that the second downlink subframe set is a subset of the first subset, the channel resource determined by the access network device is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource; and receiving, by the access network device on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

In a possible implementation manner of the twelfth aspect, in case that the second downlink subframe set includes only a downlink subframe that is in the second subset but does not belong to the first subset, the channel resource determined by the processing module is the third uplink channel resource; and the sending module is configured to: under control of the processing module, send feedback information of a k-resource-element channel format on the third uplink channel resource, where k is a natural number, and m>k.

The third uplink channel resource may be the same as the first uplink channel resource, and k=n in this case.

It should be noted that the possible implementation manners of the tenth aspect may be used as possible implementation manners of the eleventh aspect and the twelfth aspect. For brevity, details are not repeatedly described herein. The eleventh aspect and the twelfth aspect may be the same as the tenth aspect, that is, may be used as new embodiments by replacing the m-resource-element channel format with a q-codebook-size channel format, and the n-resource-element channel format with a p-codebook-size channel format.

With reference to the first possible implementation manner or the second possible implementation manner of the tenth aspect, in a third possible implementation manner, the downlink control information includes resource indication information, and the resource indication information is used to indicate the first uplink channel resource or the second uplink channel resource used for carrying the feedback information.

With reference to the third possible implementation manner of the tenth aspect, in a fourth possible implementation manner, before the determining, by the access network device, a channel resource, the method further includes:

sending, by the access network device, information about a second uplink channel resource set to the UE, where the second uplink channel resource is an uplink channel resource in the second uplink channel resource set, a part of each uplink channel resource in multiple uplink channel resources in the second uplink channel resource set constitutes a first uplink channel resource set, and the first uplink channel resource is an uplink channel resource in the first uplink channel resource set.

With reference to the fourth possible implementation manner of the tenth aspect, in a fifth possible implementation manner, the channel resource determined by the access network device is the first uplink channel resource, and the resource indication information indicates an uplink channel resource that is in the second uplink channel resource set and that includes the first uplink channel resource; or the resource indication information indicates the first uplink channel resource in the first uplink channel resource set; or the channel resource determined by the access network device is the second uplink channel resource, and the resource indication information indicates the second uplink channel resource in the second uplink channel resource set.

With reference to the fourth possible implementation manner of the tenth aspect, in a fifth possible implementation manner, the resource indication information indicates the uplink channel resource that is in the second uplink channel resource set and that includes the first uplink channel resource; and the determining, by the access network device, a channel resource includes:

determining, by the access network device according to identification information of the UE or preconfigured information, the first uplink channel resource in the uplink channel resource indicated by the resource indication information.

With reference to the third possible implementation manner of the tenth aspect, in a seventh possible implementation manner, before the determining, by the access network device, a channel resource, the method further includes:

sending, by the access network device, information about a first uplink channel resource set and information about a second uplink channel set to the UE, where the first uplink channel resource is an uplink channel resource in the first uplink channel resource set, and the second uplink channel resource is an uplink channel resource in the second uplink channel resource set.

With reference to the seventh possible implementation manner of the tenth aspect, in an eighth possible implementation manner, a first state set of the resource indication information indicates an uplink channel resource in the first uplink channel resource set, a second state set of the resource indication information indicates an uplink channel resource in the second uplink channel resource set, and the first state set does not intersect the second state set.

With reference to the seventh possible implementation manner of the tenth aspect, in a ninth possible implementation manner, a state of the resource indication information indicates an uplink channel resource in the first uplink channel resource set and/or an uplink channel resource in the second uplink channel resource set.

With reference to any one of the fourth to the seventh possible implementation manners, or the ninth possible implementation manner of the tenth aspect, in a tenth possible implementation manner, the receiving, by the access network device on the channel resource in the uplink subframe, the feedback information sent by using a channel format includes: receiving, by the access network device on the second uplink channel resource indicated by the resource indication information in the uplink subframe, the feedback information sent by using the m-resource-element channel format.

With reference to the eleventh possible implementation manner of the tenth aspect, in an eleventh possible implementation manner, after the receiving, by the access network device on the channel resource in the uplink subframe, the feedback information sent by using a channel format, the method further includes:

determining, by the access network device, a first uplink channel resource in the second uplink channel resource according to the identification information of the UE or the preconfigured information, and receiving, on the first uplink channel resource, the feedback information sent by using the n-resource-element channel format; or determining, by the access network device, a first uplink channel resource in the first uplink channel resource according to the resource indication information, and receiving, on the first uplink channel resource, the feedback information sent by using the n-resource-element channel format.

With reference to any one of the tenth aspect, or the first to the eleventh possible implementation manners of the tenth aspect, in a twelfth possible implementation manner, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format, where the n-resource-element channel format and the m-resource-element channel format whose time-frequency resources overlap use an orthogonal code.

With reference to any one of the first to the twelfth possible implementation manners of the tenth aspect, in a thirteenth possible implementation manner, before the determining, by the access network device, a channel resource, the method further includes: determining, by the access network device, the first subset and the second subset according to a preconfiguration.

With reference to the thirteenth possible implementation manner of the tenth aspect, in a fourteenth possible implementation manner, the preconfiguration is independently performed for different uplink subframes.

According to the foregoing embodiments, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in the embodiments of the present disclosure, resource overheads can be reduced when feedback information such as an ACK/NACK is fed back.

DESCRIPTION OF EMBODIMENTS

Figure 1:
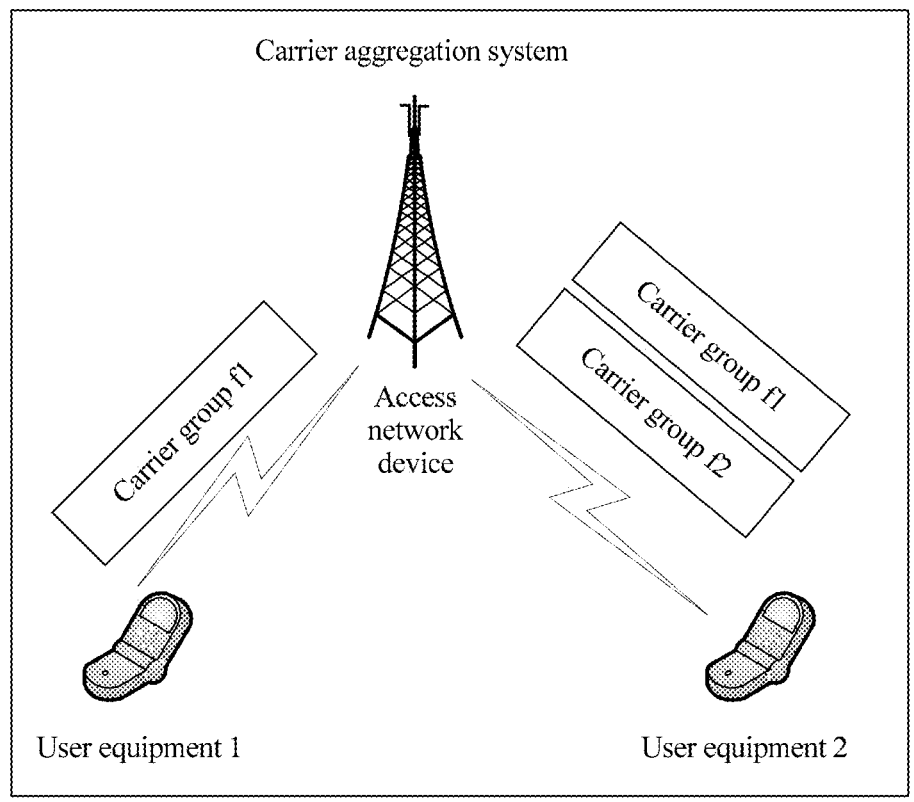
FIG. 1 is a schematic diagram of an application scenario according to an embodiment of the present disclosure.

In a current LTE system, in case that a PUCCH sending mode of a PUCCH format 3 is configured, assuming that five FDD downlink carriers are configured, specifically, data scheduling and a PUCCH channel resource indication manner are as follows:

If UE receives only a PDCCH for scheduling a PDSCH on a primary component carrier, the UE feeds back an ACK/NACK by using a PUCCH format 1a/1b, and a channel resource of the PUCCH format 1/1b is implicitly indicated by using a control channel element (CCE) number of the PDCCH. In case that UE receives at least a PDCCH for scheduling a PDSCH on a secondary component carrier, the UE feeds back an ACK/NACK by using a PUCCH format 3. A channel resource of the PUCCH format 3 is explicitly indicated by using a 2-bit field on the PDCCH for scheduling the PDSCH on the secondary component carrier. The 2-bit field may be referred to as a channel resource indication field. Specifically, a base station allocates four PUCCH format 3 channel resources to the UE by using radio resource control (RRC) signaling in advance, and a specific channel resource among the four channel resources that is used for each time of scheduling is indicated by using the 2-bit field on the PDCCH for scheduling the PDSCH on the secondary component carrier.

An ACK/NACK feedback of a TDD single carrier is further supported in a current PUCCH format 3 mode. A specific procedure is as follows: If UE receives only a PDCCH for scheduling a PDSCH on a primary component carrier, and a value indicated by a downlink assignment index (DAI) field on the PDCCH is '1', the UE feeds back an ACK/NACK by using a PUCCH format 1/1b, and a channel resource of the PUCCH format 1/1b is implicitly indicated by using a CCE number of the PDCCH. If UE receives a PDCCH for scheduling a PDSCH on a primary component carrier, and a value indicated by a DAI field on the PDCCH is greater than '1', the UE feeds back an ACK/NACK by using a PUCCH format 3, and a channel resource of the PUCCH format 3 is explicitly indicated by using a 2-bit field on the PDCCH.

The foregoing ACK/NACK is transmitted by using the PUCCH format 1/1b, so as to reduce overheads of the PUCCH format 3. Because code division multiplexing can be performed only for five UEs in one RB by using the PUCCH format 3, but code division multiplexing can be performed for a maximum of 36 UEs in one RB by using the PUCCH format 1/1b, resource overheads of the PUCCH format 3 are reduced as much as possible.

The following describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be noted that provided that no conflict occurs, the embodiments of the present disclosure and features in the embodiments may be mutually combined.

FIG. 1 shows an application scenario according to an embodiment of the present disclosure. In FIG. 1, an LTE system is used as an example for description, but this embodiment of the present disclosure is not limited to the LTE system.

As shown in FIG. 1, an LTE communications system includes an access network device and user equipment. The access network device may configure multiple carriers for UE to increase a data rate of the UE, so as to implement CA, or may configure only one carrier for UE. The carrier herein refers to a carrier group in FIG. 1, and one carrier group includes one uplink carrier and one downlink carrier. For example, in FIG. 1, the access network device configures two carriers for user equipment 2, and configures one carrier for user equipment 1.

It should be understood that in the embodiments of the present disclosure, the user equipment may also be referred to as a terminal, a terminal equipment, a mobile station (MS), a mobile terminal, or the like. The user equipment may communicate with one or more core networks by using a radio access network (RAN). For example, the user equipment may be a mobile phone (or referred to as a cellular phone), or a computer with a mobile terminal. For example, the user equipment may be a portable, pocket-sized, handheld, computer built-in, or in-vehicle mobile apparatus, and exchanges voice and/or data with the radio access network.

In the embodiments of the present disclosure, the access network device may be a base station, an enhanced base station, a relay with a scheduling function, or the like. The base station may be an evolved NodeB (eNB or e-NodeB) in the LTE system, or may be a base station in another system, such as an evolved system of the LTE system. This is not limited in the embodiments of the present disclosure. The subsequent embodiments are described by using the base station as an example, but it does not indicate that the embodiments of the present disclosure are limited only to the base station.

It should be noted that, for specific functions performed by the user equipment and the access network device included in the system in this embodiment, refer to descriptions of the subsequent embodiments.

Figure 2:
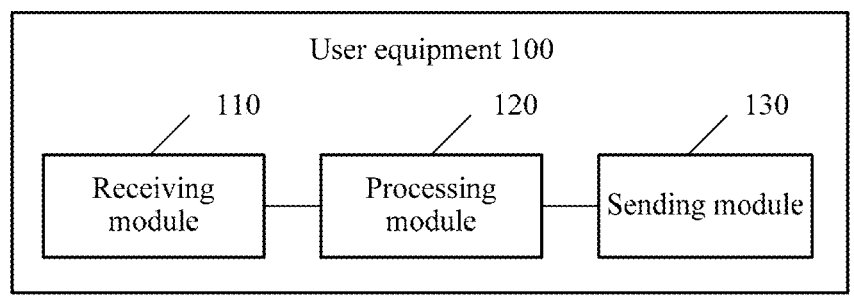
FIG. 2 is a schematic structural diagram of user equipment according to an embodiment of the present disclosure.

FIG. 2 shows a schematic structural diagram of user equipment 100 according to an embodiment of the present disclosure. As shown in FIG. 2, the user equipment 100 includes a receiving module 110, a processing module 120, and a sending module 130.

Figure 3:
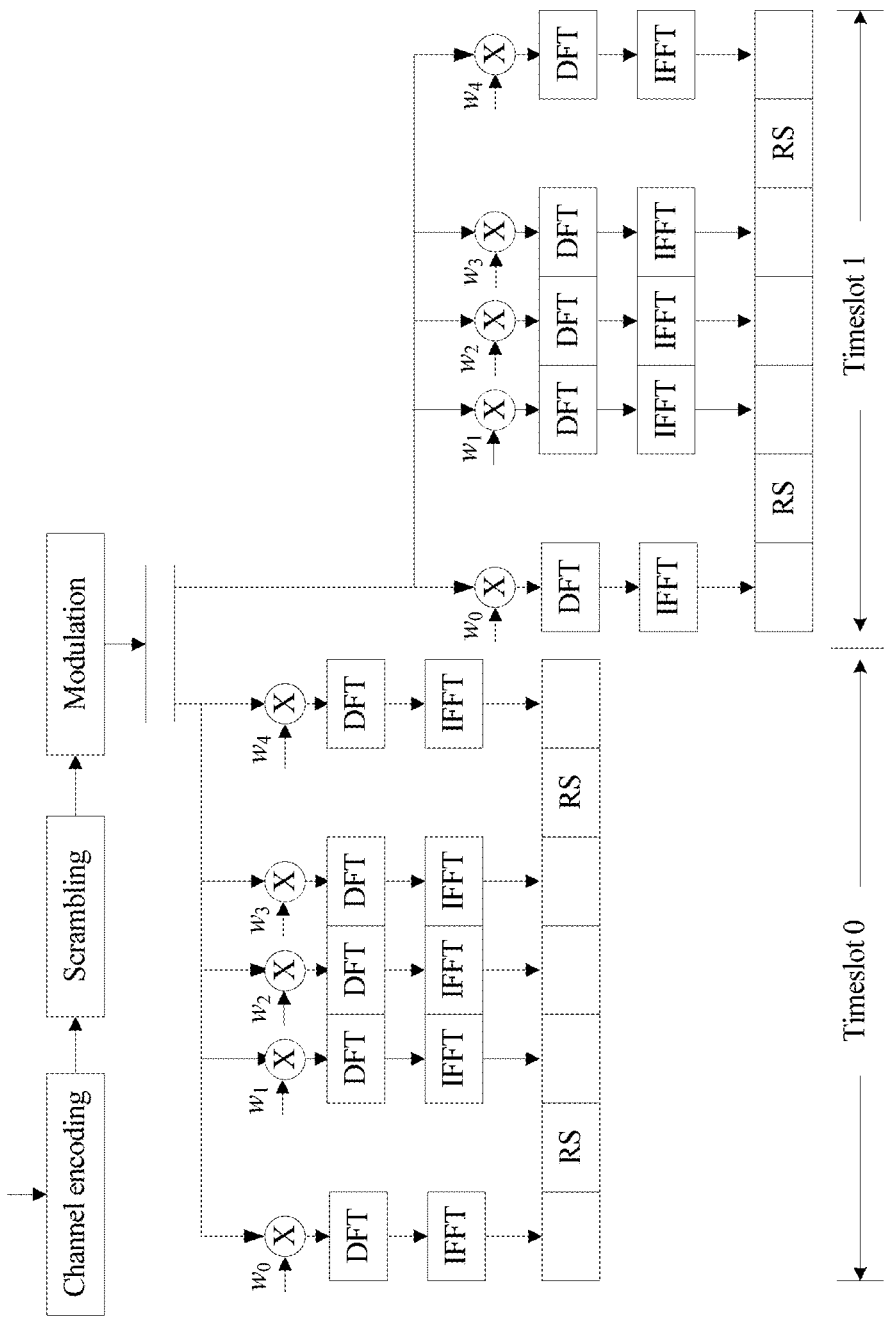
FIG. 3 is a diagram of a channel structure for feeding back an ACK/NACK by using a PUCCH format 3 according to an embodiment of the present disclosure.

When the user equipment 100 feeds back an ACK/NACK by using a PUCCH format 3, a DFT-S-OFDM transmission manner may be used. A channel structure for feeding back the ACK/NACK by using the PUCCH format 3 is shown in FIG. 3, and the channel structure may be implemented by the processing module 120. Specifically, Reed Muller (RM) channel encoding is performed on original ACK/NACK bits such as 20 bits to generate 48 bits, the encoded bits are scrambled, and then the scrambled bits are modulated into 24 quadrature phase shift keying (QPSK) symbols, which are equally placed in two timeslots of one subframe. In this way, there are 12 QPSK symbols in each timeslot, and the 12 QPSK symbols are placed on 12 consecutive subcarriers of one time-domain symbol in one timeslot, that is, the 12 QPSK symbols occupy 12 subcarriers of one time-domain symbol on one resource block (RB). Then, for each timeslot, spectrum spread is performed by using a sequence w with a length-5 orthogonal cover code (OCC) in a time domain. The OCC occupies five time-domain symbols on one RB in one timeslot, code division multiplexing may be performed for different UEs on one RB by using different OCCs, and other two symbols are used for carrying a reference signal (RS). Then, DFT precoding and inverse fast Fourier transform (IFFT) are performed on a signal obtained by means of spectrum spread.

To support transmission of more than 20 ACK/NACK bits, a method is to expand a current capacity of the PUCCH format 3, for example, from one RB to multiple RBs. Specifically, a dual-RB PUCCH format 3 is used as an example. In this way, in the foregoing channel format, there are 40 original ACK/NACK bits, and 12 subcarriers occupied in each timeslot only need to be expanded into 24 subcarriers occupied in each timeslot without time-domain OCC spectrum spread. In this way, the dual-RB PUCCH format 3 can proportionally support a feedback of the 40 ACK/NACK bits, and can further support CA of more carriers (such as ten carriers). A case in which one RB is expanded into three RBs or more RBs is similar, and expansion needs to be performed only in a frequency domain.

However, due to a limited multiplexing capability of a single-RB PUCCH format 3, overheads of the single-RB PUCCH format 3 are higher than those of a PUCCH format 1/1b. When the single-RB PUCCH format 3 is expanded into a multi-RB PUCCH format 3, overheads may be even higher because a multiplexing capability of the multi-RB PUCCH format 3 is the same as that of the single-RB PUCCH format 3, but occupied resources double with RB expansion.

The dual-RB PUCCH format 3 is used as an example. Assuming that CA of ten carriers is supported, that is, if ten carriers are scheduled, the dual-RB PUCCH format 3 is used. However, after ten carriers are configured for UE, not all of the ten carriers in each subframe are scheduled, but instead with multiple factors considered, several specific carriers in the ten carriers are scheduled for the UE for data transmission. Specifically, a quantity of to-be-scheduled carriers may be determined according to current service load. However, even if there is a scheduling requirement, a capacity of a PDCCH resource area further needs to be considered. If a PDCCH capacity of the UE is already insufficient for scheduling, data on a corresponding carrier cannot be scheduled. Therefore, even if ten carriers are configured for the UE, only some carriers in a subframe may need to be scheduled for data transmission. In addition, not all downlink subframes on one carrier are scheduled for the UE in actual scheduling. Therefore, optimization of overheads of the PUCCH format 3 may be considered, to reduce the overheads as much as possible.

Based on a solution in which a single-RB PUCCH format 3 is expanded into a PUCCH format 3 of at least two RBs, in this embodiment of the present disclosure solution, overheads of a PUCCH format 3 are optimized according to a dynamically scheduled downlink subframe and/or carrier. A specific solution is as follows:

User equipment UE receives downlink control information sent by an access network device.

The UE receives a data channel scheduled by using the downlink control information.

The UE determines an uplink subframe used for sending feedback information corresponding to the data channel. A first downlink subframe set associated with the uplink subframe includes a first subset and a second subset, the first subset includes at least two downlink subframes, and the first subset is a proper subset of the second subset.

The UE determines a channel resource. The channel resource is a first uplink channel resource or a second uplink channel resource, the first uplink channel resource corresponds to the first subset, and the second uplink channel resource corresponds to the second subset.

The UE sends the feedback information on the channel resource in the uplink subframe by using a channel format. The channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

The p-codebook-size channel format means that the channel format can support a feedback of an ACK/NACK of a maximum of p codebook sizes, and the q-codebook-size channel format means that the channel format can support a feedback of an ACK/NACK of a maximum of q codebook sizes. A codebook size refers to a quantity of original unencoded ACK/NACK bits. Specifically, the p codebook sizes correspond to the first subset, and the q codebook sizes correspond to the second subset. That is, the p codebook sizes are determined according to a quantity of downlink subframes in the first subset, and the q codebook sizes are determined according to a quantity of downlink subframes in the second subset.

Optionally, a channel resource occupied by the p-codebook-size channel format includes n resource elements, a channel resource occupied by the q-codebook-size channel format includes m resource elements, m and n are natural numbers, and m is greater than or equal to n. In this way, the p-codebook-size channel format may also be considered as an n-resource-element channel format, and the q-codebook-size channel format may also be considered as an m-resource-element channel format. When m is greater than n, the following embodiment based on an m-resource-element channel format and an n-resource-element channel format is completely applicable to this solution of p codebook sizes and q codebook sizes. In this case, in descriptions of the following embodiment, the n-resource-element channel format may be directly replaced with the p-codebook-size channel format, and the m-resource-element channel format may be directly replaced with the q-codebook-size channel format.

In addition, the p-codebook-size channel format and the q-codebook-size channel format are further applicable to a case in which m is equal to n. In this case, descriptions of the following embodiment are also applicable to a case in which the n-resource-element channel format is directly replaced with the p-codebook-size channel format, and the m-resource-element channel format is directly replaced with the q-codebook-size channel format, but in this case, m=n instead of m>n.

Therefore, optionally, in an embodiment, the p-codebook-size channel format and the q-codebook-size channel format occupy a same quantity of resource elements, and a length of an orthogonal code used by the p-codebook-size channel format is greater than a length of an orthogonal code used by the q-codebook-size channel format.

In the subsequent embodiments, the n-resource-element channel format and the m-resource-element channel format (where m>n) are used as an example for description. However, it should be noted that the embodiments of the present disclosure are not limited thereto. The embodiments of the present disclosure may be applied to a case of the p-codebook-size channel format and the q-codebook-size channel format (where q>p) and a case of the n-resource-element channel format and the m-resource-element channel format (where m=n).

In the user equipment 100 in this embodiment, the receiving module 110 and the sending module 130 are coupled to the processing module 120. The user equipment 100 may further include a storage module and another component.

The receiving module 110 is configured to: receive downlink control information sent by an access network device, and receive a data channel scheduled by using the downlink control information.

The processing module 120 is configured to: determine an uplink subframe used for sending feedback information corresponding to the data channel that is received by the receiving module 110, and determine a channel resource. A first downlink subframe set associated with the uplink subframe includes a first subset and a second subset, the first subset includes at least two downlink subframes, the first subset is a proper subset of the second subset, the channel resource is a first uplink channel resource or a second uplink channel resource, the first uplink channel resource corresponds to the first subset, and the second uplink channel resource corresponds to the second subset.

The sending module 130 is configured to: under control of the processing module 120, send the feedback information on the channel resource in the uplink subframe by using a channel format. The channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

The receiving module 110 receives the downlink control information by using a downlink control channel. For example, the receiving module 110 receives the downlink control information by using a PDCCH, or receives the downlink control information by using an enhanced PDCCH (ePDCCH). The control channel is a control channel for scheduling a data channel on a secondary component carrier, and/or the control channel is a control channel for scheduling a data channel on a primary component carrier.

The feedback information in this embodiment of the present disclosure may be an ACK/NACK. Certainly, the feedback information may be other feedback information, and the feedback information can indicate whether data carried on the data channel is received.

The uplink subframe determined by the processing module 120 is determined according to a preconfiguration. For example, the access network device sends an uplink-downlink subframe configuration to the UE in advance. The processing module 120 can determine, according to the uplink-downlink subframe configuration preconfigured by the access network device, the uplink subframe used for sending the feedback information. Therefore, the UE in this embodiment of the present disclosure further includes the storage module, configured to store the preconfiguration sent by the access network device to the UE.

ACKs/NACKs corresponding to scheduled data channels in downlink subframes associated with the uplink subframe need to be fed back in the uplink subframe. These downlink subframes are determined according to a preconfigured time sequence or timing correspondence between a downlink subframe and an uplink subframe, that is, according to the preconfigured uplink-downlink subframe configuration. For example, a downlink subframe associated with an uplink subframe may be determined according to Table 2.

In this embodiment of the present disclosure, all downlink subframes that are associated with the uplink subframe used for feeding back ACKs/NACKs are referred to as the first downlink subframe set, and the first downlink subframe set includes at least two subsets, that is, the first subset and the second subset. All the downlink subframes are all downlink subframes that are on all carriers configured for the UE and for which an ACK/NACK feedback is configured in the uplink subframe. For example, if 15 carriers are configured by the access network device for the UE, and a same uplink-downlink subframe configuration 2 (for details, refer to Table 1 and Table 2) is configured for the 15 carriers, the uplink subframe is a subframe 2, and all the downlink subframes associated with the uplink subframe, that is, the first downlink subframe set, include downlink subframes 4, 5, 6, and 8 on the 15 carriers. This embodiment is described by using an example in which the first downlink subframe set includes two subsets, but is not limited to two sets. The first subset includes at least two downlink subframes, and the first subset is a proper subset of the second subset, that is, the first subset includes some downlink subframes in the first downlink subframe set. The second subset may include all downlink subframes in the first downlink subframe set, or may include only some downlink subframes in the first downlink subframe set. For a downlink subframe that is in the first downlink subframe set but does not belong to the second subset, refer to a method for determining the first subset and the second subset in this embodiment of the present disclosure.

It should be noted that this embodiment of the present disclosure is not limited to the foregoing two subsets, and there may be more than two subsets. For example, if 15 carriers are configured for the UE, and downlink subframes corresponding to these carriers may be grouped into three subsets, or four subsets. Certainly, there may be more sets.

It should be further noted that a subset in this embodiment of the present disclosure may be a part of a universal set, or may be a universal set. For example, in this embodiment of the present disclosure, if A is a subset of B, A may include some elements in B, or may include all elements in B. However, in this embodiment, if A is a proper subset of B, A includes only some elements in B.

Further, the UE may determine the first subset and the second subset according to a preconfiguration. For example, in TDD CA, it is assumed herein that subframes with a same subframe number on different carriers are different downlink subframes, and a TDD special subframe may be classified as a downlink subframe because downlink data can be transmitted in the special subframe but uplink data cannot be transmitted in the special subframe. For example, if the first subset includes downlink subframes 4, 5, 6, and 8 on carriers 1 to 5, and the second subset includes downlink subframes 4, 5, 6, and 8 on carriers 1 to 10, it can be learned that the second subset completely includes the first subset. In this embodiment, there may further be a third subset, which specifically includes downlink subframes 4, 5, 6, and 8 on carriers 1 to 15, that is, the third subset includes all preconfigured downlink subframes that are associated with ACKs/NACKs fed back in an uplink subframe and that are configured for the UE. That is, the third set is a universal set, that is, the foregoing first downlink subframe set. However, it can be learned that a relationship between the first subset and the second subset is structurally similar to both a relationship between the second subset and the third subset and a relationship between the first subset and the third subset. Therefore, the solution in this embodiment of the present disclosure may be directly extended to the second subset and the third subset, and the first subset and the third subset. Certainly, there may be another manner this embodiment of the present disclosure, and details are not described herein.

Optionally, the UE may determine the first subset and the second subset by using a preconfigured rule. There may be multiple preconfigured rules, and this is not limited in this embodiment of the present disclosure.

For example, the preconfigured rule may be a manner based on the preconfigured rule in which the first subset and the second subset are determined according to an ACK/NACK bit quantity threshold (such as 20 bits, 21 bits, or 22 bits) and at least one of a carrier number or a frame number. In this way, the UE determines that the first subset includes downlink subframes 4, 5, 6, and 8 on carriers 1 to 5, and the second subset includes downlink subframes 4, 5, 6, and 8 on carriers 1 to 10. In a method for selecting the first subset, all downlink subframes on a carrier 1 are first selected according to a sequence of time-domain subframe numbers, and then based on a frequency-domain carrier number, downlink subframes on a carrier 2 are selected, and selection continues until a quantity, limited by the threshold, of downlink subframes is reached. A manner of selecting the second subset is similar to that of selecting the first subset. For another example, it is assumed that the foregoing threshold is 10. Still in an example in which there are five carriers and each carrier has a subframe configuration 2, a set division manner is as follows: The first subset includes downlink subframes 4, 5, 6, and 8 on carriers 1 and 2 and downlink subframes 4 and 5 on a carrier 3. In addition to all downlink subframes in the first subset, the second subset includes downlink subframes 6 and 8 on the carrier 3, and downlink subframes 4, 5, 6, and 8 on carriers 3 and 4. In this case, different subframes on one carrier may be grouped into different downlink subframe sets. It can be learned that in this example, the first subset and the second subset are still selected first according to a time-domain subframe number and then according to a frequency-domain carrier number.

For another example, the preconfigured rule may be as follows: Downlink subframes on a maximum quantity of carriers are determined as a set according to a carrier number, a subframe number, and a threshold, where the maximum quantity does not exceed the threshold. In this rule, because different subframes on a same carrier cannot be grouped into multiple sets that do not completely intersect, a quantity of downlink subframes in a set may be less than the foregoing threshold. For example, the first subset includes downlink subframes 4, 5, 6, and 8 on carriers 1 and 2. In addition to all downlink subframes in the first subset, the second subset includes downlink subframes 4, 5, 6, and 8 on carriers 3 to 5.

For another example, the preconfigured rule may be: with reference to a threshold, the first subset and the second subset are selected first according to a frequency-domain carrier number and then according to a time-domain subframe number.

It can be learned that there may be multiple preconfigured rules. Any preconfigured rule that can achieve an objective in this embodiment of the present disclosure can be used in this embodiment of the present disclosure, and details are not described herein.

Optionally, the UE may determine the first subset and the second subset by using signaling sent by the access network device. The access network device may notify the UE of a division rule by using signaling, or may directly notify the UE of the first subset and the second subset. Certainly, the UE may determine the first subset and the second subset in another manner.

Further, in this embodiment of the present disclosure, the first subset corresponds to the first uplink channel resource, and the sending module 130 adds the feedback information of the n-resource-element channel format to the first uplink channel resource by using the n-resource-element channel format; the second subset corresponds to the second uplink channel resource, and the sending module 130 adds the feedback information of the m-resource-element channel format to the second uplink channel resource by using the m-resource-element channel format; and m and n are natural numbers, and m>n. During each feedback, feedback information is sent on a corresponding channel resource by using only one channel format. That is, for a large subset, feedback information is sent by using a large resource format, and for a small subset, feedback information is sent by using a small resource format.

A resource element in the m-resource-element channel format and the n-resource-element channel format may include any one of a resource block (RB), a resource block pair, a sub resource block, or a sub resource block pair. For example, if the resource element is an RB, there are m RBs and n RBs, where n may be 1, and m is a natural number greater than 1. A sub resource block is a part of a resource block. A frequency-domain width of a sub RB may be less than a frequency-domain width of an RB. For example, a sub RB occupies four subcarriers, and occupies one timeslot or one subframe in a time domain. Alternatively, a time-domain width of a sub RB may be less than a timeslot. For example, a sub RB occupies three time-domain symbols, and occupies 12 subcarriers in a frequency domain, that is, a frequency-domain width of one RB. Alternatively, a sub RB occupies a smaller frequency-domain width and a smaller time-domain width than a current RB in both the time domain and the frequency domain. A sub resource block pair is a pair of sub resource blocks.

When m is greater than n, the foregoing embodiment based on an m-resource-element channel format and an n-resource-element channel format, including descriptions about a first downlink subframe set, a first subset, a second subset, and the like, is completely applicable to this solution of p codebook sizes and q codebook sizes. In addition, the p-codebook-size channel format and the q-codebook-size channel format are further applicable to a case in which m is equal to n. Details are as follows:

When m is equal to n, that is, time-frequency resources occupied by the two channel formats have a same quantity of resource elements, such as one RB, or time-frequency resources occupied by the two channel formats completely overlap. In this case, the q-codebook-size channel format or the m-resource-element channel format may feed back more ACK/NACK codebooks than the p-codebook-size channel format or the n-resource-element channel format because a length of an orthogonal code used by the former is less than a length of an orthogonal code used by the latter. A codebook size is increased by reducing multiplexing efficiency of a same time-frequency resource.

In an example of a PUCCH format 3, it is assumed that time-frequency resources of the PUCCH format 3 on an RB are occupied by two formats, but a length of a time-domain orthogonal code of the p-codebook-size channel format is 5, that is, p-codebook-size channel formats of a maximum of five UEs can be multiplexed on the RB. It is assumed that lengths of time-domain orthogonal codes of the q-codebook-size channel format are 2 and 3, that is, spectrum spread is performed on the first two ACK/NACK symbols by using a length-2 time-domain orthogonal code, and spectrum spread is performed on the last three ACK/NACK symbols by using a length-3 time-domain orthogonal code. Assuming that other two symbols in this timeslot are used for transmission of an uplink demodulated pilot, q-codebook-size channel formats of two UEs can be accommodated on the RB in this case. However, an ACK/NACK codebook size supported by the q-codebook-size channel format is two times an ACK/NACK codebook size supported by the p-codebook-size channel format because spectrum spread is performed by using two groups of time-domain orthogonal codes in the q-codebook-size channel format. A code length of each group of time-domain orthogonal codes is less than the length 5 of the time-domain orthogonal code used by the p-codebook-size channel format, and a multiplexing capability is determined by a time-domain orthogonal code having a shorter length in the two groups of time-domain orthogonal codes. For a length of an orthogonal code, assuming that a group of orthogonal codes are {(1, 1), (1, −1)}, a length of the orthogonal code is 2 in this case, and there are a maximum of two orthogonal codes in this group of orthogonal codes having a code length 2. Alternatively, assuming that another group of orthogonal codes are {(1, 1, 1, 1), (1, 1, −1, −1), (1, −1, −1, 1), (1, −1, 1, −1)}, a code length of the orthogonal code is 4 in this case, and there are a maximum of four orthogonal codes in this group of orthogonal codes having a code length 4.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

The following using a single-RB PUCCH format 3 and a dual-RB PUCCH format 3 as an example for description, that is, n is 1 and m is 2. Certainly, this embodiment may be further applied to a PUCCH format 3 of more RBs. In addition, this solution may be extended to a PUCCH format of another resource element, such as a dual-RB PUCCH format and a quad-RB PUCCH format, or PUCCH formats of different quantities of sub RBs. Therefore, the single-RB PUCCH format 3 and the dual-RB PUCCH format 3 in this embodiment may be extended to an m-resource-element PUCCH format and an n-resource-element PUCCH format. Both m and n are natural numbers, and m>n.

Therefore, in this embodiment of the present disclosure, a module for channel encoding may encode original bits in feedback information of a small resource format, such as 20 ACK/NACK bits; or may encode original bits in feedback information of a large resource format, such as 40 ACK/NACK bits or 60 ACK/NACK bits. Encoding may be implemented by one or more channel encoders. The channel encoder may be a unit in a processor, or may be an independent channel encoder.

Further, it is configured that the receiving module 110 receives, in the following manner, the data channel scheduled by using the downlink control information: receiving, in a downlink subframe included in a second downlink subframe set, the data channel scheduled by using the downlink control information.

In this embodiment, the UE receives the downlink control information and then determines a to-be-scheduled downlink subframe according to the downlink control information. The to-be-scheduled downlink subframe constitutes the second downlink subframe set, and the second downlink subframe set is a subset of the first downlink subframe set. There may be one or more to-be-scheduled downlink subframes. When there is one to-be-scheduled downlink subframe, the downlink subframe may be a downlink subframe on a secondary component carrier, or may be a downlink subframe that is on a primary component carrier and that is scheduled by using a control channel with a downlink assignment index (DAI) field value greater than 1, but not a downlink subframe that is used for scheduling a PDSCH on a primary component carrier and that corresponds to a PDCCH with a DAI field '1'.

Optionally, the second downlink subframe set may be a subframe set associated with the foregoing uplink subframe, and downlink subframes on all carriers currently activated for the UE constitute the subframe set. A downlink subframe actually scheduled for the UE belongs to a subset of the activated second downlink subframe set. It can be understood that the first downlink subframe set is a subframe set associated with the uplink subframe used for sending the feedback information, and the first downlink subframe set is configured for the UE by using radio resource control (RRC) signaling. The activated second downlink subframe set is a subset of the first downlink subframe set, and is configured for the UE by using Media Access Control (MAC) signaling. The downlink subframe actually scheduled for the UE is a downlink subframe in the second downlink subframe set. However, this embodiment of the present disclosure is described by using an example in which the second downlink subframe set is an actually scheduled downlink subframe set, but may also be applicable to a case in which the second downlink subframe set is the foregoing activated downlink subframe set.

In this embodiment, although 15 carriers are configured for the UE, and a maximum of 60 ACK/NACK bits need to be fed back on an uplink subframe 2, a quantity of carriers or downlink subframes scheduled for the UE in a subframe may be less than the foregoing maximum value, such as 60 subframes on the 15 carriers in this embodiment. The quantity of carriers or subframes scheduled for the UE is specifically related to multiple factors such as instantaneous service load of the UE and a capacity of a control channel.

After determining the uplink subframe, the processing module 120 further determines the channel resource. When relationships between the second downlink subframe set and the first subset, the second subset, and the first downlink subframe set are different, determined channel resources are different, and used PUCCH formats may also be different.

When m is greater than n, the foregoing embodiment based on an m-resource-element channel format and an n-resource-element channel format, including descriptions about a second downlink subframe set and the like, is completely applicable to this solution of p codebook sizes and q codebook sizes. In addition, the p-codebook-size channel format and the q-codebook-size channel format are further applicable to a case in which m is equal to n.

Further, the downlink control information includes resource indication information.

It is configured that the processing module 120 determines the channel resource in the following manner: determining, according to the resource indication information, the channel resource used for carrying the feedback information.

It should be noted that, a DAI in the downlink control information including the resource indication information is not 1. For example, the DAI is greater than 1. Alternatively, in an FDD CA system, because downlink control information does not have a DAI field, downlink control information used for scheduling a primary component carrier does not have the foregoing resource indication information, and only downlink control information used for scheduling a secondary component carrier has the foregoing resource indication information.

Optionally, the resource indication information may be an explicit bit in the downlink control information. For example, at least one bit on a control channel is used as the resource indication information, and different states of the at least one bit instruct to use different PUCCH channel resources. Optionally, the resource indication information may be an implicit indication manner. For example, different scrambling codes on a control channel indicate different channel resources. Specifically, the resource indication information may be an ACK/NACK resource indicator (ARI).

When m is greater than n, the following embodiment based on an m-resource-element channel format and an n-resource-element channel format, including a method for indicating a channel resource by using resource indication information, is completely applicable to this solution of p codebook sizes and q codebook sizes. In addition, the p-codebook-size channel format and the q-codebook-size channel format are further applicable to a case in which m is equal to n.

For the channel resource in this embodiment of the present disclosure, two specific solutions are provided below.

Solution 1

In case that the second downlink subframe set is a subset of the first subset, the channel resource determined by the processing module 120 is the first uplink channel resource; or in case that the second downlink subframe set includes only a downlink subframe that is in the second subset but does not belong to the first subset, the channel resource determined by the processing module 120 is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module 120 is the second uplink channel resource.

This embodiment is described by using an example in which the n-resource-element channel format is a single-RB PUCCH format and the m-resource-element channel format is a dual-RB PUCCH format. The first uplink channel resource corresponds to the single-RB PUCCH format, and the second uplink channel resource corresponds to the dual-RB PUCCH format.

In this solution, in case that the second downlink subframe set is a subset of the first subset (case 1 for short), the channel resource determined by the processing module 120 is the first uplink channel resource. For example, the second downlink subframe set includes subframes 4, 5, 6, and 8 on a carrier 1, subframes 4, 5, and 6 on a carrier 2, and subframes 4 and 5 on a carrier 3. The carrier 1 is a primary component carrier. In this embodiment, it is assumed that the first subset consists of downlink subframes 4, 5, 6, and 8 on carriers 1 to 5. Therefore, the second downlink subframe set is a subset of the first subset. In this case, the first uplink channel resource corresponding to the first subset is used in this embodiment. That is, feedback information is sent by using a small resource format.

In case that the second downlink subframe set includes only a downlink subframe that is in the second subset but does not belong to the first subset (case 2 for short), the channel resource determined by the processing module 120 is the second uplink channel resource. For example, the first subset consists of downlink subframes 4, 5, 6, and 8 on carriers 1 to 5, the second subset consists of downlink subframes 4, 5, 6, and 8 on carriers 1 to 10, and the second downlink subframe set consists of only subframes 4, 5, 6, and 8 on a carrier 6, subframes 4, 5, and 6 on a carrier 7, and subframes 4 and 5 on a carrier 8. That is, the second downlink subframe set includes only a downlink subframe that is in the second subset but does not belong to the first subset. In this case, the second uplink channel resource corresponding to the second subset is used in this embodiment. That is, feedback information is sent by using a large resource format.

In case that the second downlink subframe set includes a downlink subframe in the first subset and a downlink subframe that is in the second subset but does not belong to the first subset, but does not include a downlink subframe that is not included in the first subset or the second subset (case 3 for short), the channel resource determined by the processing module 120 is the second uplink channel resource. For example, the first subset consists of downlink subframes 4, 5, 6, and 8 on carriers 1 to 5, the second subset consists of downlink subframes 4, 5, 6, and 8 on carriers 1 to 10, and the second downlink subframe set consists of subframes 4, 5, 6, and 8 on a carrier 1, subframes 4, 5, and 6 on a carrier 3, and subframes 4 and 5 on a carrier 6. That is, the second downlink subframe set includes a downlink subframe in the first subset and a downlink subframe that is in the second subset but does not belong to the first subset, but does not include a downlink subframe that is not included in the first subset or the second subset. In this case, the second uplink channel resource corresponding to the second subset is used in this embodiment. That is, feedback information is sent by using a large resource format.

In the subsequent descriptions, an example in which the n-resource-element channel format is a single-RB PUCCH format and the m-resource-element channel format is a dual-RB PUCCH format is used for description. The first uplink channel resource corresponds to the single-RB PUCCH format, and the second uplink channel resource corresponds to the dual-RB PUCCH format.

Further, when determining, according to the resource indication information, the channel resource used for carrying the feedback information, the processing module 120 selects the channel resource from a resource set preconfigured by the access network device for the UE. Further, the access network device preconfigures a correspondence between a state of the resource indication information and a channel resource in the resource set for the UE. When determining, according to the resource indication information, the channel resource used for carrying the feedback information, the processing module 120 selects, according to the state of the resource indication information, the channel resource from the resource set preconfigured by the access network device for the UE. The access network device may preconfigure the resource set for the UE in the following three implementation manners:

First Implementation Manner:

The access network device preconfigures a second uplink channel resource set for the UE. The processing module 120 is further configured to: before determining the channel resource, obtain the second uplink channel resource set configured by the access network device. The second uplink channel resource is an uplink channel resource in the second uplink channel resource set, a part of each uplink channel resource in multiple uplink channel resources included in the second uplink channel resource set constitutes a first uplink channel resource set, and the first uplink channel resource is an uplink channel resource in the first uplink channel resource set.

In this solution, in terms of time-frequency resource, a channel resource of an m-resource-element channel format includes a channel resource of a fallback n-resource-element channel format corresponding to the m-resource-element channel format. In this way, the channel resource of the n-resource-element channel format and the channel resource of the m-resource-element channel format that are orthogonal in terms of time-frequency resource may not need to be separately reserved, so that a base station does not need to perform blind detection on the channel resource of the n-resource-element channel format and the channel resource of the m-resource-element channel format that are orthogonal in terms of time-frequency resource. This reduces resource overheads of an uplink control channel, such as a PUCCH.

Figure 4:
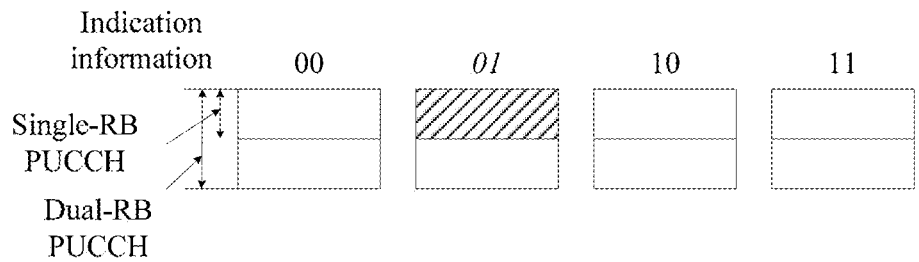
FIG. 4 is a schematic diagram of resource set configuration according to a first implementation manner of an embodiment of the present disclosure.

As shown in FIG. 4, the second uplink channel resource set preconfigured by the access network device for the UE includes four large resources in FIG. 4, that is, channel resources of four dual-RBs in FIG. 4. It should be noted that the four resources in this embodiment are merely an example, but are not used to limit the scope of this embodiment of the present disclosure. A person skilled in the art should understand that the access network device may configure more or fewer resources according to a requirement. A part of each element in the second uplink channel resource set constitutes the first resource set. For example, some resources of the four dual-RBs in FIG. 4, that is, one RB in each of the four dual-RBs, constitute the first uplink channel resource set. The second uplink channel resource is selected from the second uplink channel resource set. That is, the second uplink channel resource is one of the channel resources of the four dual-RBs in FIG. 4. The first uplink channel resource is selected from the first uplink channel resource set. For example, the first uplink channel resource is a single-RB channel resource in a dual-RB channel resource in FIG. 4. For example, the first uplink channel resource may be a channel resource of an upper RB part of the second dual-RB channel resource in FIG. 4.

In this case, different states of the resource indication information may indicate different channel resources in the second uplink channel resource set. As shown in FIG. 4, 00 indicates the first dual-RB in the second uplink channel resource set, 01 indicates the second dual-RB, 10 indicates the third dual-RB, and 11 indicates the fourth dual-RB.

In the foregoing case 2 or case 3, it is configured that the processing module 120 specifically determines the second uplink channel resource from the second uplink channel resource set according to the channel resource indicator. For example, in case that the channel resource indicator is 10, the processing module 120 determines that the third dual-RB in the second uplink channel resource set is the second uplink channel resource.

In the foregoing case 1, it is configured that the processing module 120 specifically determines the first uplink channel resource from the first uplink channel resource set according to the channel resource indicator. The first uplink channel resource is a part of an uplink channel resource indicated by the channel resource indicator, and the uplink channel resource is included in the second uplink channel resource set. Alternatively, it is configured that the processing module 120 specifically determines the first uplink channel resource according to the resource indication information. The first uplink channel resource is a part of an uplink channel resource that is in the second uplink channel resource set and that is indicated by the resource indication information. Which part of the uplink channel resource indicated by the resource indication information the first uplink channel resource is may be directly determined according to an identifier of the UE, preconfigured information, or a default setting.

Optionally, which part of the uplink channel resource indicated by the channel resource indicator the processing module 120 uses may be determined according to the default setting. For example, an upper RB is used by default, or a lower RB is used by default. Alternatively, which part of the uplink channel resource indicated by the channel resource indicator the processing module 120 uses may be determined according to identification information of the user equipment or the preconfigured information. For example, the preconfigured information may indicate an upper half resource or a lower half resource of an uplink channel resource in the foregoing uplink channel resource set preconfigured by using RRC signaling, or may be preconfigured indication information used to indicate that an upper half resource or a lower half resource of an uplink channel resource in the foregoing uplink channel resource set is used as the first uplink channel resource. The processing module 120 may determine the upper half resource or the lower half resource as the first uplink channel resource according to the preconfigured information. For another example, when the processing module 120 determines the first uplink channel resource according to the identification information of the user equipment, if the identification information of the user equipment is an odd number, the processing module 120 determines an upper half part of the uplink channel resource indicated by the channel resource indicator as the first uplink channel resource. If the identification information of the user equipment is an even number, the processing module 120 determines a lower half part of the uplink channel resource indicated by the channel resource indicator as the first uplink channel resource; or vice versa. Certainly, the processing module 120 may determine the first uplink channel resource in another manner.

This implementation manner is further described by using the following example. In this embodiment, 2-bit resource indication information is used as an example, and a channel format is a PUCCH format 3. A parsing situation of four states of the two bits needs to be preconfigured for the UE. For example, by receiving RRC dedicated signaling, the UE obtains the four states {00, 01, 10, 11} of the two bits in advance, which respectively indicate {dual-RB PUCCH format 3 channel resource 1, dual-RB PUCCH format 3 channel resource 2, dual-RB PUCCH format 3 channel resource 3, dual-RB PUCCH format 3 channel resource 4}, that is, the four dual-RB channel resources in FIG. 4.

Based on such preconfigured information, in this embodiment, if the UE receives data scheduled in a downlink subframe that is not included in the first subset (for example, the foregoing case 2 or case 3), the processing unit 120 feeds back an ACK/NACK by using the dual-RB PUCCH format 3 channel resource 2 indicated by the current state 01.

In case that the second downlink subframe set is a subset of the first subset (for example, the foregoing case 1), and the two bits received by the UE indicate the state 01 in this case, the UE feeds back an ACK/NACK by using a single-RB PUCCH format 3 channel resource in the dual-RB PUCCH format 3 channel resource indicated by the state 01. Details are shown in FIG. 4. Which specific single-RB PUCCH format 3 channel resource in the dual-RB PUCCH format 3 channel resource is to be used may be determined according to the UE identification information of the UE. The identification information may be a cell radio network temporary identifier (C-RNTI) of the UE. A specific determining manner may be a modulo operation. For example, which single-RB PUCCH format 3 channel resource is to be used may be determined according to C-RNTI mod 2=0 or 1. Alternatively, a single-RB PUCCH format 3 channel resource that is in the dual-RB PUCCH format 3 channel resource and that is preconfigured, for example, by using RRC dedicated signaling, is directly used. In the foregoing manner of determining a single-RB PUCCH format 3, the base station can make two UEs separately use different single-RB PUCCH format 3 channel resources in one dual-RB PUCCH format 3 channel resource, thereby improving resource utilization efficiency.

Second Implementation Manner:

The access network device preconfigures two uplink channel resource sets, that is, a first uplink channel resource set and a second uplink channel resource set, for the UE. The processing module 120 is further configured to: before determining the channel resource, obtain the first uplink channel resource set and the second uplink channel set that are preconfigured by the access network device. The first uplink channel resource is an uplink channel resource in the first uplink channel resource set, and the second uplink channel resource is an uplink channel resource in the second uplink channel resource set.

Figure 5:
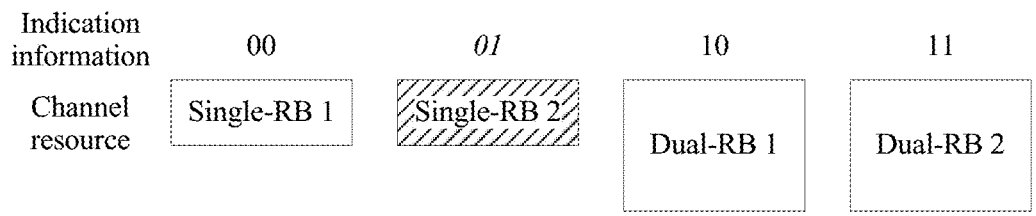
FIG. 5 is a schematic diagram of resource set configuration according to a second implementation manner of an embodiment of the present disclosure.

As shown in FIG. 5, the first uplink channel resource set includes channel resources of two single-RBs, that is, a single-RB 1 and a single-RB 2 in FIG. 5, and the second uplink channel resource set includes channel resources of two dual-RBs, that is, a dual-RB 1 and a dual-RB 2 in FIG. 5. In such a resource set configuration, states of the resource indication information may be grouped into two sets, that is, a first state set and a second state set. The first state set indicates an uplink channel resource in the first uplink channel resource set, the second state set of the resource indication information indicates an uplink channel resource in the second uplink channel resource set, and the first state set does not intersect the second state set. An example shown in FIG. 5 is used for description. The first state set includes 00 and 01, which respectively indicate the single-RB 1 and the single-RB 2 in the first uplink channel resource set; and the second state set includes 10 and 11, which respectively indicate the dual-RB 1 and the dual-RB 2 in the second uplink channel resource set.

Further, a correspondence between a state in the first state set and a channel resource in the first uplink channel resource set may be preconfigured by the access network device for the UE. Likewise, a correspondence between a state in the second state set and a channel resource in the second uplink channel resource set may be preconfigured by the access network device for the UE. The access network device may configure the two correspondences for the UE at a time, or may separately configure the two correspondences for the UE. Specifically, the access network device may configure the two correspondences for the UE by using radio resource control (RRC) dedicated signaling.

In the foregoing case 1, the channel resource determined by the processing module 120 is the first uplink channel resource. When the state of the resource indication information is a state in the first state set, it is configured that the processing module 120 determines the channel resource in the following manner: determining the first uplink channel resource from the first uplink channel set according to the state in the first state set of the resource indication information.

Alternatively, in the foregoing case 2 or case 3, the channel resource determined by the processing module 120 is the second uplink channel resource. When the state of the resource indication information is a state in the second state set, it is configured that the processing module 120 determines the channel resource in the following manner: determining the second uplink channel resource from the second uplink channel set according to the state in the second state set of the resource indication information.

The following further describes this implementation manner by using the example shown in FIG. 5. In this embodiment, 2-bit resource indication information is used as an example. A parsing situation of four states of the two bits needs to be preconfigured for the UE. For example, by receiving RRC dedicated signaling, the UE obtains the four states {00, 01, 10, 11} of the two bits in advance, which respectively indicate {single-RB PUCCH format 3 channel resource 1, single-RB PUCCH format 3 channel resource 2, dual-RB PUCCH format 3 channel resource 1, dual-RB PUCCH format 3 channel resource 2}. Based on such preconfigured information, as shown in FIG. 5, if the two bits received by the UE indicate the state 01 in this case, it is determined that an ACK/NACK is sent on the single-RB PUCCH format 3 channel resource 2 by using a single-RB PUCCH format.

In this implementation manner, in case that the second downlink subframe set is a subset of the first subset, and a channel resource indicated by the resource indication information is a downlink channel resource corresponding to an m-resource-element channel format, the processing unit 120 still determines to send the feedback information by using a second downlink channel resource. Specifically, the second downlink subframe set includes only a downlink subframe in the first subset in this case. However, if a state of two bits of the resource indication information received by the UE is 10, it means that an ACK/NACK is fed back by using the dual-RB PUCCH channel resource 1. Therefore, the UE determines to send the ACK/NACK on the dual-RB PUCCH format 3 channel resource 1 by using a dual-RB PUCCH format. In this case, the UE also finds that the UE misses detecting a PDCCH in a downlink subframe that is not included in the first subset. Considering that the second downlink subframe set includes only a downlink subframe in the first subset, if there is no missed detection, the base station instructs the UE to use a single-RB PUCCH channel resource. On the contrary, if the UE finds that the second downlink subframe set is a subset of the first subset and uses the single-RB PUCCH format 3, the base station expects the UE to feed back an ACK/NACK by using a dual-RB PUCCH format 3 in a case of missed detection, but the UE actually feeds back the ACK/NACK by using the single-RB PUCCH format 3. Therefore, misunderstanding between the UE and the base station is caused, and further, the base station fails to decode the ACK/NACK. If the base station allocates, to another UE, a channel resource that has not been allocated to the UE from a perspective of the base station, but the UE currently performs an ACK/NACK feedback by using the single-RB PUCCH format 3 channel resource that has been allocated to another UE, interference to a PUCCH format 3 of the another UE is further caused. Therefore, in this embodiment, different states of the resource indication information are used to instruct to use the single-RB PUCCH format 3 or the dual-RB PUCCH format 3, so that the UE feeds back an ACK/NACK by using the dual-RB PUCCH format 3 provided that the UE determines that the resource indication information instructs to use the dual-RB PUCCH format 3. This resolves the foregoing problem of PUCCH channel resource ambiguity caused due to missed detection on a control channel.

Figure 6:
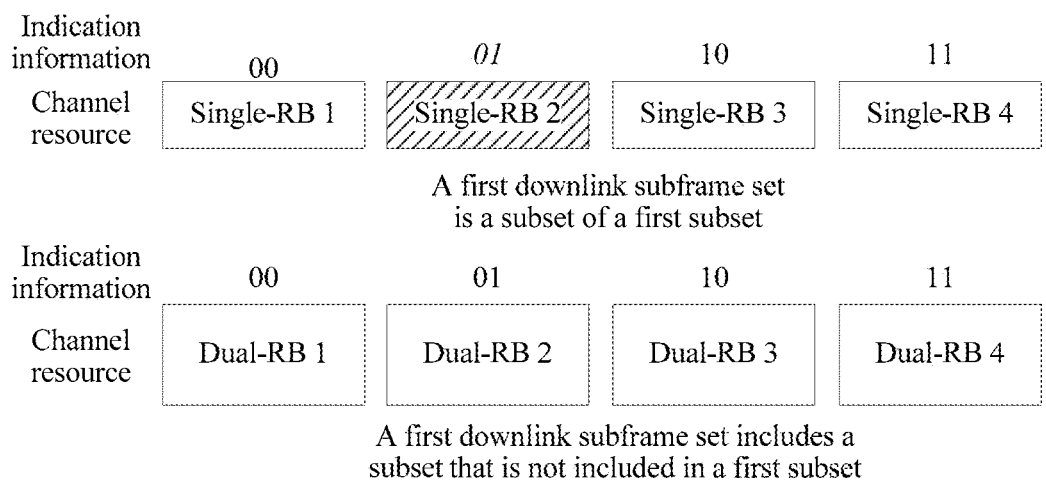
FIG. 6 is a schematic diagram of resource set configuration according to a third implementation manner of an embodiment of the present disclosure.

Third Implementation Manner:

This implementation manner is similar to the second implementation manner. The access network device preconfigures two uplink channel resource sets, that is, a first uplink channel resource set and a second uplink channel resource set, for the UE. As shown in FIG. 6, a difference lies in that the first uplink channel resource set includes channel resources of four single-RBs, that is, a single-RB 1, a single-RB 2, a single-RB 3, and a single-RB 4 in FIG. 6, and the second uplink channel resource set includes channel resources of four dual-RBs, that is, a dual-RB 1, a dual-RB 2, a dual-RB 3, and a dual-RB 4 in FIG. 6. In such a resource set configuration, four states of the resource indication information indicate channel resources corresponding to the first uplink channel resource set and/or the second uplink channel resource set.

Therefore, it is configured that the processing module 120 may determine the channel resource in the following two manners:

Manner 1:

The processing module 120 determines, from the first uplink channel resource set according to the resource indication information, a third uplink channel resource indicated by the resource indication information, and determines, from the second uplink channel resource set according to the resource indication information, a fourth uplink channel resource indicated by the resource indication information; determines that the second downlink subframe set is a subset of the first subset; and determines that the third uplink channel resource is the first uplink channel resource; or the processing module 120 determines, from the first uplink channel resource set according to the resource indication information, a fifth uplink channel resource indicated by the resource indication information, and determines, from the second uplink channel resource set according to the resource indication information, a sixth uplink channel resource indicated by the resource indication information; determines that the second downlink subframe set includes only a downlink subframe that is in the second subset but does not belong to the first subset; and determines that the sixth uplink channel resource is the second uplink channel resource; or the processing module 120 determines, from the first uplink channel resource set according to the resource indication information, a fifth uplink channel resource indicated by the resource indication information, and determines from the second uplink channel resource set according to the resource indication information, a sixth uplink channel resource indicated by the resource indication information; determines that the second downlink subframe set includes a downlink subframe in the first subset and a downlink subframe that is in the second subset but does not belong to the first subset, but does not include a downlink subframe that is not included in the first subset or the second subset; and determines that the sixth uplink channel resource is the second uplink channel resource.

Manner 2:

The processing module 120 determines that the second downlink subframe set is a subset of the first subset; and determines, from the first uplink channel resource set according to the resource indication information, the first uplink channel resource indicated by the resource indication information; or the processing module 120 determines that the second downlink subframe set includes only a downlink subframe that is in the second subset but does not belong to the first subset; and determines, from the second uplink channel resource set according to the state of the resource indication information, the second uplink channel resource indicated by the resource indication information; or the processing module 120 determines that the second downlink subframe set includes a downlink subframe in the first subset and a downlink subframe that is in the second subset but does not belong to the first subset, but does not include a downlink subframe that is not included in the first subset or the second subset; and determines, from the second uplink channel resource set according to the resource indication information, the second uplink channel resource indicated by the resource indication information.

Specifically, in this implementation manner, if the second downlink subframe set includes only a downlink subframe in the first subset, the UE may determine to use a single-RB PUCCH channel resource. However, a single-RB PUCCH channel resource needs to be determined according to a state of two bits of the resource indication information. Alternatively, according to the state of the resource indication information, the UE first determines a single-RB PUCCH channel resource from a first channel resource set and then determines a dual-RB PUCCH channel resource from a second channel resource set. As for which one of the two channel resources is finally used, according to that the second downlink subframe set includes only a downlink subframe in the first subset, it may be determined that the foregoing single-RB PUCCH channel resource is used to send an ACK/NACK.

In this solution, a correspondence between a state of the resource indication information and a channel resource set also needs to be preconfigured for the UE. For example, by receiving RRC dedicated signaling, the UE obtains four states {00, 01, 10, 11} of the two bits in advance, which are separately a single-RB PUCCH channel resource set {single-RB PUCCH format 3 channel resource 1, single-RB PUCCH format 3 channel resource 2, single-RB PUCCH format 3 channel resource 3, single-RB PUCCH format 3 channel resource 4} or a dual-RB PUCCH channel resource set {dual-RB PUCCH format 3 channel resource 1, dual-RB PUCCH format 3 channel resource 2, dual-RB PUCCH format 3 channel resource 3, dual-RB PUCCH format 3 channel resource 4}. Details are shown in FIG. 6.

When m is greater than n, the foregoing embodiment based on an m-resource-element channel format and an n-resource-element channel format, including solution 1 about an indication manner of resource indication information, is completely applicable to this solution of p codebook sizes and q codebook sizes. In addition, the p-codebook-size channel format and the q-codebook-size channel format are further applicable to a case in which m is equal to n. That is, a solution based on a codebook-size channel format is a superordinate solution of a resource-element channel format.

Solution 2

In case that the second downlink subframe set is a subset of the first subset, the channel resource determined by the processing module 120 is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the processing module 120 is the second uplink channel resource.

A difference between this solution and solution 1 lies in that in case that the second downlink subframe set includes only a downlink subframe that is in the second subset but does not belong to the first subset (that is, case 2), the channel resource determined by the processing module 120 is the first uplink channel resource. For example, the first subset consists of downlink subframes 4, 5, 6, and 8 on carriers 1 to 5, the second subset consists of downlink subframes 4, 5, 6, and 8 on carriers 1 to 10, and the second downlink subframe set consists of only subframes 4, 5, 6, and 8 on a carrier 6, subframes 4, 5, and 6 on a carrier 7, and subframes 4 and 5 on a carrier 8. In this case, without loss of generality, the first subset may be considered as a type of first subset. If the first subset consists of downlink subframes 4, 5, 6, and 8 on carriers 6 to 10, feedback information is also sent by using a fallback resource format in case 2 in this embodiment. Certainly, it should be noted that different channel resource sets or a same channel resource set may be configured for a first subset consisting of downlink subframes 4, 5, 6, and 8 on carriers 1 to 5 and a subset consisting of downlink subframes 4, 5, 6, and 8 on carriers 6 to 10. However, a channel resource set corresponding to a small channel format is configured in both cases.

In solution 2, for a resource set configuration manner and various channel resource determining manners, refer to descriptions of solution 1. For brevity, details are not repeatedly described in this specification. It should be noted that in case that the second downlink subframe set is a subset of the first subset, the channel resource determined by the processing module 120 is the first uplink channel resource, and reference may be made to descriptions of the foregoing case 1 in solution 1. In case that the second downlink subframe set includes a downlink subframe in the first subset and a downlink subframe that is in the second subset but does not belong to the first subset, but does not include a downlink subframe that is not included in the first subset or the second subset, reference may be made to descriptions of the foregoing case 2 and case 3.

Optionally, in case that the second downlink subframe set includes only a downlink subframe that is in the second subset but does not belong to the first subset, the UE determines the first uplink channel resource, and then sends an ACK/NACK on the first uplink channel resource by using a single-RB PUCCH format 3. For example, the second downlink subframe set includes subframes 4, 5, 6, and 8 on a carrier 6, subframes 4, 5, and 6 on a carrier 7, and subframes 4 and 5 on a carrier 8. It can be learned that all downlink subframes in the second downlink subframe set are subframes on a secondary component carrier. In this case, this solution is similar to case 1.

In this embodiment, before the UE receives a scheduled data channel in the second downlink subframe set, solution 2 further includes: the UE determines the first uplink channel resource set corresponding to the first subset and the second uplink channel resource set that is in the second subset other than the first subset. The first uplink channel resource set includes at least one single-RB PUCCH format 3 PUCCH channel resource, and the second uplink channel resource set includes at least one single-RB PUCCH format 3 PUCCH channel resource. Preferably, a single-RB PUCCH format 3 channel resource included in the first uplink channel resource set and a single-RB PUCCH format 3 channel resource included in the second uplink channel resource set may be completely different or partly the same, that is, may be independently configured. Certainly, in this embodiment, an independent configuration further includes: a PUCCH channel resource included in the first uplink channel resource set may be the same as a single-RB PUCCH format 3 channel resource included in the second uplink channel resource set. Optionally, the UE may obtain the first uplink channel resource set and the second uplink channel resource set by receiving RRC signaling sent by the base station.

For example, the first uplink channel resource set and the second uplink channel resource set each include two single-RB PUCCH format 3 channel resources, which are respectively {channel 11, channel 12} and {channel 21, channel 22}. Two states of two bits of the foregoing resource indication information on a control channel for scheduling an actually scheduled downlink subframe in the first subset are used to respectively indicate the channel 11 and the channel 12, and two states of two bits of the resource indication information on a control channel for scheduling an actually scheduled downlink subframe that is in the second subset other than the first subset are used to respectively indicate the channel 21 and the channel 22. Herein, {channel 11, channel 12} and {channel 21, channel 22} are not completely the same. That is, {channel 11, channel 12} and {channel 21, channel 22} are either completely different, that is, completely independently configured; or partly the same. For example, the channel 11 and the channel 21 are a same channel, but the channel 12 and the channel 22 are different. Therefore, flexible scheduling can be implemented when multiple UEs perform statistical multiplexing on PUCCH format 3 channel resources. For example, in the first subset, because {channel 11, channel 12} are completely occupied by another UE, {channel 11, channel 12} cannot be used for feeding back an ACK/NACK corresponding to a downlink subframe in the first subset, and consequently, a subframe in the first subset cannot be scheduled. However, {channel 21, channel 22} and {channel 11, channel 12} are not completely the same, and {channel 21, channel 22} may be not occupied by another UE, that is, channels in the set {channel 21, channel 22} are available. Therefore, a subframe that is in the second subset but not included in the first subset can be scheduled in this case. Dual-RB PUCCH channel resources 13 and 14 indicated by the other two states of resource indication information corresponding to the first subset need to be completely the same, and dual-RB PUCCH channel resources 23 and 24 indicated by the other two states of resource indication information corresponding to a subframe that is in the second subset but not included in the first subset need to be completely the same, that is, the dual-RB PUCCH format 3 channel resources 13 and 14 are the same, and the dual-RB PUCCH format 3 channel resources 23 and 24 are the same.

An ACK/NACK codebook and an ACK/NACK codebook size in this case are similar to those in case 1. The UE determines an ACK/NACK codebook size corresponding to a subframe that is in the second subset but not included in the first subset, and encodes an ACK/NACK codebook according to the codebook size.

Optionally, for the resource configuration manner in the foregoing second implementation manner, to avoid missed detection by the UE, if the second downlink subframe set includes only a downlink subframe that is in the second subset but does not belong to the first subset, and the resource indication information indicates a channel resource of an m-resource-element format, the processing module 120 determines the second uplink channel resource, and then sends the feedback information on the second uplink channel resource by using the m-resource-element format such as a dual-RB PUCCH format 3. For details, refer to descriptions of the foregoing second implementation manner.

An ACK/NACK codebook and an ACK/NACK codebook size in this case are similar to those in case 2. The UE determines an ACK/NACK codebook size corresponding to the second subset, and encodes an ACK/NACK codebook according to the codebook size.

In addition, this embodiment (including all implementation manners) is described by using two subsets as an example. However, the solution in this embodiment may also be applied to a case of multiple subsets. Corresponding uplink channel resource sets are separately configured for different subsets.

Optionally, based on the foregoing embodiment (including all implementation manners), in an embodiment, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format. The n-resource-element channel format and the m-resource-element channel format whose time-frequency resources overlap are distinguished by using an orthogonal code. Therefore, resource overheads of a PUCCH can be reduced, that is, the n-resource-element channel format and the m-resource-element channel format that are orthogonal in time and frequency do not need to be separately reserved. Specifically, the UE determines an ACK/NACK codebook size corresponding to the first subset, and encodes an ACK/NACK codebook according to the codebook size. For example, if the resource indication information instructs to use a single-RB PUCCH format 3 PUCCH channel resource for an ACK/NACK feedback, the PUCCH channel is used to feed back an ACK/NACK corresponding to an actually scheduled downlink subframe in the second downlink subframe set, but a quantity of original unencoded ACK/NACK bits that need to be fed back, that is, a codebook size, needs to be determined according to all downlink subframes in the first subset. In this example, there are 20 downlink subframes included in the first subset in total, and there are nine actually scheduled downlink subframes in the second downlink subframe set. In this case, when the ACK/NACK is fed back, a quantity of original unencoded bits, that is, an ACK/NACK codebook, needs to be determined according to the maximum quantity of 20 bits, that is, a codebook size in this case, and ACK/NACK bits are arranged according to a carrier number and a subframe number. Zero filling may be performed for occupation at a location of an ACK/NACK corresponding to a downlink subframe that is not actually scheduled currently. In this example, if scheduling is performed by using a single codeword, one downlink subframe corresponds to one ACK/NACK bit. If scheduling is performed by using a dual codeword, one downlink subframe corresponds to two ACK/NACK bits, but space binding, that is, a logical AND operation, may be performed on the two ACK/NACK bits corresponding to the subframe, to compress the two ACK/NACK bits into one bit.

In all embodiments of the present disclosure, the control channel that carries the resource indication information is a control channel for scheduling the first downlink subframe in the second downlink subframe set, and the first downlink subframe is a subframe on a secondary component carrier, or a downlink subframe that is on a primary component carrier and that is scheduled by using a control channel with a downlink assignment index (DAI) field value greater than 1. Specifically, a sequence of scheduling subframes on a carrier determines an ascending order of DAI values of control channels. For example, DAI values of four control channels used for scheduling subframes 4, 5, 6, and 8 on a primary component carrier are respectively 1, 2, 3, and 4. In this case, the first downlink subframe includes subframes 5, 6, and 8 on a carrier 1, subframes 4, 5, and 6 on a carrier 2, and subframes 4 and 5 on a carrier 3, that is, the first downlink subframe set excludes only a subframe 4 that is on the primary component carrier and that is scheduled by using a control channel with a DAI value 1. In addition, states of resource indication information on these control channels for scheduling the first downlink subframe need to be the same. For example, the states all are the states 01. This avoids a case in which the UE cannot determine a PUCCH format 3 channel resource because of different states indicated by different received resource indication information.

When m is greater than n, the following embodiment based on an m-resource-element channel format and an n-resource-element channel format, including descriptions about solution 2 about an indication manner of resource indication information and the like, is applicable to this solution of p codebook sizes and q codebook sizes. In addition, the p-codebook-size channel format and the q-codebook-size channel format are further applicable to a case in which m is equal to n. That is, a solution based on a codebook-size channel format is a superordinate solution of a resource-element channel format.

Figure 7:
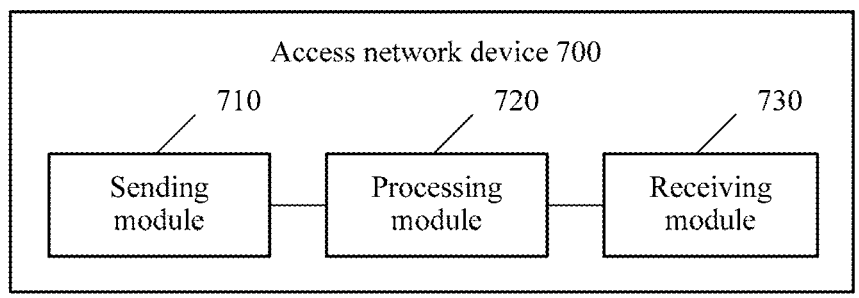
FIG. 7 is a schematic structural diagram of an access network device according to an embodiment of the present disclosure.

As shown in FIG. 7, another embodiment of the present disclosure provides an access network device 700, including a receiving module 710, a processing module 720, and a sending module 730.

The sending module 710 is configured to: under control of the processing module 720, send downlink control information to UE, and send a data channel scheduled by using the downlink control information to the UE.

The processing module 720 is configured to: control the sending module 710 to send the downlink control information to the UE, control the sending module 710 to send the data channel scheduled by using the downlink control information to the UE, determine an uplink subframe used for receiving feedback information corresponding to the data channel, and determine a channel resource. A second downlink subframe set associated with the uplink subframe includes a first subset and a second subset, the first subset includes at least two downlink subframes, the first subset is a proper subset of the second subset, the channel resource is a first uplink channel resource or a second uplink channel resource, the first uplink channel resource corresponds to the first subset, and the second uplink channel resource corresponds to the second subset.

The receiving module 730 is configured to: receive, on the channel resource in the uplink subframe determined by the processing module 720, the feedback information sent by using a channel format. The channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

The present disclosure further provides an embodiment:

An access network device sends downlink control information to user equipment UE.

The access network device sends a data channel scheduled by using the downlink control information to the UE.

The access network device determines an uplink subframe used for receiving feedback information corresponding to the data channel. A first downlink subframe set associated with the uplink subframe includes a first subset and a second subset, the first subset includes at least two downlink subframes, and the first subset is a proper subset of the second subset.

The access network device determines a channel resource. The channel resource is a first uplink channel resource or a second uplink channel resource, the first uplink channel resource corresponds to the first subset, and the second uplink channel resource corresponds to the second subset.

The access network device receives, on the channel resource in the uplink subframe, the feedback information sent by using a channel format. The channel format is a p-codebook-size channel format, and the first uplink channel resource carries feedback information of the p-codebook-size channel format, or the channel format is a q-codebook-size channel format, and the second uplink channel resource carries feedback information of the q-codebook-size channel format; and p and q are natural numbers, and p>q.

The p-codebook-size channel format or q-codebook-size channel format means that the channel format can support a feedback of an ACK/NACK of a maximum of p or q codebook sizes. A codebook size refers to a quantity of original unencoded ACK/NACK bits. Specifically, the p codebook sizes correspond to the first subset, and the q codebook sizes correspond to the second subset. That is, the p codebook sizes are determined according to a quantity of downlink subframes in the first subset, and the q codebook sizes are determined according to a quantity of downlink subframes in the second subset.

Optionally, a channel resource occupied by the p-codebook-size channel format includes n resource elements, a channel resource occupied by the q-codebook-size channel format includes m resource elements, m and n are natural numbers, and m is greater than or equal to n. In this way, the p-codebook-size channel format may also be considered as an n-resource-element channel format, and the q-codebook-size channel format may also be considered as an m-resource-element channel format. When m is greater than n, the following embodiment based on an m-resource-element channel format and an n-resource-element channel format is completely applicable to this solution of p codebook sizes and q codebook sizes. In addition, the p-codebook-size channel format and the q-codebook-size channel format are further applicable to a case in which m is equal to n. That is, a solution based on a codebook-size channel format is a superordinate solution of a resource-element channel format.

It should be noted that for brevity, for content that is in this embodiment and that is the same as that in the foregoing embodiment, refer to descriptions of the foregoing embodiment. Details are not repeatedly described herein.

Further, the sending module 710 in this embodiment of the present disclosure is further configured to send subframe configuration information to the UE. The subframe configuration information is used to determine the uplink subframe associated with the first downlink subframe set. The subframe configuration information is sent to the UE in advance. The subframe configuration information may be an uplink-downlink subframe configuration in Table 2. Therefore, the UE can determine the uplink subframe according to the preconfigured subframe configuration information.

Optionally, the sending module 710 in this embodiment of the present disclosure is further configured to send a division rule to the UE. The division rule is used to determine the first subset and the second subset that are included in the first downlink subframe set. The division rule may be a preconfigured rule in the foregoing embodiment. Certainly, the sending module 710 in this embodiment may not send the division rule. Both the access network device and the UE determine the first set and the second set according to a default rule. Alternatively, the sending module 710 may send the first subset and the second subset to the UE.

It should be noted that for a relationship between the first set and the second set, and the first downlink subframe set, refer to descriptions of the foregoing embodiment. Details are not repeatedly described herein.

Same as the foregoing embodiment, in this embodiment, the first subset corresponds to the first uplink channel resource, and the receiving module 730 is configured to receive the feedback information that is of the n-resource-element channel format and that is carried on the first uplink channel resource. The second subset corresponds to the second uplink channel resource, and the receiving module 730 is configured to receive the feedback information that is of the m-resource-element channel format and that is carried on the second uplink channel resource; and m and n are natural numbers, and m>n. Feedback information is received on a corresponding channel resource by using only one channel format each time. That is, for a large subset, the UE sends feedback information by using a large resource format, and for a small subset, the UE sends feedback information by using a small resource format.

When m is greater than n, the foregoing embodiment based on an m-resource-element channel format and an n-resource-element channel format, including descriptions about a first downlink subframe set, a first subset, a second subset, and the like, is completely applicable to this solution of p codebook sizes and q codebook sizes. In addition, the p-codebook-size channel format and the q-codebook-size channel format are further applicable to a case in which m is equal to n. Details are as follows:

When m is equal to n, that is, time-frequency resources occupied by the two channel formats have a same quantity of resource elements, such as one RB, or time-frequency resources occupied by the two channel formats completely overlap. For details, refer to descriptions of the foregoing embodiment.

According to the foregoing embodiment, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when feedback information such as an ACK/NACK is fed back.

Further, it is configured that the sending module 710 sends, in the following manner, the data channel scheduled by using the downlink control information to the UE: sending, in a downlink subframe included in a second downlink subframe set, the data channel scheduled by using the downlink control information. For the second downlink subframe set, refer to descriptions of the foregoing embodiment. Details are not repeatedly described herein.

When m is greater than n, the foregoing embodiment based on an m-resource-element channel format and an n-resource-element channel format, including descriptions about a second downlink subframe set and the like, is completely applicable to this solution of p codebook sizes and q codebook sizes. In addition, the p-codebook-size channel format and the q-codebook-size channel format are further applicable to a case in which m is equal to n.

When the processing module 720 determines the channel resource, and the second downlink subframe set is different from the first subset, the second subset, and the first downlink subframe set, determined channel resources may be different, and used PUCCH formats may also be different.

When m is greater than n, the following embodiment based on an m-resource-element channel format and an n-resource-element channel format, including a method for indicating a channel resource by using resource indication information, is completely applicable to this solution of p codebook sizes and q codebook sizes. In addition, the p-codebook-size channel format and the q-codebook-size channel format are further applicable to a case in which m is equal to n.

In case that the second downlink subframe set is a subset of the first subset (case 1), the channel resource determined by the processing module is the first uplink channel resource; or in case that the second downlink subframe set includes only a downlink subframe that is in the second subset but does not belong to the first subset (case 2), the channel resource determined by the processing module 720 is the second uplink channel resource; or in case that the second downlink subframe set includes a downlink subframe in the first subset and a downlink subframe that is in the second subset but does not belong to the first subset, but does not include a downlink subframe that is not included in the first subset or the second subset (case 3), the channel resource determined by the processing module is the second uplink channel resource.

Likewise, this embodiment is still described by using an example in which the n-resource-element channel format is a single-RB PUCCH format and the m-resource-element channel format is a dual-RB PUCCH format. The first uplink channel resource corresponds to the single-RB PUCCH format, and the second uplink channel resource corresponds to the dual-RB PUCCH format.

In case 1, when the second downlink subframe set includes only a downlink subframe in the first subset, the feedback information is sent by using a small resource format. In case 2 and case 3, that is, in a scenario in which the second downlink subset includes a downlink subframe that is in the second subset but not included in the first subset, the feedback information is sent by using a large resource format, that is, the second uplink channel resource corresponding to the second subset.

Further, the downlink control information sent by the sending module 710 includes resource indication information, and the resource indication information is used to indicate the first uplink channel resource or the second uplink channel resource used for carrying the feedback information. Specifically, when the channel resource determined by the processing module 720 is the first uplink channel resource, the processing module 720 controls the sending module 710 to send the downlink control information. The resource indication information included in the downlink control information indicates the first uplink channel resource. When the channel resource determined by the processing module 720 is the second uplink channel resource, the processing module 720 controls the sending module 710 to send the downlink control information. The resource indication information included in the downlink control information indicates the second uplink channel resource.

Further, the processing module 720 is further configured to preconfigure a resource set for the UE by using the sending module 710, and the processing module 720 selects a channel resource from the resource set.

Further, the processing module 720 is further configured to preconfigure a correspondence between a state of the resource indication information and a channel resource in the resource set for the UE by using the sending module 710.

In this way, after determining the channel resource, the processing module 720 further sends the resource indication information by using the sending module 710. The state of the resource indication information corresponds to the determined channel resource.

Same as the foregoing embodiment, the access network device may preconfigure the resource set for the UE in the following three implementation manners:

Like the first implementation manner in the foregoing solution 1:

The processing module 720 is further configured to send a second uplink channel resource set to the UE by using the sending module 710. The second uplink channel resource is an uplink channel resource in the second uplink channel resource set, a part of each uplink channel resource in multiple uplink channel resources in the second uplink channel resource set constitutes a first uplink channel resource set, and the first uplink channel resource is an uplink channel resource in the first uplink channel resource set.

It should be noted that in this embodiment of the present disclosure, the second uplink channel resource may be independently configured for different uplink subframes, thereby improving scheduling flexibility. Certainly, the same second uplink channel resource may be configured for the different uplink subframes. For example, a type of second uplink channel resource may be configured for an uplink subframe 2 in an uplink-downlink subframe configuration 2, and another type of second uplink channel resource may be configured for an uplink subframe 7 in the uplink-downlink subframe configuration 2.

Same as the foregoing embodiment, in this solution, in terms of time-frequency resource, a channel resource of an m-resource-element channel format includes a channel resource of a fallback n-resource-element channel format corresponding to the m-resource-element channel format. In this way, the channel resource of the n-resource-element channel format and the channel resource of the m-resource-element channel format that are orthogonal in terms of time-frequency resource may not need to be separately reserved, so that a base station does not need to perform blind detection on the channel resource of the n-resource-element channel format and the channel resource of the m-resource-element channel format that are orthogonal in terms of time-frequency resource. This reduces resource overheads of an uplink control channel, such as a PUCCH.

Details may be shown in FIG. 4 and are not repeatedly described herein.

Optionally, the channel resource determined by the processing module 720 is the second uplink channel resource, and the resource indication information indicates the second uplink channel resource in the second uplink channel resource set.

Optionally, the channel resource determined by the processing module 720 is the first uplink channel resource, and the resource indication information indicates an uplink channel resource that is in the second uplink channel resource set and that includes the first uplink channel resource; or the resource indication information indicates the first uplink channel resource in the first uplink channel resource set.

Further, the resource indication information indicates the uplink channel resource that is in the second uplink channel resource set and that includes the first uplink channel resource, and it is configured that the processing module 720 determines the channel resource in the following manner: determining, according to identification information of the UE or preconfigured information, the first uplink channel resource in the uplink channel resource indicated by the resource indication information. For specific implementation, refer to descriptions of the foregoing embodiment.

Considering that the foregoing solution in this embodiment may be affected by missed detection on a PDCCH by the UE, this embodiment further provides a solution for avoiding missed detection on a PDCCH by the UE.

In case that the channel resource is the second uplink channel resource, it is configured that the receiving module 730 receives the feedback information in the following manner: receiving, on the second uplink channel resource indicated by the resource indication information in the uplink subframe, the feedback information sent by using the m-resource-element channel format.

However, when the UE misses detecting a PDCCH, the UE may send the feedback information by using the n-resource-element channel format on some uplink channel resources of the second uplink channel resource indicated by the resource indication information. In this case, the receiving module 730 cannot receive, on the second uplink channel resource indicated by the resource indication information in the uplink subframe, the feedback information sent by the UE by using the m-resource-element channel format. Therefore, the processing module 720 is further configured to: determine, according to the identification information of the UE or the preconfigured information, a first uplink channel resource that is in the second uplink channel resource and that is indicated by the resource indication information, and control the receiving module 730 to receive, on the first uplink channel resource, the feedback information sent by using the n-resource-element channel format.

Specifically, for example, the second downlink subframe set that is actually scheduled by the base station for the UE includes downlink subframes 4 on carriers 1 to 6. However, because the UE misses detecting a PDCCH in the downlink subframe 4 on the carrier 6, the UE determines that the second downlink subframe set is a subset of the first subset. In this case, the UE feeds back an ACK/NACK by using a fallback single-RB PUCCH format 3, but the base station expects the UE to feed back the ACK/NACK by using a dual-RB PUCCH format 3. To resolve the foregoing problem that the UE misses detecting a PDCCH, the base station may perform blind detection on a single-RB PUCCH format 3 channel resource and a dual-RB PUCCH format 3 channel resource. That is, the base station needs to detect a dual-RB PUCCH format 3 channel resource 2 indicated by the resource indication information, and further needs to detect a single-RB PUCCH format 3 channel resource 2 in the dual-RB PUCCH format 3 channel resource 2. The single-RB PUCCH format 3 channel resource 2 is a fallback PUCCH channel resource of the UE.

The processing module 720 may control the receiving module 730 to perform blind detection on a part of feedback information sequence of the n-resource-element channel format and the m-resource-element channel format, and/or perform blind detection on a part of reference signal sequence of the n-resource-element channel format and the m-resource-element channel format. For example, the base station may perform blind detection on a part of ACK/NACK sequence of the single-RB PUCCH format 3 and the dual-RB PUCCH format 3, and/or perform blind detection on a part of reference signal sequence of the single-RB PUCCH format 3 and the dual-RB PUCCH format 3.

Optionally, in the foregoing blind detection, the n-resource-element channel format and the m-resource-element channel format may use a same feedback information sequence, or may use different feedback information sequences, and the feedback information sequence may be a time-domain orthogonal code and/or a frequency-domain cyclic shift code.

For example, the dual-RB PUCCH format 3 and a single-RB PUCCH format 3 in the dual-RB PUCCH format 3 may use a same ACK/NACK sequence, or may use different ACK/NACK sequences, and the ACK/NACK sequence may be a time-domain orthogonal code and/or a frequency-domain cyclic shift code; and/or the dual-RB PUCCH format 3 and a single-RB PUCCH format 3 in the dual-RB PUCCH format 3 may use a same reference signal sequence, or may use different reference signal sequences, and the reference signal sequence may be a time-domain orthogonal code and/or a frequency-domain cyclic shift code. In addition, in this solution, in terms of time-frequency resource, a dual-RB PUCCH format 3 channel resource includes a fallback single-RB PUCCH format 3 channel resource that corresponds to the dual-RB PUCCH format 3. In this way, the single-RB PUCCH format 3 channel resource and the dual-RB PUCCH format 3 channel resource that are orthogonal in terms of time-frequency resource may not need to be separately reserved, so that the base station does not need to perform blind detection on the channel resources of the single-RB PUCCH format 3 and the dual-RB PUCCH format 3 channel resource that are orthogonal in terms of time-frequency resource. This reduces resource overheads of a PUCCH.

Like the second implementation manner in the foregoing solution 1:

The processing module 720 is further configured to: before determining the channel resource, configure a first uplink channel resource set and a second uplink channel set for the UE by using the sending module 710. The first uplink channel resource is an uplink channel resource in the first uplink channel resource set, and the second uplink channel resource is an uplink channel resource in the second uplink channel resource set.

It should be noted that in this embodiment of the present disclosure, the first uplink channel resource and the second uplink channel resource may be independently configured for different subframes. For example, a type of second uplink channel resource may be configured for an uplink subframe 2 in an uplink-downlink subframe configuration 2, and another type of second uplink channel resource may be configured for an uplink subframe 7 in the uplink-downlink subframe configuration 2.

Further, a first state set of the resource indication information indicates an uplink channel resource in the first uplink channel resource set, a second state set of the resource indication information indicates an uplink channel resource in the second uplink channel resource set, and the first state set does not intersect the second state set. The processing module 720 is further configured to preconfigure a correspondence between a state in the first state set and a channel resource in the first uplink channel resource set for the UE by using the sending module 710.

For details, refer to descriptions of the foregoing embodiment and FIG. 5.

In this implementation manner, different states of the resource indication information can indicate different channel resources. Therefore, in case that the second downlink subframe set is a subset of the first subset, and a channel resource indicated by the resource indication information is a downlink channel resource corresponding to an m-resource-element channel format, the UE still determines to send the feedback information by using a second downlink channel resource. Specifically, the second downlink subframe set includes only a downlink subframe in the first subset in this case. However, if a state of two bits of the resource indication information received by the UE is 10, it means that an ACK/NACK is fed back by using the dual-RB PUCCH channel resource 1. Therefore, the UE determines to send the ACK/NACK on the dual-RB PUCCH format 3 channel resource 1 by using a dual-RB PUCCH format. In this case, the UE also finds that the UE misses detecting a PDCCH in a downlink subframe that is not included in the first subset. Considering that the second downlink subframe set includes only a downlink subframe in the first subset, if there is no missed detection, the base station instructs the UE to use a single-RB PUCCH channel resource. On the contrary, if the UE finds that the second downlink subframe set is a subset of the first subset and uses the single-RB PUCCH format 3, the base station expects the UE to feed back an ACK/NACK by using a dual-RB PUCCH format 3 in a case of missed detection. In this embodiment, different states of the resource indication information are used to instruct to use the single-RB PUCCH format 3 or the dual-RB PUCCH format 3, so that the UE feeds back an ACK/NACK by using the dual-RB PUCCH format 3 provided that the UE determines that the resource indication information instructs to use the dual-RB PUCCH format 3. Therefore, this resolves the foregoing problem of PUCCH channel resource ambiguity caused due to missed detection on a control channel.

Like the third implementation manner in the foregoing solution 1:

Same as the foregoing embodiment, the processing unit 720 of the access network device is further configured to preconfigure two uplink channel resource sets, that is, a first uplink channel resource set and a second uplink channel resource set, for the UE by using the sending module 710. As shown in FIG. 6, a difference lies in that the first uplink channel resource set includes channel resources of four single-RBs, that is, a single-RB 1, a single-RB 2, a single-RB 3, and a single-RB 4 in FIG. 6, and the second uplink channel resource set includes channel resources of four dual-RBs, that is, a dual-RB 1, a dual-RB 2, a dual-RB 3, and a dual-RB 4 in FIG. 6. In such a resource set configuration, four states of the resource indication information indicate channel resources corresponding to the first uplink channel resource set and/or the second uplink channel resource set.

For example, in case 1, the resource indication information indicates the first uplink channel resource in the first uplink channel resource set, and in case 2 and case 3, the resource indication information indicates the second uplink channel resource in the second uplink channel resource set.

Similar to the foregoing implementation manner, the first uplink channel resource and the second uplink channel resource may be independently configured for different subframes.

In this solution, the UE may miss detecting a PDCCH in case 1. To avoid this case, the access network device needs to perform blind detection on a channel resource corresponding to the n-resource-element channel format and a channel resource corresponding to the m-resource-element channel format.

The processing module 720 is further configured to: if the receiving module 730 fails to receive, on the first uplink channel resource indicated by the resource indication information in the uplink subframe, the feedback information sent by using the n-resource-element channel format, determine a second uplink channel resource in the second uplink channel resource set indicated by the resource indication information; and control the receiving module 730 to receive, on the second uplink channel resource, the feedback information sent by using the m-resource-element channel format.

For example, a base station may perform blind detection on a part of ACK/NACK sequence of a single-RB PUCCH format 3 and a dual-RB PUCCH format 3, and/or perform blind detection on a part of reference signal sequence of the single-RB PUCCH format 3 and the dual-RB PUCCH format 3. For details, refer to descriptions of the foregoing implementation manner. Details are not repeatedly described herein.

When m is greater than n, the foregoing embodiment based on an m-resource-element channel format and an n-resource-element channel format, including different implementation manners in the solution about an indication manner of resource indication information, is completely applicable to this solution of p codebook sizes and q codebook sizes. In addition, the p-codebook-size channel format and the q-codebook-size channel format are further applicable to a case in which m is equal to n.

Similar to the foregoing embodiment, in this embodiment (including all implementation manners), the processing module 720 determines the first subset and the second subset according to a preconfiguration. The preconfiguration may be independently performed for different uplink subframes. In addition, this embodiment is described by using two subsets as an example. However, the solution in this embodiment may also be applied to a case of multiple subsets. Corresponding uplink channel resource sets are separately configured for different subsets.

It should be noted that all the foregoing embodiments are described by using a TDD uplink-downlink subframe configuration 2 as an example. Different uplink subframes (a subframe 2 and a subframe 7) in the uplink-downlink subframe configuration are associated with a same quantity of downlink subframes. This embodiment of the present disclosure may be further applied to another TDD uplink-downlink subframe configuration, such as a TDD uplink-downlink subframe configuration 1. In the TDD uplink-downlink configuration 1, an uplink subframe 2 and an uplink subframe 3 are separately associated with different quantities of downlink subframes. In carrier aggregation configuration, different uplink subframes need to support different maximum quantities of ACK/NACK bits. Assuming that carrier aggregation is performed on 20 carriers in the TDD uplink-downlink subframe configuration 1, a maximum of 40 ACK/NACK bits need to be fed back in the uplink subframe 2, and a maximum of 20 ACK/NACK bits need to be fed back in the uplink subframe 3. Therefore, for the uplink subframe 2, division needs to be performed to obtain the first subset and the second subset, but for the uplink subframe 3, the foregoing subset division is not necessary, and an ACK/NACK is directly carried by using a single-RB PUCCH format 3. Therefore, the solutions provided in this embodiment of the present disclosure are separately performed for different uplink subframes. Specifically, obtaining of the first subset and the second subset through division, configuration of channel resource sets of the m-resource-element channel format and the n-resource-element channel format, and indication of the resource indication information may be separately performed for the different uplink subframes.

Optionally, in an embodiment, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format. The n-resource-element channel format and the m-resource-element channel format whose time-frequency resources overlap use an orthogonal code. For details, refer to descriptions of the foregoing embodiment. In this way, a multiplexing capability of a channel resource of a channel format such as a PUCCH format 3 can be improved, and resource reservation overheads can be reduced.

Figure 8:
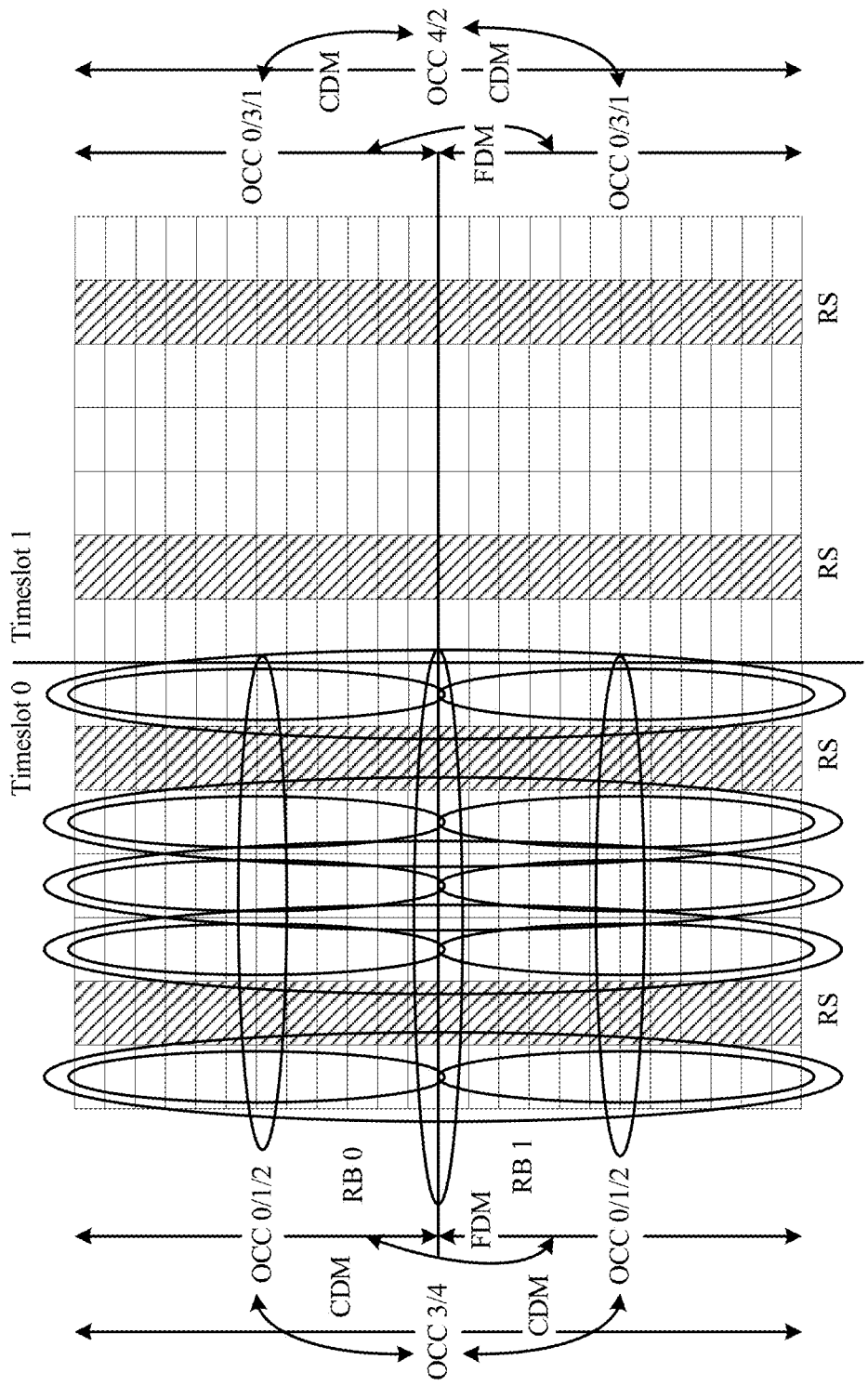
FIG. 8 is a schematic multiplexing diagram of a PUCCH format 3 channel resource according to an embodiment of the present disclosure.

For example, a single-RB PUCCH format 3 channel resource may overlap a dual-RB PUCCH format 3 channel resource in terms of time-frequency resource. For example, the single-RB PUCCH format 3 channel resource may partly overlap the dual-RB PUCCH format 3 channel resource in terms of time-frequency resource, or time-frequency resources corresponding to the dual-RB PUCCH format 3 include time-frequency resources corresponding to the single-RB PUCCH format 3, as shown in FIG. 8. In each timeslot, the single-RB PUCCH format 3 overlaps the dual-RB PUCCH format 3 on two frequency-domain RBs, and frequency division multiplexing may be performed on different channels of the single-RB PUCCH format 3 by using different RBs, such as an RB consisting of 12 upper subcarriers and an RB consisting of 12 lower subcarriers. Time division multiplexing is performed on channels of the single-RB PUCCH format 3 and the dual-RB PUCCH format 3 by using time-domain OCCs, such as an OCC 0/1/2, an OCC 3/4, an OCC 0/3/1, and an OCC 4/2 in FIG. 8. In addition, the single-RB PUCCH format 3 and the dual-RB PUCCH format 3 use different reference signal sequences, and the reference signal sequence includes a time-domain orthogonal code and/or a frequency-domain cyclic shift code.

The foregoing embodiment is described by using a single-RB PUCCH format 3 and a dual-RB PUCCH format 3 as an example. Certainly, this embodiment may be further applied to a PUCCH format 3 of more RBs. In addition, this solution may be extended to a PUCCH format of another resource element, such as a dual-RB PUCCH format and a quad-RB PUCCH format, or PUCCH formats of different quantities of sub RBs. Herein, a frequency-domain width of a sub RB may be less than a frequency-domain width of an RB. For example, a sub RB occupies four subcarriers, and occupies one timeslot or one subframe in a time domain. Alternatively, a time-domain width of a sub RB may be less than a timeslot. For example, a sub RB occupies three time-domain symbols, and occupies 12 subcarriers in a frequency domain, that is, a frequency-domain width of one RB. Alternatively, a sub RB occupies a smaller frequency-domain width and a smaller time-domain width than a current RB in both the time domain and the frequency domain. Therefore, the single-RB PUCCH format 3 and the dual-RB PUCCH format 3 in this embodiment may be extended to an m-resource-element PUCCH format and an n-resource-element PUCCH format. Both m and n are natural numbers, and m>n.

Optionally, the first subset may partly overlap the second subset. For example, it is assumed that eight TDD carriers are configured for the UE, and each carrier corresponds to a TDD uplink-downlink subframe configuration 2. If the foregoing division manner in which carriers are equally divided and sets do not overlap is used, downlink subframes 4, 5, 6, and 8 on carriers 1 to 4 constitutes the first subset, and downlink subframes 4, 5, 6, and 8 on carriers 5 to 8 constitutes the second subset. In this way, if only the first subset is scheduled, an ACK/NACK is encoded by using 16 original ACK/NACK bits. If downlink subframes in the first subset and the second subset are scheduled, an ACK/NACK is encoded by using 32 original ACK/NACK bits. Alternatively, a division manner in which sets partly overlap may be used, that is, the first downlink subframe set consists of downlink subframes 4, 5, 6, and 8 on carriers 1 to 5, and the second downlink subframe set consists of downlink subframes 4, 5, 6, and 8 on carriers 4 and 8. In this case, if downlink subframes in only one set are scheduled, an ACK/NACK is encoded by using 20 original ACK/NACK bits, that is, a codebook and a codebook size are determined according to the scheduled first subset or the scheduled second subset. If downlink subframes in an overlapping part are scheduled, it may be predefined that a codebook and a codebook size are determined by using the first subset. If both sets are scheduled, an ACK/NACK is encoded by using 32 original ACK/NACK bits, that is, a codebook and a codebook size are determined according to a union set of the first subset and the second subset. Because more original bits are used for encoding during single-set scheduling, higher ACK/NACK transmission efficiency can be achieved by using partly-overlapping sets obtained through division. Otherwise, if carriers 1 to 5 or carriers 4 to 8 are scheduled by using non-overlapped sets obtained through division, encoding needs to be performed by using 32 original ACK/NACK bits.

This embodiment of the present disclosure further provides an ACK/NACK transmission solution including set division in which three subsets overlap and there are multiple levels of fallback. This embodiment may be combined with the foregoing two embodiments. Specifically, the processing module 120 of the UE or the processing module 720 of the access network device may control a corresponding receiving module and a corresponding sending module to perform related operations. The foregoing 15 carriers in the TDD uplink-downlink configuration 2 are still used as an example, and the second downlink subframe set is also divided into three subsets. A first subset includes downlink subframes 4, 5, 6, and 8 on carriers 1 to 5, a second subset includes downlink subframes 4, 5, 6, and 8 on carriers 1 to 10, and a third subset includes downlink subframes 4, 5, 6, and 8 on carriers 1 to 15. It can be learned that the second downlink subframe set includes the first downlink subframe set, and the third downlink subframe set includes the second downlink subframe set. Certainly, other division based on an incompletely inclusive relationship is not excluded. A specific method may be directly obtained by extending the foregoing division method in which two sets are obtained. A channel format corresponding to the third subset is a k-resource-element channel format, and k>m. In this embodiment, an n-resource-element format is a single-RB format, an m-resource-element format is a dual-RB format, and a k-resource-element is a quad-RB format.

The UE may determine, according to the resource indication information, to feed back an ACK/NACK by using a specific PUCCH channel resource. Specifically, four states included in 2-bit resource indication information may separately correspond to different downlink subframe sets. For example, a state 00 corresponds to a single-RB PUCCH format 3 channel resource in the first subset, a state 01 and a state 10 separately correspond to dual-RB PUCCH format 3 channel resources in the second subset, and a state 11 corresponds to a tri-RB PUCCH format 3 channel resource in the third subset. For ease of description, it is assumed that a downlink subframe included in the first subset is represented by a subframe i; downlink subframes included in the second subset are represented by subframes i and j, and the subframe j does not belong to the first subset; and downlink subframes included in the third subset are represented by subframe i, j, and k, and the subframe k does not belong to the first subset or the second subset. In this case, if the base station schedules only a downlink subframe i for the UE, the resource indication information indicates a state 00, and the UE determines, according to the state, to feed back a corresponding ACK/NACK by using a single-RB PUCCH format 3 channel resource indicated by the state, and in this case, an ACK/NACK codebook size is determined according to a quantity of downlink subframes i included in the first subset. If the base station schedules a downlink subframe j or downlink subframes i and j for the UE, but does not schedule a downlink subframe k, the resource indication information indicates a state 01 or a state 10, the UE determines, according to the state, to feed back a corresponding ACK/NACK by using a dual-RB PUCCH format 3 channel resource indicated by the state, and in this case, an ACK/NACK codebook size is determined according to quantities of downlink subframes i and downlink subframes j included in the second subset. If the base station schedules a downlink subframe k, downlink subframes i and k, downlink subframes j and k, or downlink subframes i, j, and k for the UE, the resource indication information indicates a state 11, the UE determines, according to the state, to feed back a corresponding ACK/NACK by using a tri-RB PUCCH format 3 channel resource indicated by the state, and in this case, an ACK/NACK codebook size is determined according to quantities of downlink subframes i, downlink subframes j, and downlink subframes k included in the third subset. Only an embodiment in which the resource indication information indicates a PUCCH format 3 channel resource of different quantities of RBs is provided herein, and the foregoing solution using the resource indication information is also applicable to another embodiment. For example, the foregoing solution is also applicable to the following embodiment: The resource indication information indicates four tri-RB PUCCH format 3 channel resources, and the UE performs, according to a received relationship between the first downlink subframe set and three subsets, fallback transmission on some resources of a tri-RB PUCCH format 3 channel resource indicated by the resource indication information, such as dual-RB PUCCH format 3 or single-RB PUCCH format 3 fallback transmission.

When m is greater than n, the foregoing embodiment based on an m-resource-element channel format and an n-resource-element channel format, including an independent configuration for different uplink subframes, channel resource overlapping, set overlapping, three levels of fallback, and the like, is completely applicable to this solution of p codebook sizes and q codebook sizes. In addition, the p-codebook-size channel format and the q-codebook-size channel format are further applicable to a case in which m is equal to n.

It should be noted that all embodiments of the present disclosure are described by using TDD CA as an example. In addition to TDD CA, the solutions in the embodiments of the present disclosure may be further applied to FDD CA and FDD+TDD CA. Solutions in FDD CA and FDD+TDD CA are similar to those in TDD CA.

Figure 9:
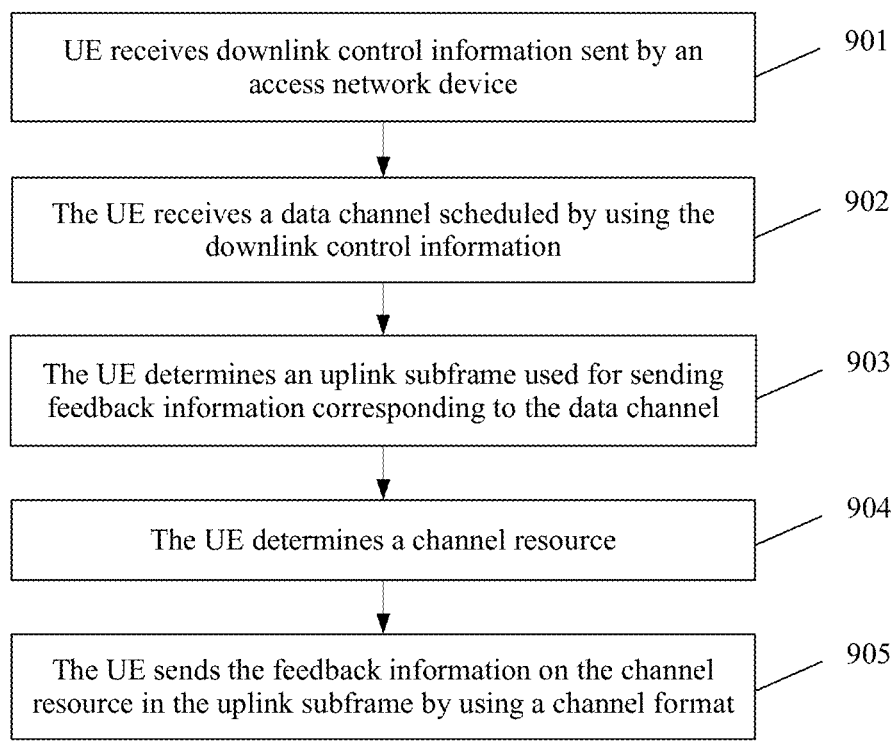
FIG. 9 is a flowchart of a feedback information sending method according to an embodiment of the present disclosure.

FIG. 9 shows a feedback information sending method according to an embodiment of the present disclosure. The method corresponds to the embodiment of the foregoing user equipment, and the foregoing user equipment can execute the method in this embodiment. Therefore, for same content, refer to descriptions of the foregoing embodiments. Details are not repeatedly described herein. This embodiment includes the following steps:

Step 901: User equipment UE receives downlink control information sent by an access network device.

Step 902: The UE receives a data channel scheduled by using the downlink control information.

Step 903: The UE determines an uplink subframe used for sending feedback information corresponding to the data channel, where a first downlink subframe set associated with the uplink subframe includes a first subset and a second subset, the first subset includes at least two downlink subframes, and the first subset is a proper subset of the second subset.

Step 904: The UE determines a channel resource, where the channel resource is a first uplink channel resource or a second uplink channel resource, the first uplink channel resource corresponds to the first subset, and the second uplink channel resource corresponds to the second subset.

Step 905: The UE sends the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

The present disclosure further provides the following embodiment:

User equipment UE receives downlink control information sent by an access network device.

The UE receives a data channel scheduled by using the downlink control information.

The UE determines an uplink subframe used for sending feedback information corresponding to the data channel. A first downlink subframe set associated with the uplink subframe includes a first subset and a second subset, the first subset includes at least two downlink subframes, and the first subset is a proper subset of the second subset.

The UE determines a channel resource. The channel resource is a first uplink channel resource or a second uplink channel resource, the first uplink channel resource corresponds to the first subset, and the second uplink channel resource corresponds to the second subset.

The UE sends the feedback information on the channel resource in the uplink subframe by using a channel format. The channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

Further, that the UE receives a data channel scheduled by using the downlink control information includes: the UE receives, on a downlink subframe included in a second downlink subframe set, the data channel scheduled by using the downlink control information.

In an optional embodiment, in case that the second downlink subframe set is a subset of the first subset, the channel resource determined by the UE is the first uplink channel resource; or in case that the second downlink subframe set includes only a downlink subframe that is in the second subset but does not belong to the first subset, the channel resource determined by the UE is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

In another optional embodiment, in case that the second downlink subframe set is a subset of the first subset, the channel resource determined by the UE is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource. In the solution in this embodiment, when the second downlink subframe set includes only a downlink subframe that is in the second subset but does not belong to the first subset, similar to a case in which the second downlink subframe set is a subset of the first subset, the second downlink subframe set may be considered as a subset. The feedback information is sent by using a channel resource of the n-resource-element channel format, that is, the feedback information is sent by using the fallback n-resource-element channel format.

Optionally, the downlink control information includes resource indication information; and that the UE determines a channel resource includes: the UE determines, according to the resource indication information, a channel resource used for carrying the feedback information.

Optionally, before the UE determines the channel resource, the method further includes:

the UE obtains a second uplink channel resource set that is configured by the access network device, where the second uplink channel resource is an uplink channel resource in the second uplink channel resource set, a part of each uplink channel resource in multiple uplink channel resources included in the second uplink channel resource set constitutes a first uplink channel resource set, and the first uplink channel resource is an uplink channel resource in the first uplink channel resource set.

Further, the channel resource determined by the UE is the first uplink channel resource.

That the UE determines a channel resource includes:

the UE determines, from the second uplink channel resource set according to the resource indication information, an uplink channel resource indicated by the resource indication information; and the UE determines the first uplink channel resource from the uplink channel resource indicated by the resource indication information; or the UE determines the first uplink channel resource from the first uplink channel resource set according to the resource indication information; or the UE determines the first uplink channel resource according to the resource indication information, where the first uplink channel resource is a part of an uplink channel resource that is in the second uplink channel resource set and that is indicated by the resource indication information.

In case that the channel resource determined by the UE is the second uplink channel resource, the UE determines the second uplink channel resource from the second uplink channel resource set according to the resource indication information.

That the UE determines a channel resource includes:

the UE determines, according to identification information of the UE or preconfigured information, the first uplink channel resource in the uplink channel resource indicated by the resource indication information, where the uplink channel resource indicated by the resource indication information is an uplink channel resource in the second uplink channel resource set.

Optionally, before the UE determines the channel resource, the method further includes:

the UE obtains a first uplink channel resource set and a second uplink channel set that are preconfigured by the access network device, where the first uplink channel resource is an uplink channel resource in the first uplink channel resource set, and the second uplink channel resource is an uplink channel resource in the second uplink channel resource set.

In an embodiment, a first state set of the resource indication information indicates an uplink channel resource in the first uplink channel resource set, a second state set of the resource indication information indicates an uplink channel resource in the second uplink channel resource set, and the first state set does not intersect the second state set.

Further, the channel resource determined by the UE is the first uplink channel resource, and that the UE determines a channel resource includes: the UE determines the first uplink channel resource from the first uplink channel set according to a state in the first state set of the resource indication information; or the channel resource determined by the UE is the second uplink channel resource, and that the UE determines a channel resource includes: the UE determines the second uplink channel resource for the feedback information from the second uplink channel set according to a state in the second state set of the resource indication information.

In another embodiment, a state of the resource indication information indicates an uplink channel resource in the first uplink channel resource set and/or an uplink channel resource in the second uplink channel resource set.

Further, the channel resource determined by the UE is the first uplink channel resource, and that the UE determines a channel resource includes:

the UE determines, from the first uplink channel resource set according to the resource indication information, a third uplink channel resource indicated by the resource indication information, and determines, from the second uplink channel resource set according to the resource indication information, a fourth uplink channel resource indicated by the resource indication information; the UE determines that the second downlink subframe set is a subset of the first subset; and the UE determines that the third uplink channel resource is the first uplink channel resource; or the UE determines that the second downlink subframe set is a subset of the first subset; and the UE determines, from the first uplink channel resource set according to the resource indication information, the first uplink channel resource indicated by the resource indication information; or the channel resource determined by the UE is the second uplink channel resource, and that the UE determines a channel resource includes:

the UE determines, from the first uplink channel resource set according to the resource indication information, a fifth uplink channel resource indicated by the resource indication information, and determines, from the second uplink channel resource set according to the resource indication information, a sixth uplink channel resource indicated by the resource indication information; the UE determines that the second downlink subframe set includes only a downlink subframe that is in the second subset but does not belong to the first subset; and the UE determines that the sixth uplink channel resource is the second uplink channel resource; or the UE determines that the second downlink subframe set includes only a downlink subframe that is in the second subset but does not belong to the first subset; and the UE determines, from the second uplink channel resource set according to the state of the resource indication information, the second uplink channel resource indicated by the resource indication information; or the UE determines, from the first uplink channel resource set according to the resource indication information, a fifth uplink channel resource indicated by the resource indication information, and determines, from the second uplink channel resource set according to the resource indication information, a sixth uplink channel resource indicated by the resource indication information; the UE determines that the second downlink subframe set includes a downlink subframe in the first subset and a downlink subframe that is in the second subset but does not belong to the first subset, but does not include a downlink subframe that is not included in the first subset or the second subset; and the UE determines that the sixth uplink channel resource is the second uplink channel resource; or the UE determines that the second downlink subframe set includes a downlink subframe in the first subset and a downlink subframe that is in the second subset but does not belong to the first subset, but does not include a downlink subframe that is not included in the first subset or the second subset; and the UE determines, from the second uplink channel resource set according to the resource indication information, the second uplink channel resource indicated by the resource indication information.

Optionally, before the UE determines the channel resource, the method further includes:

the UE obtains a first uplink channel resource set and a second uplink channel set that are preconfigured by the access network device, where the first uplink channel resource is an uplink channel resource in the first uplink channel resource set, and the second uplink channel resource is an uplink channel resource in the second uplink channel resource set.

The downlink control information includes resource indication information, states of the resource indication information include a first state set and a second state set, the first state set indicates an uplink channel resource in the first uplink channel resource set, the second state set indicates an uplink channel resource in the second uplink channel resource set, and the first state set does not intersect the second state set.

That the UE determines a channel resource includes:

in case that the second downlink subframe set is a subset of the first subset, the UE determines, from the second uplink channel resource set according to the resource indication information, the second uplink channel resource indicated by the resource indication information.

In this case, the UE determines the channel resource according to the resource indication information. When the channel resource indicated by the resource indication information is the second uplink channel resource, the second downlink subframe set that is used for sending a PDCCH and that is detected by the UE is a subset of the first subset. In this case, it indicates that missed detection occurs in the UE, and the UE still sends the feedback information by using the second uplink channel resource indicated by the resource indication information.

Optionally, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format, where the n-resource-element channel format and the m-resource-element channel format whose time-frequency resources overlap use an orthogonal code.

Further, before the UE determines the channel resource, the method further includes: the UE determines the first subset and the second subset according to a preconfiguration.

The preconfiguration may be independently performed for different uplink subframes.

It should be noted that the foregoing solution in this embodiment may be used as a separate embodiment, independently of steps 901 to 905.

Figure 10:
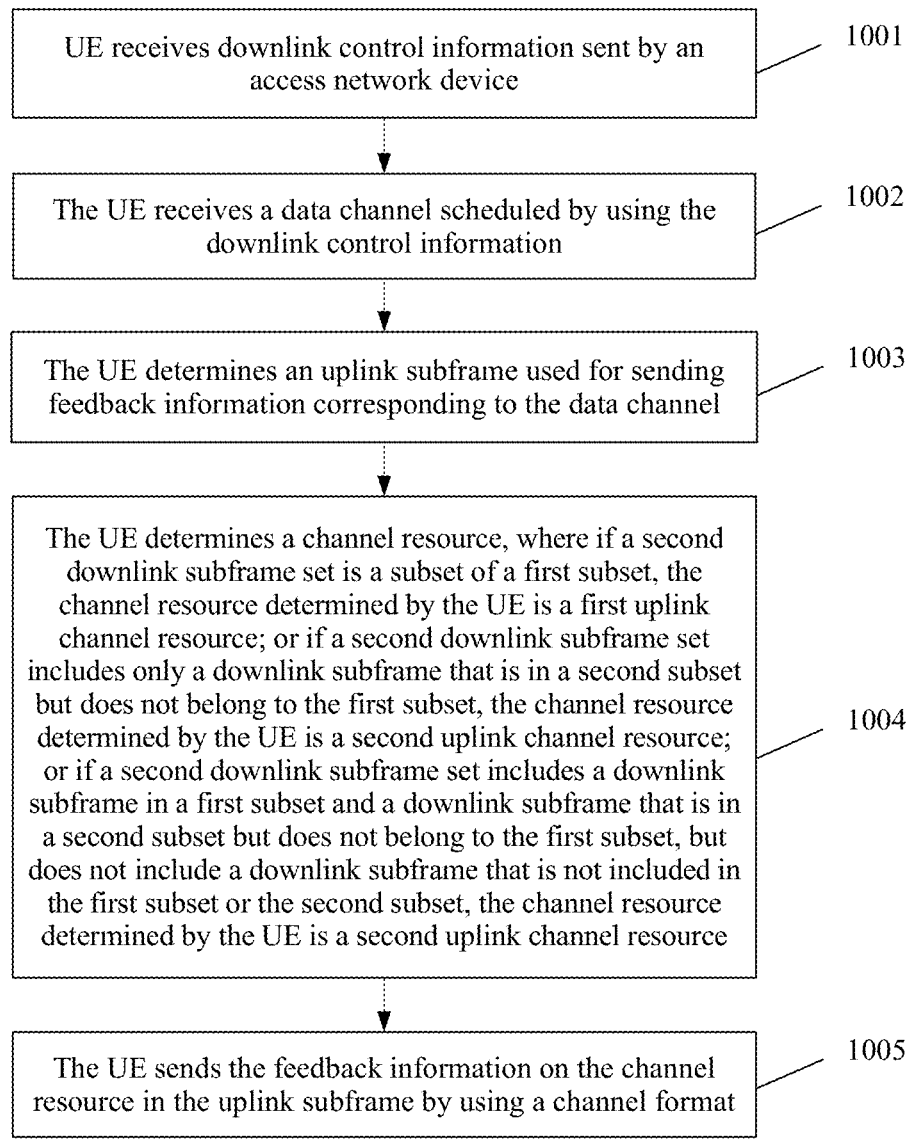
FIG. 10 is a flowchart of a feedback information sending method according to another embodiment of the present disclosure.

FIG. 10 shows a feedback information sending method according to an embodiment. The method corresponds to the embodiment of the foregoing user equipment, and the foregoing user equipment can execute the method in this embodiment. Therefore, for same content, refer to descriptions of the foregoing embodiments. Details are not repeatedly described herein. In addition, this embodiment is a separate solution of the foregoing embodiment corresponding to FIG. 9. For details, refer to descriptions of the foregoing embodiment. This embodiment includes the following steps:

Step 1001: UE receives downlink control information sent by an access network device.

Step 1002: The UE receives a data channel scheduled by using the downlink control information.

Step 1003: The UE determines an uplink subframe used for sending feedback information corresponding to the data channel, where a first downlink subframe set associated with the uplink subframe includes a first subset and a second subset, the first subset includes at least two downlink subframes, and the first subset is a proper subset of the second subset.

Step 1004: The UE determines a channel resource, where in case that the second downlink subframe set is a subset of the first subset, the channel resource determined by the UE is the first uplink channel resource; or in case that the second downlink subframe set includes only a downlink subframe that is in the second subset but does not belong to the first subset, the channel resource determined by the UE is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

Step 1005: The UE sends the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

The present disclosure further provides the following embodiment:

UE receives downlink control information sent by an access network device.

The UE receives a data channel scheduled by using the downlink control information.

The UE determines an uplink subframe used for sending feedback information corresponding to the data channel. A first downlink subframe set associated with the uplink subframe includes a first subset and a second subset, the first subset includes at least two downlink subframes, and the first subset is a proper subset of the second subset.

The UE determines a channel resource, where in case that the second downlink subframe set is a subset of the first subset, the channel resource determined by the UE is the first uplink channel resource; or in case that the second downlink subframe set includes only a downlink subframe that is in the second subset but does not belong to the first subset, the channel resource determined by the UE is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

The UE sends the feedback information on the channel resource in the uplink subframe by using a channel format. The channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

Figure 11:
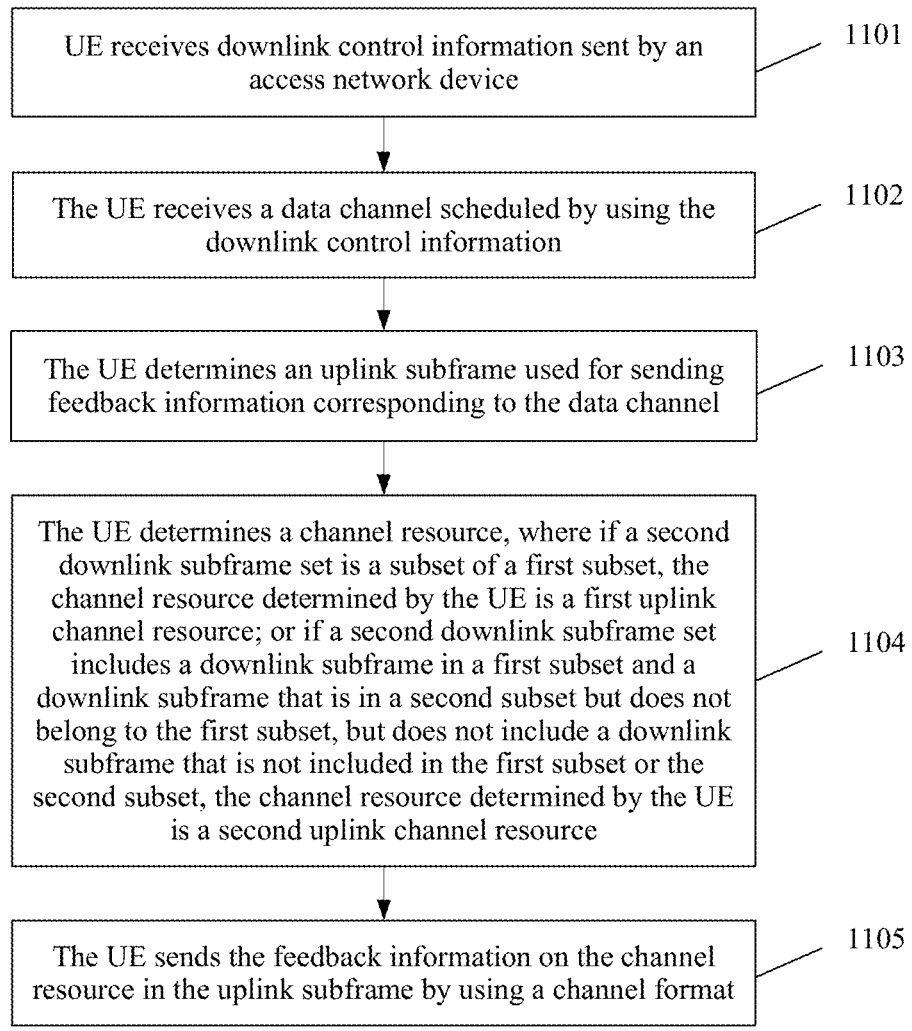
FIG. 11 is a flowchart of a feedback information sending method according to still another embodiment of the present disclosure.

FIG. 11 shows a feedback information sending method according to an embodiment. The method corresponds to the embodiment of the foregoing user equipment, and the foregoing user equipment can execute the method in this embodiment. Therefore, for same content, refer to descriptions of the foregoing embodiments. Details are not repeatedly described herein. In addition, this embodiment is a separate solution of the foregoing embodiment corresponding to FIG. 9. For details, refer to descriptions of the foregoing embodiment. This embodiment includes the following steps:

Step 1101: UE receives downlink control information sent by an access network device.

Step 1102: The UE receives a data channel scheduled by using the downlink control information.

Step 1103: The UE determines an uplink subframe used for sending feedback information corresponding to the data channel, where a first downlink subframe set associated with the uplink subframe includes a first subset and a second subset, the first subset includes at least two downlink subframes, and the first subset is a proper subset of the second subset.

Step 1104: The UE determines a channel resource, where in case that the second downlink subframe set is a subset of the first subset, the channel resource determined by the UE is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

Step 1105: The UE sends the feedback information on the channel resource in the uplink subframe by using a channel format, where the channel format is an n-resource-element channel format, and the UE sends the feedback information on the first uplink channel resource by using the n-resource-element channel format, or the channel format is an m-resource-element channel format, and the UE sends the feedback information on the second uplink channel resource by using the m-resource-element channel format; and m and n are natural numbers, and m>n.

The present disclosure further provides the following embodiment:

UE receives downlink control information sent by an access network device.

The UE receives a data channel scheduled by using the downlink control information.

The UE determines an uplink subframe used for sending feedback information corresponding to the data channel. A first downlink subframe set associated with the uplink subframe includes a first subset and a second subset, the first subset includes at least two downlink subframes, and the first subset is a proper subset of the second subset.

The UE determines a channel resource. In case that the second downlink subframe set is a subset of the first subset, the channel resource determined by the UE is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource.

The UE sends the feedback information on the channel resource in the uplink subframe by using a channel format. The channel format is a p-codebook-size channel format, and the UE sends the feedback information on the first uplink channel resource by using the p-codebook-size channel format, or the channel format is a q-codebook-size channel format, and the UE sends the feedback information on the second uplink channel resource by using the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

In case that the second downlink subframe set includes a downlink subframe in the first subset and a downlink subframe that is in the second subset but does not belong to the first subset, but does not include a downlink subframe that is not included in the first subset or the second subset, the channel resource determined by the UE is the second uplink channel resource. In the solution in this embodiment, when the second downlink subframe set includes only a downlink subframe that is in the second subset but does not belong to the first subset, similar to a case in which the second downlink subframe set is a subset of the first subset, the second downlink subframe set may be considered as a subset. The feedback information is sent by using a channel resource of the n-resource-element channel format, that is, the feedback information is sent by using the fallback n-resource-element channel format.

Figure 12:
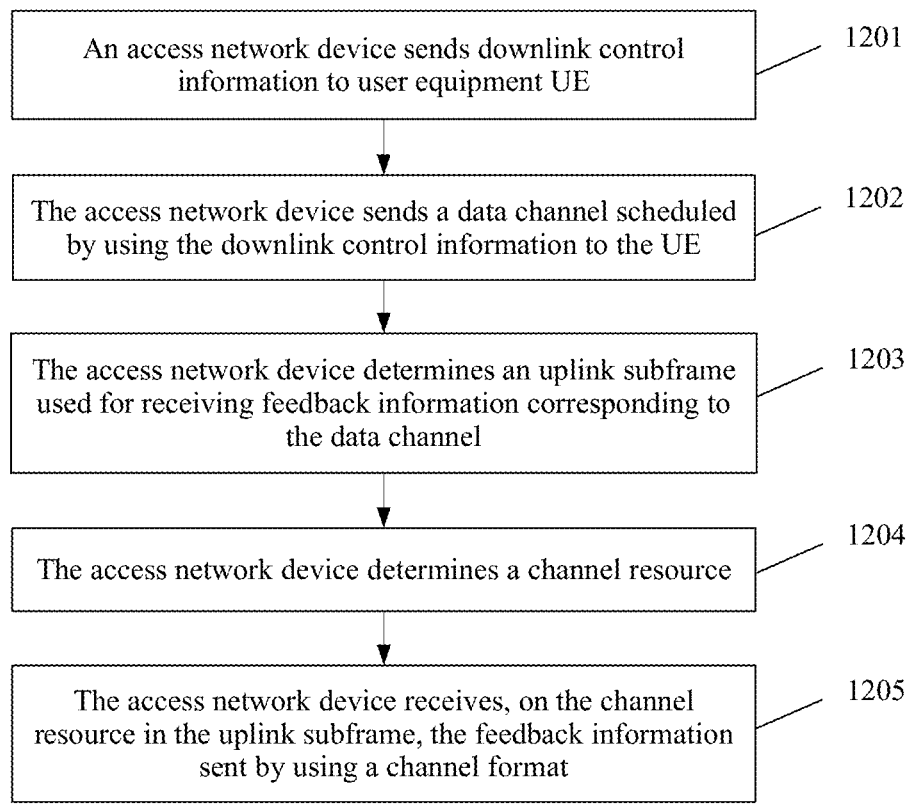
FIG. 12 is a flowchart of a feedback information receiving method according to an embodiment of the present disclosure.

FIG. 12 shows a feedback information receiving method according to an embodiment of the present disclosure. The method corresponds to the embodiment of the foregoing access network device, and the foregoing access network device can execute the method in this embodiment. Therefore, for same content, refer to descriptions of the foregoing embodiments. Details are not repeatedly described herein. This embodiment includes the following steps:

Step 1201: An access network device sends downlink control information to user equipment UE.

Step 1202: The access network device sends a data channel scheduled by using the downlink control information to the UE.

Step 1203: The access network device determines an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset.

Step 1204: The access network device determines a channel resource, where the channel resource is a first uplink channel resource or a second uplink channel resource, the first uplink channel resource corresponds to the first subset, and the second uplink channel resource corresponds to the second subset.

Step 1205: The access network device receives, on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

The present disclosure further provides the following embodiment:

An access network device sends downlink control information to user equipment UE.

The access network device sends a data channel scheduled by using the downlink control information to the UE.

The access network device determines an uplink subframe used for receiving feedback information corresponding to the data channel. A first downlink subframe set associated with the uplink subframe includes a first subset and a second subset, the first subset includes at least two downlink subframes, and the first subset is a proper subset of the second subset.

The access network device determines a channel resource. The channel resource is a first uplink channel resource or a second uplink channel resource, the first uplink channel resource corresponds to the first subset, and the second uplink channel resource corresponds to the second subset.

The access network device receives, on the channel resource in the uplink subframe, the feedback information sent by using a channel format. The channel format is a p-codebook-size channel format, and the first uplink channel resource carries feedback information of the p-codebook-size channel format, or the channel format is a q-codebook-size channel format, and the second uplink channel resource carries feedback information of the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

Further, that the access network device sends a data channel scheduled by using the downlink control information to the UE includes: the access network device sends, in a downlink subframe included in a second downlink subframe set, the data channel scheduled by using the downlink control information.

In an optional solution, in case that the second downlink subframe set is a subset of the first subset, the channel resource determined by the access network device is the first uplink channel resource; or in case that the second downlink subframe set includes only a downlink subframe that is in the second subset but does not belong to the first subset, the channel resource determined by the access network device is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

In another optional solution, in case that the second downlink subframe set is a subset of the first subset, the channel resource determined by the access network device is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

Further, the downlink control information includes resource indication information, and the resource indication information is used to indicate the first uplink channel resource or the second uplink channel resource used for carrying the feedback information.

Optionally, before the access network device determines the channel resource, the method further includes:

the access network device sends information about a second uplink channel resource set to the UE, where the second uplink channel resource is an uplink channel resource in the second uplink channel resource set, a part of each uplink channel resource in multiple uplink channel resources in the second uplink channel resource set constitutes a first uplink channel resource set, and the first uplink channel resource is an uplink channel resource in the first uplink channel resource set.

Further, the channel resource determined by the access network device is the first uplink channel resource, and the resource indication information indicates an uplink channel resource that is in the second uplink channel resource set and that includes the first uplink channel resource; or the resource indication information indicates the first uplink channel resource in the first uplink channel resource set; or the channel resource determined by the access network device is the second uplink channel resource, and the resource indication information indicates the second uplink channel resource in the second uplink channel resource set.

Further, the resource indication information indicates the uplink channel resource that is in the second uplink channel resource set and that includes the first uplink channel resource.

That the access network device determines a channel resource includes:

the access network device determines, according to identification information of the UE or preconfigured information, the first uplink channel resource in the uplink channel resource indicated by the resource indication information.

Optionally, before the access network device determines the channel resource, the method further includes:

the access network device sends information about a first uplink channel resource set and information about a second uplink channel set to the UE, where the first uplink channel resource is an uplink channel resource in the first uplink channel resource set, and the second uplink channel resource is an uplink channel resource in the second uplink channel resource set.

Further, a first state set of the resource indication information indicates an uplink channel resource in the first uplink channel resource set, a second state set of the resource indication information indicates an uplink channel resource in the second uplink channel resource set, and the first state set does not intersect the second state set.

Optionally, a state of the resource indication information indicates an uplink channel resource in the first uplink channel resource set and/or an uplink channel resource in the second uplink channel resource set.

Further, that the access network device receives, on the channel resource in the uplink subframe, the feedback information sent by using a channel format includes: the access network device receives, on the second uplink channel resource indicated by the resource indication information in the uplink subframe, the feedback information sent by using the m-resource-element channel format.

Further, after the access network device receives, on the channel resource in the uplink subframe, the feedback information sent by using the channel format, the method further includes:

the access network device determines a first uplink channel resource in the second uplink channel resource according to the identification information of the UE or the preconfigured information, and receives, on the first uplink channel resource, the feedback information sent by using the n-resource-element channel format; or the access network device determines a first uplink channel resource in the first uplink channel resource according to the resource indication information, and receives, on the first uplink channel resource, the feedback information sent by using the n-resource-element channel format.

Further, some time-frequency resources of the first uplink channel resource corresponding to the n-resource-element channel format overlap some time-frequency resources of the second uplink channel resource corresponding to the m-resource-element channel format; or time-frequency resources of the first uplink channel resource corresponding to the n-resource-element channel format are some time-frequency resources of the second uplink channel resource corresponding to the m-resource-element channel format. The n-resource-element channel format and the m-resource-element channel format whose time-frequency resources overlap use an orthogonal code.

Further, before the access network device determines the channel resource, the method further includes: the access network device determines the first subset and the second subset according to a preconfiguration. The preconfiguration may be independently performed for different uplink subframes.

It should be noted that the foregoing solution in this embodiment may be used as a separate embodiment, independently of steps 1201 to 1205.

Figure 13:
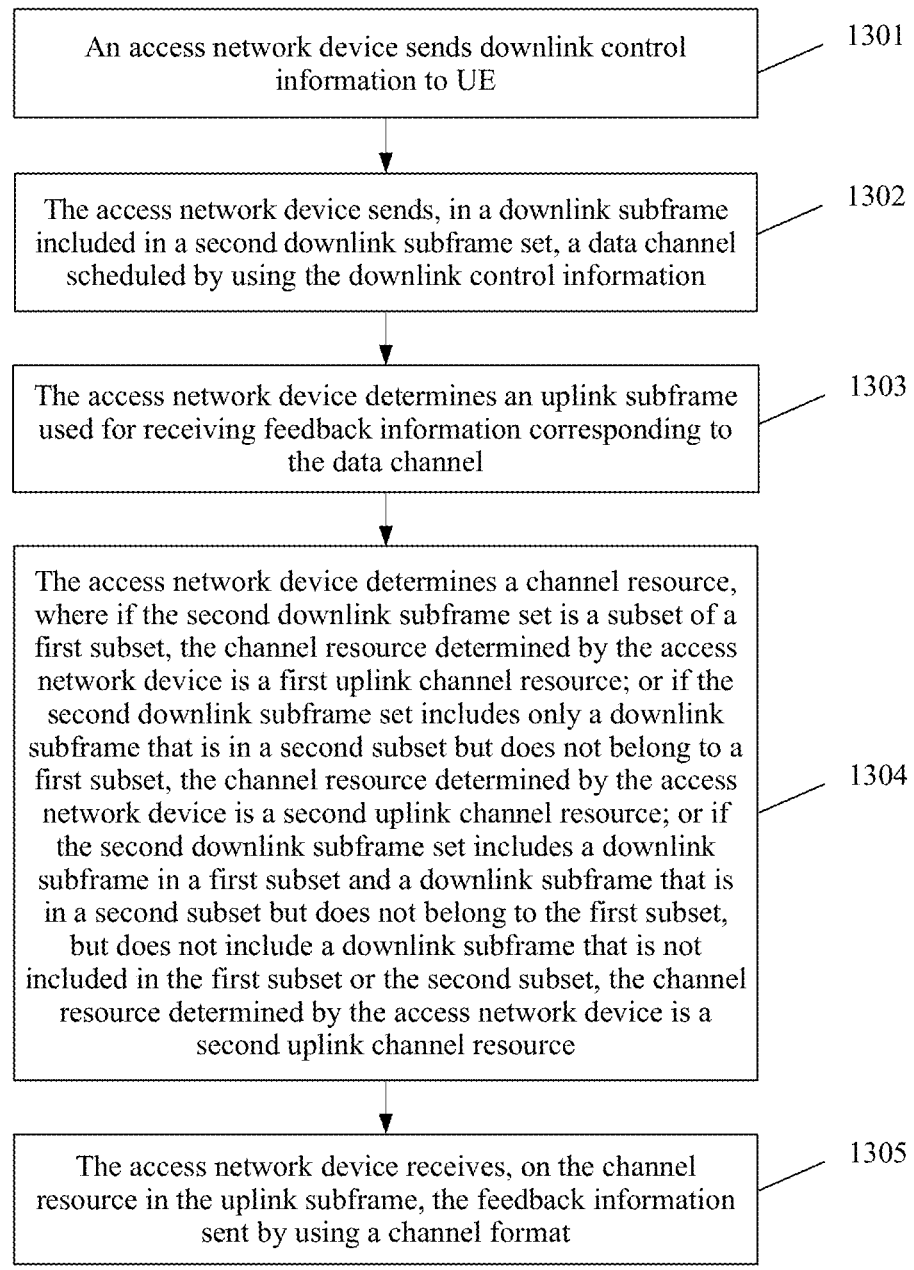
FIG. 13 is a flowchart of a feedback information receiving method according to another embodiment of the present disclosure.

FIG. 13 shows a feedback information receiving method according to an embodiment. The method corresponds to the embodiment of the foregoing access network device, and the foregoing access network device can execute the method in this embodiment. Therefore, for same content, refer to descriptions of the foregoing embodiments. Details are not repeatedly described herein. In addition, this embodiment is a separate solution of the foregoing embodiment corresponding to FIG. 12. For details, refer to descriptions of the foregoing embodiment. This embodiment includes the following steps:

Step 1301: An access network device sends downlink control information to UE.

Step 1302: The access network device sends, in a downlink subframe included in a second downlink subframe set, the data channel scheduled by using the downlink control information.

Step 1303: The access network device determines an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset.

Step 1304: The access network device determines a channel resource, where in case that the second downlink subframe set is a subset of the first subset, the channel resource determined by the access network device is the first uplink channel resource; or in case that the second downlink subframe set includes only a downlink subframe that is in the second subset but does not belong to the first subset, the channel resource determined by the access network device is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

Step 1305: The access network device receives, on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

The present disclosure further provides the following embodiment:

An access network device sends downlink control information to UE.

The access network device sends, in a downlink subframe included in a second downlink subframe set, the data channel scheduled by using the downlink control information.

The access network device determines an uplink subframe used for receiving feedback information corresponding to the data channel. A first downlink subframe set associated with the uplink subframe includes a first subset and a second subset, the first subset includes at least two downlink subframes, and the first subset is a proper subset of the second subset.

The access network device determines a channel resource. In case that the second downlink subframe set is a subset of the first subset, the channel resource determined by the access network device is the first uplink channel resource; or in case that the second downlink subframe set includes only a downlink subframe that is in the second subset but does not belong to the first subset, the channel resource determined by the access network device is the second uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

The access network device receives, on the channel resource in the uplink subframe, the feedback information sent by using a channel format. The channel format is a p-codebook-size channel format, and the first uplink channel resource carries feedback information of the p-codebook-size channel format, or the channel format is a q-codebook-size channel format, and the second uplink channel resource carries feedback information of the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

Further, that the access network device sends a data channel scheduled by using the downlink control information to the UE includes: the access network device sends, in a downlink subframe included in a second downlink subframe set, the data channel scheduled by using the downlink control information.

Figure 14:
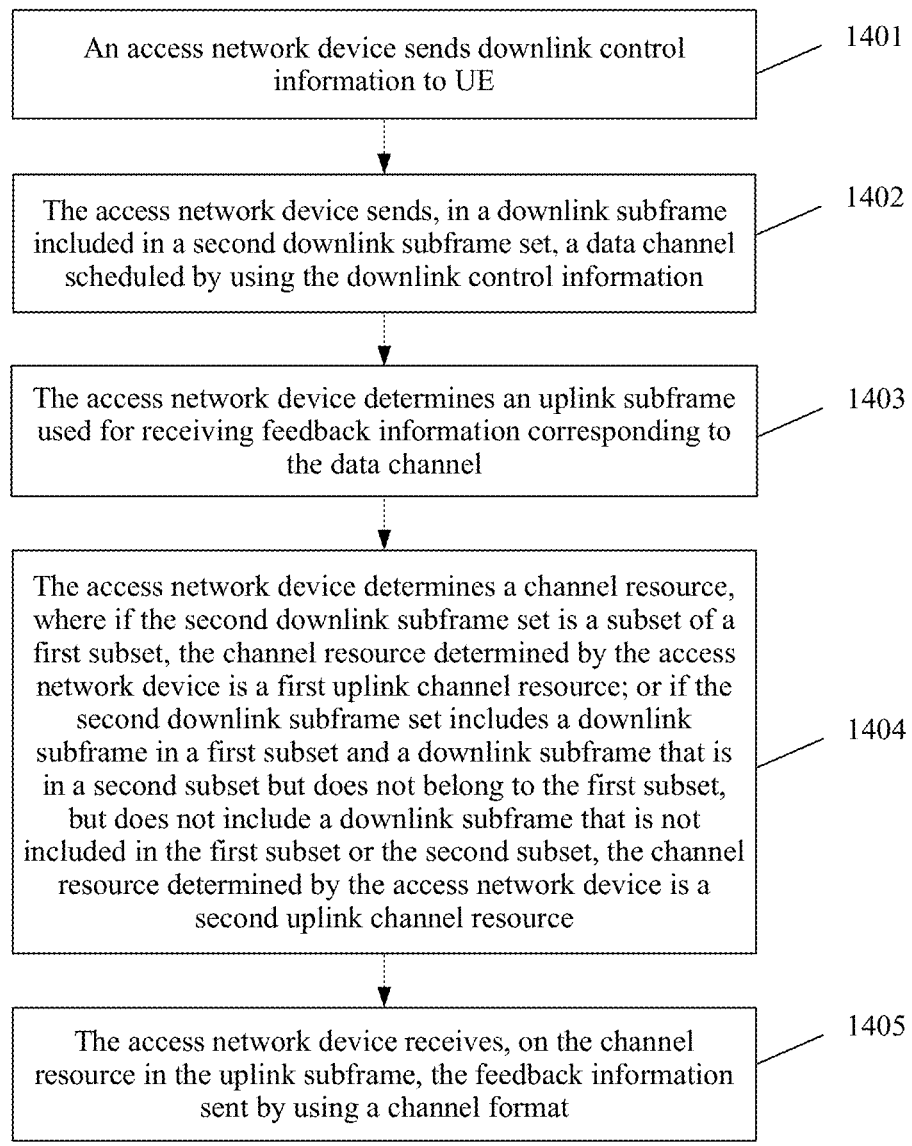
FIG. 14 is a flowchart of a feedback information receiving method according to still another embodiment of the present disclosure.

FIG. 14 shows a feedback information receiving method according to an embodiment. The method corresponds to the embodiment of the foregoing access network device, and the foregoing access network device can execute the method in this embodiment. Therefore, for same content, refer to descriptions of the foregoing embodiments. Details are not repeatedly described herein. In addition, this embodiment is a separate solution of the foregoing embodiment corresponding to FIG. 12. For details, refer to descriptions of the foregoing embodiment. This embodiment includes the following steps:

Step 1401: An access network device sends downlink control information to UE.

Step 1402: The access network device sends, in a downlink subframe included in a second downlink subframe set, the data channel scheduled by using the downlink control information.

Step 1403: The access network device determines an uplink subframe used for receiving feedback information corresponding to the data channel, where a first downlink subframe set associated with the uplink subframe includes a first subset and a second subset, the first subset includes at least two downlink subframes, and the first subset is a proper subset of the second subset.

Step 1404: The access network device determines a channel resource, where in case that the second downlink subframe set is a subset of the first subset, the channel resource determined by the access network device is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

Step 1405: The access network device receives, on the channel resource in the uplink subframe, the feedback information sent by using a channel format, where the channel format is an n-resource-element channel format, and the first uplink channel resource carries feedback information of the n-resource-element channel format, or the channel format is an m-resource-element channel format, and the second uplink channel resource carries feedback information of the m-resource-element channel format; and m and n are natural numbers, and m>n.

The present disclosure further provides the following embodiment:

An access network device sends downlink control information to UE.

The access network device sends, in a downlink subframe included in a second downlink subframe set, the data channel scheduled by using the downlink control information.

The access network device determines an uplink subframe used for receiving feedback information corresponding to the data channel. A first downlink subframe set associated with the uplink subframe includes a first subset and a second subset, the first subset includes at least two downlink subframes, and the first subset is a proper subset of the second subset.

The access network device determines a channel resource. In case that the second downlink subframe set is a subset of the first subset, the channel resource determined by the access network device is the first uplink channel resource; or in case that the second downlink subframe set includes a downlink subframe in the first subset and a downlink subframe that is in the second subset but does not belong to the first subset, but does not include a downlink subframe that is not included in the first subset or the second subset, the channel resource determined by the access network device is the second uplink channel resource.

The access network device receives, on the channel resource in the uplink subframe, the feedback information sent by using a channel format. The channel format is a p-codebook-size channel format, and the first uplink channel resource carries feedback information of the p-codebook-size channel format, or the channel format is a q-codebook-size channel format, and the second uplink channel resource carries feedback information of the q-codebook-size channel format; and p and q are natural numbers, and p>q.

For specific descriptions of the p-codebook-size channel format and the q-codebook-size channel format, refer to descriptions of the foregoing embodiment. In descriptions of the following embodiment, the n-resource-element channel format may be directly replaced with the p-codebook-size channel format, the m-resource-element channel format may be directly replaced with the q-codebook-size channel format, and m may be greater than or equal to n.

According to the foregoing embodiment, when more carriers are configured for UE, a maximum quantity of ACK/NACK bits exceeds a current bearer capability of a single-RB PUCCH format 3. In this embodiment of the present disclosure, a downlink subframe set corresponding to an uplink subframe is divided into at least two subsets, a first subset is a proper subset of a second subset, and corresponding uplink channel resources are configured for the two subsets. For a large subset, feedback information is sent by using a large resource format, and for a small subset, feedback information is sent by using a small resource format, thereby resolving a problem of how to send feedback information when more carriers are configured. In addition, when there is a small quantity of instantaneously scheduled carriers, feedback information may be sent by using the fallback small resource format. Therefore, in this embodiment of the present disclosure, resource overheads can be reduced when an ACK/NACK is fed back.

It should be noted that the processing module in the foregoing all embodiments of the present disclosure may be implemented by at least one processor. The processor herein may be a central processing unit (CPU), or may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The sending module may be implemented by a transmitter or a transceiver. The receiving module may be implemented by a receiver or a transceiver. In addition, the access network device and the user equipment in the foregoing embodiments of the present disclosure may further include a component such as a memory. The memory herein may include a read-only memory and a random access memory, and provides an instruction and data for a processor. A part of the memory may further include a nonvolatile random access memory. For example, the memory may further store information about a device type. The processor invokes instruction code in the memory, so as to control other modules of the network device and the user equipment in the embodiments of the present disclosure to execute the foregoing operations.

It should be understood that "one embodiment" or "an embodiment" mentioned throughout this specification means that specific features, structures, or characteristics related to the embodiment are included in at least one embodiment of the present disclosure. Therefore, "in one embodiment" or "in an embodiment" throughout this specification does not necessarily refer to a same embodiment. In addition, these specific features, structures, or characteristics may be combined in one or more embodiments in any proper manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In several embodiments provided in this application, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus, comprising:
   a receiver, configured to: receive downlink control information from an access network device, and receive a data channel scheduled by the downlink control information;
   a processor, configured to:
      determine an uplink time unit to send feedback information corresponding to the data channel; and
      determine a first physical uplink control channel (PUCCH) resource according to resource indication information, wherein the first PUCCH resource is a part of a second PUCCH resource that is in a second PUCCH resource set, and wherein the second PUCCH resource is indicated by the resource indication information; and
   a transmitter, configured to: send the feedback information on the first PUCCH resource in the uplink time unit.

2. The apparatus according to claim 1, wherein the second PUCCH channel resource set is configured by the access network device, and the first PUCCH channel resource is on a primary component carrier.

3. The apparatus according to claim 2, wherein the second PUCCH channel resource is on the primary component carrier.

4. The apparatus according to claim 1, wherein the downlink control information comprises the resource indication information.

5. The apparatus according to claim 1, wherein the processor is further configured to:
   determine the first PUCCH resource in the second PUCCH resource according to preconfigured information.

6. The apparatus according to claim 1, wherein the processor is further configured to:
   determine, from the second PUCCH channel resource set, the second PUCCH channel resource indicated by the resource indication information, and
   determine the first PUCCH channel resource from the second PUCCH channel resource according to preconfigured information.

7. The apparatus according to claim 1, wherein the first PUCCH resource comprises one or more resource blocks that are part of resource blocks of the second PUCCH resource.

8. A feedback information sending method, comprising:
   receiving, by a user equipment (UE), downlink control information from an access network device;
   receiving, by the UE, a data channel scheduled by the downlink control information;
   determining, by the UE, an uplink time unit to send feedback information corresponding to the data channel;
   determining, by the UE, a first physical uplink control channel (PUCCH) resource according to resource indication information, wherein the first PUCCH resource is a part of a second PUCCH resource that is included in a second PUCCH resource set, and wherein the second PUCCH resource is indicated by the resource indication information; and
   sending, by the UE, feedback information on the first PUCCH resource in the uplink time unit.

9. The method according to claim 8, wherein the second PUCCH channel resource set is configured by the access network device, and the first PUCCH channel resource is on a primary component carrier.

10. The method according to claim 9, wherein the second PUCCH channel resource is on the primary component carrier.

11. The method according to claim 8, wherein the downlink control information comprises the resource indication information.

12. The method according to claim 8, wherein the determining, by the UE, the first PUCCH resource further comprises:
    determining, by the UE, the first PUCCH resource in the second PUCCH resource according to preconfigured information.

13. The method according to claim 8, wherein the determining, by the UE, the first PUCCH resource further comprises:
    determining, by the UE, from the second PUCCH channel resource set, the second PUCCH channel resource indicated by the resource indication information; and
    determining, by the UE, the first PUCCH channel resource from the second PUCCH channel resource according to preconfigured information.

14. The method according to claim 8, wherein the first PUCCH resource comprises one or more resource blocks that are part of resource blocks of the second PUCCH resource.

15. A non-transitory computer readable medium storing computer instructions that, when executed by at least one processor of a user equipment (UE), cause the UE to:
    receive downlink control information from an access network device;
    receive a data channel scheduled by the downlink control information;
    determine an uplink time unit to send feedback information corresponding to the data channel;
    determine a first physical uplink control channel (PUCCH) resource according to resource indication information, wherein the first PUCCH resource is a part of a second PUCCH resource that is in a second PUCCH resource set, and wherein the second PUCCH resource is indicated by the resource indication information; and
    send the feedback information on the first PUCCH resource in the uplink time unit.

16. The non-transitory computer readable medium according to claim 15, wherein the second PUCCH channel resource set is configured by the access network device, and the first PUCCH channel resource is on a primary component carrier.

17. The non-transitory computer readable medium according to claim 16, wherein the second PUCCH channel resource is on the primary component carrier.

18. The non-transitory computer readable medium according to claim 15, wherein the downlink control information comprises the resource indication information.

19. The non-transitory computer readable medium according to claim 15, wherein the instructions further cause the UE to:
   determine the first PUCCH resource in the second PUCCH resource according to preconfigured information.

20. The non-transitory computer readable medium according to claim 15, wherein the processor is further configured to:
   determine, from the second PUCCH channel resource set, the second PUCCH channel resource indicated by the resource indication information, and
   determine the first PUCCH channel resource from the second PUCCH channel resource according to preconfigured information.

* * * * *